US009498397B2

(12) United States Patent
Hight et al.

(10) Patent No.: US 9,498,397 B2
(45) Date of Patent: Nov. 22, 2016

(54) DUAL COLUMN SURGICAL SUPPORT SYSTEM

(71) Applicant: Allen Medical Systems, Inc., Batesville, IN (US)

(72) Inventors: Joshua C. Hight, Acton, MA (US); David P Scott, Sterling, MA (US); Thomas K Skripps, Acton, MA (US); Orlando Soto, Salem, MA (US); Darwin Keith-Lucas, Arlington, MA (US);
(Continued)

(73) Assignee: Allen Medical Systems, Inc., Batesville, IN (US)

( * ) Notice: Subject to any disclaimer, the term of this patent is extended or adjusted under 35 U.S.C. 154(b) by 484 days.

(21) Appl. No.: 13/789,037

(22) Filed: Mar. 7, 2013

(65) Prior Publication Data
US 2013/0269710 A1 Oct. 17, 2013

Related U.S. Application Data

(60) Provisional application No. 61/624,626, filed on Apr. 16, 2012, provisional application No. 61/647,950,
(Continued)

(51) Int. Cl.
*A61G 13/04* (2006.01)
*A61G 13/02* (2006.01)
(Continued)

(52) U.S. Cl.
CPC ............... *A61G 13/04* (2013.01); *A61G 13/02* (2013.01); *A61G 13/06* (2013.01);
(Continued)

(58) Field of Classification Search
CPC ................... A61G 13/04; A61G 13/02; A61G 7/018; A61G 13/06; A61G 13/1295;
(Continued)

(56) References Cited

U.S. PATENT DOCUMENTS

| 1,021,335 A | 3/1912 | Robinson et al. |
| 1,160,451 A | 11/1915 | Sanford |

(Continued)

FOREIGN PATENT DOCUMENTS

| DE | 1162508 B | 2/1964 |
| DE | 3438956 A1 | 5/1985 |

(Continued)

OTHER PUBLICATIONS

Partial EP Search Report in Application/Patent No. 13163692.0, dated Sep. 30, 2015 (5 pages).
(Continued)

*Primary Examiner* — David E Sosnowski
*Assistant Examiner* — Eric Kurilla
(74) *Attorney, Agent, or Firm* — Barnes & Thornburg LLP

(57) ABSTRACT

A surgical patient support includes a foundation frame, a support top, and a brake system. The foundation frame includes a first column and a second column. The support top is coupled to the first column and the second column for rotation about a top axis extending along the length of the support top.

13 Claims, 63 Drawing Sheets

US 9,498,397 B2

Page 2

(72) Inventors: Justin I McCarthy, Bedford, MA (US);
Jack B Sing, Batesville, IN (US);
Jeffrey C Marrion, Acton, MA (US);
Phillip B Dolliver, Framingham, MA
(US); Joshua J Moriarty, South
Attleboro, MA (US)

Related U.S. Application Data filed on May 16, 2012, provisional application No. 61/703,561, filed on Sep. 20, 2012.

(51) Int. Cl.
*A61G 13/06* (2006.01)
*A61G 13/12* (2006.01)
*F16H 21/06* (2006.01)

(52) U.S. Cl.
CPC ............ *A61G 13/1295* (2013.01); *F16H 21/06* (2013.01); *A61G 2203/42* (2013.01); *A61G 2210/10* (2013.01)

(58) Field of Classification Search
CPC ............ A61G 2210/10; A61G 2203/42; F16H 21/06
See application file for complete search history.

(56) References Cited

U.S. PATENT DOCUMENTS

| | | | |
|---|---|---|---|
| 1,372,565 A | 3/1921 | Skelly |
| 1,662,464 A | 3/1928 | McCutchen |
| 1,938,006 A | 12/1933 | Blanchard |
| 2,103,693 A | 12/1937 | Ernst |
| 2,188,592 A | 1/1940 | Hosken |
| 2,261,297 A | 11/1941 | Anthony |
| 2,337,505 A | 12/1942 | Swift |
| 2,452,816 A | 11/1948 | Wagner |
| 2,509,086 A | 5/1950 | Eaton |
| 2,613,371 A | 10/1952 | Keyes |
| 2,636,793 A | 4/1953 | Meyer |
| 2,667,169 A | 1/1954 | Kambourakis |
| 2,691,979 A | 10/1954 | Watson |
| 2,764,150 A | 9/1956 | Ettinger et al. |
| 2,803,022 A | 8/1957 | Wyhnkoop |
| 2,880,720 A | 4/1959 | Houghtaling |
| 2,935,286 A | 5/1960 | Skelt |
| 3,046,072 A | 7/1962 | Douglass, Jr. et al. |
| 3,049,726 A | 8/1962 | Getz |
| 3,090,381 A | 5/1963 | Watson |
| 3,099,441 A | 7/1963 | Frederuck |
| 3,188,079 A | 6/1965 | Boetcker et al. |
| 3,238,539 A | 3/1966 | Koch |
| 3,281,141 A | 10/1966 | Smiley et al. |
| 3,286,707 A | 11/1966 | Shafer |
| 3,302,218 A | 2/1967 | Stryker |
| 3,388,700 A | 6/1968 | Mountz |
| 3,428,307 A | 2/1969 | Hunter et al. |
| 3,434,165 A | 3/1969 | Keane |
| 3,584,321 A | 6/1971 | Buchanan |
| 3,599,964 A | 8/1971 | Magni |
| 3,652,851 A | 3/1972 | Zaalberg |
| 3,739,406 A | 6/1973 | Koetter |
| 3,745,996 A | 7/1973 | Rush, Sr. |
| 3,751,028 A | 8/1973 | Scheininger et al. |
| 3,766,384 A | 10/1973 | Anderson |
| 3,795,018 A | 3/1974 | Broaded |
| 3,814,414 A | 6/1974 | Chapa |
| 3,827,089 A | 8/1974 | Grow |
| 3,828,377 A | 8/1974 | Fary, Sr. |
| 3,832,742 A | 9/1974 | Stryker |
| 3,859,982 A | 1/1975 | Dove |
| 3,873,081 A | 3/1975 | Smith |
| 3,890,668 A | 6/1975 | Stosberg et al. |
| 3,895,403 A | 7/1975 | Davis |
| 3,930,548 A | 1/1976 | Wallraff |
| 3,946,452 A | 3/1976 | Eary, Sr. |
| 3,947,686 A | 3/1976 | Cooper et al. |
| 3,949,983 A | 4/1976 | Tommasino |
| 3,986,582 A * | 10/1976 | Dye ............... B62B 5/04 188/31 |
| 4,018,412 A | 4/1977 | Kees, Jr. et al. |
| 4,054,282 A | 10/1977 | Hamer |
| 4,071,916 A | 2/1978 | Nelson |
| 4,101,120 A | 7/1978 | Seshima |
| 4,108,426 A | 8/1978 | Lindstroem et al. |
| 4,131,802 A | 12/1978 | Braden et al. |
| 4,139,917 A | 2/1979 | Fenwick |
| 4,143,652 A | 3/1979 | Meier et al. |
| 4,144,880 A | 3/1979 | Daniels |
| 4,148,472 A | 4/1979 | Rais et al. |
| 4,175,550 A | 11/1979 | Leininger et al. |
| 4,186,917 A | 2/1980 | Rais et al. |
| 4,205,413 A | 6/1980 | Collignon et al. |
| 4,225,125 A | 9/1980 | Lee |
| 4,239,039 A | 12/1980 | Thompson |
| 4,244,358 A | 1/1981 | Pyers |
| 4,248,445 A | 2/1981 | Vassar |
| 4,257,407 A | 3/1981 | Macchi |
| 4,355,631 A | 10/1982 | LeVahn |
| 4,356,577 A | 11/1982 | Taylor et al. |
| 4,383,351 A | 5/1983 | Fenwick |
| 4,384,378 A | 5/1983 | Getz et al. |
| 4,398,707 A | 8/1983 | Cloward |
| 4,459,712 A | 7/1984 | Pathan |
| 4,474,364 A | 10/1984 | Brendgord |
| 4,484,911 A | 11/1984 | Berlin et al. |
| 4,487,523 A | 12/1984 | Monroe |
| 4,503,844 A | 3/1985 | Siczek |
| 4,506,872 A | 3/1985 | Westerberg et al. |
| 4,526,355 A | 7/1985 | Moore et al. |
| 4,545,571 A | 10/1985 | Chambron |
| 4,552,346 A | 11/1985 | Schnelle et al. |
| 4,579,111 A | 4/1986 | Ledesma |
| 4,583,725 A | 4/1986 | Arnold |
| 4,658,450 A | 4/1987 | Thompson |
| 4,667,365 A | 5/1987 | Martinek |
| 4,671,728 A | 6/1987 | Clark et al. |
| 4,712,781 A | 12/1987 | Watanabe |
| 4,729,535 A | 3/1988 | Frazier et al. |
| 4,730,606 A | 3/1988 | Leininger |
| 4,763,643 A | 8/1988 | Vrzalik |
| 4,769,584 A | 9/1988 | Irigoyen et al. |
| 4,772,880 A | 9/1988 | Goldstein et al. |
| 4,796,846 A | 1/1989 | Meier et al. |
| 4,827,541 A | 5/1989 | Vollman et al. |
| 4,840,362 A | 6/1989 | Bremer et al. |
| 4,840,363 A | 6/1989 | McConnell |
| 4,852,840 A | 8/1989 | Marks |
| 4,856,128 A | 8/1989 | Alsip et al. |
| 4,866,796 A | 9/1989 | Robinson et al. |
| 4,868,937 A | 9/1989 | Connolly |
| 4,901,963 A | 2/1990 | Yoder |
| 4,901,964 A | 2/1990 | McConnell |
| 4,923,187 A | 5/1990 | Mombrinie |
| 4,924,537 A | 5/1990 | Alsip et al. |
| 4,937,901 A | 7/1990 | Brennan |
| 4,939,801 A | 7/1990 | Schaal et al. |
| 4,944,054 A | 7/1990 | Bossert |
| 4,947,496 A | 8/1990 | Connolly |
| 4,971,037 A | 11/1990 | Pelta |
| 4,989,848 A | 2/1991 | Monroe |
| 4,998,320 A | 3/1991 | Lange |
| 5,020,170 A | 6/1991 | Ruf |
| 5,036,958 A * | 8/1991 | Yamamoto ............... F16D 65/60 188/196 BA |
| 5,088,706 A | 2/1992 | Jackson |
| 5,108,213 A | 4/1992 | Shields |
| 5,121,892 A | 6/1992 | Herzog |
| 5,131,106 A | 7/1992 | Jackson |
| 5,135,210 A | 8/1992 | Michelson |
| 5,152,024 A | 10/1992 | Chrones et al. |
| 5,210,888 A | 5/1993 | Canfield |
| 5,239,716 A | 8/1993 | Fisk |

(56) References Cited

U.S. PATENT DOCUMENTS

| | | |
|---|---|---|
| 5,276,927 A | 1/1994 | Day |
| 5,287,575 A | 2/1994 | Allen et al. |
| 5,320,444 A | 6/1994 | Bookwalter et al. |
| 5,393,018 A | 2/1995 | Roth et al. |
| 5,400,772 A | 3/1995 | LeVahn et al. |
| 5,404,603 A | 4/1995 | Fukai et al. |
| 5,444,882 A | 8/1995 | Andrews et al. |
| 5,461,740 A | 10/1995 | Pearson |
| 5,483,323 A | 1/1996 | Matsuda et al. |
| 5,502,853 A | 4/1996 | Singleton et al. |
| 5,503,416 A | 4/1996 | Aoki et al. |
| 5,538,215 A | 7/1996 | Hosey |
| 5,588,705 A | 12/1996 | Chang |
| 5,613,254 A | 3/1997 | Clayman et al. |
| 5,626,362 A | 5/1997 | Mottola |
| 5,926,871 A | 7/1997 | Howard |
| 5,658,315 A | 8/1997 | Lamb et al. |
| 5,701,991 A | 12/1997 | Helmetsie |
| 5,741,210 A | 4/1998 | Dobrovolny |
| 5,758,374 A | 6/1998 | Ronci |
| 5,778,467 A | 7/1998 | Scott et al. |
| 5,794,286 A | 8/1998 | Scott |
| 5,836,026 A | 11/1998 | Reed |
| 5,836,559 A | 11/1998 | Ronci |
| 5,836,569 A | 11/1998 | Wurangian |
| 5,926,876 A | 7/1999 | Haigh et al. |
| 5,950,259 A | 9/1999 | Boggs |
| 6,003,174 A | 12/1999 | Kantrowitz et al. |
| 6,076,525 A | 6/2000 | Hoffman |
| 6,094,760 A | 8/2000 | Nonaka et al. |
| 6,108,838 A | 8/2000 | Connolly et al. |
| 6,112,349 A | 9/2000 | Connolly |
| 6,120,397 A | 9/2000 | Julian |
| 6,154,901 A | 12/2000 | Carr |
| 6,161,849 A | 12/2000 | Schweninger |
| 6,230,342 B1 | 5/2001 | Haugs |
| 6,260,220 B1 | 7/2001 | Lamb et al. |
| 6,282,736 B1 | 9/2001 | Hand et al. |
| 6,286,164 B1 | 9/2001 | Lamb et al. |
| 6,286,183 B1 | 9/2001 | Stickel et al. |
| 6,295,671 B1 | 10/2001 | Reesby et al. |
| 6,311,349 B1 | 11/2001 | Kazakia et al. |
| 6,320,510 B2 | 11/2001 | Menkedick et al. |
| 6,324,710 B1 | 12/2001 | Hernandez et al. |
| 6,330,926 B1 * | 12/2001 | Heimbrock ............ A61G 7/018 180/65.1 |
| 6,382,576 B1 | 5/2002 | Heimbrock |
| 6,385,801 B1 | 5/2002 | Watanabe et al. |
| 6,421,854 B1 | 7/2002 | Heimbrock |
| 6,438,777 B1 | 8/2002 | Bender |
| 6,490,737 B1 | 12/2002 | Mazzei et al. |
| 6,499,158 B1 | 12/2002 | Easterling |
| 6,499,160 B2 | 12/2002 | Hand et al. |
| 6,502,669 B1 | 1/2003 | Harris |
| 6,505,365 B1 | 1/2003 | Hanson et al. |
| 6,523,197 B2 | 2/2003 | Zitzmann |
| 6,526,610 B1 | 3/2003 | Hand et al. |
| 6,584,630 B1 | 7/2003 | Dinkler |
| 6,609,260 B2 | 8/2003 | Hand et al. |
| 6,615,430 B2 | 9/2003 | Heimbrock |
| 6,622,324 B2 | 9/2003 | VanSteenburg et al. |
| 6,622,980 B2 | 9/2003 | Boucher et al. |
| 6,634,043 B2 | 10/2003 | Lamb et al. |
| 6,638,299 B2 | 10/2003 | Cox |
| 6,662,391 B2 | 12/2003 | Wilson et al. |
| 6,663,055 B2 | 12/2003 | Boucher et al. |
| 6,668,965 B2 | 12/2003 | Strong |
| 6,671,904 B2 | 1/2004 | Easterling |
| 6,681,423 B2 | 1/2004 | Zachrisson |
| 6,691,347 B2 | 2/2004 | Hand et al. |
| 6,691,350 B2 | 2/2004 | Weismiller |
| 6,701,553 B1 | 3/2004 | Hand et al. |
| 6,701,554 B2 | 3/2004 | Heimbrock |
| 6,721,976 B2 | 4/2004 | Schwaegerle |
| 6,735,794 B1 | 5/2004 | Way et al. |
| 6,754,923 B2 | 6/2004 | Borders et al. |
| 6,813,788 B2 | 11/2004 | Dinkler et al. |
| 6,817,363 B2 | 11/2004 | Biondo et al. |
| 6,859,967 B2 | 3/2005 | Harrison et al. |
| 6,862,759 B2 | 3/2005 | Hand et al. |
| 6,862,761 B2 | 3/2005 | Hand et al. |
| 6,865,775 B2 | 3/2005 | Ganance |
| 6,874,181 B1 | 4/2005 | Connolly et al. |
| 6,886,199 B1 | 5/2005 | Schwaegerle |
| 6,898,811 B2 | 5/2005 | Zucker et al. |
| 6,912,959 B2 | 7/2005 | Kolody et al. |
| 6,928,676 B1 | 8/2005 | Schwaegerle |
| 6,941,951 B2 | 9/2005 | Hubert et al. |
| 6,951,034 B2 | 10/2005 | Shiery et al. |
| 6,966,081 B1 | 11/2005 | Sharps et al. |
| 7,017,228 B2 | 3/2006 | Silverstein et al. |
| 7,020,917 B1 | 4/2006 | Kolody et al. |
| 7,080,422 B2 | 7/2006 | Ben-Levi |
| 7,086,103 B2 | 8/2006 | Barthelt |
| 7,089,884 B2 | 8/2006 | Wang et al. |
| 7,103,932 B1 | 9/2006 | Kandora |
| 7,137,160 B2 | 11/2006 | Hand et al. |
| 7,152,261 B2 | 12/2006 | Jackson |
| 7,159,695 B2 | 1/2007 | Strong |
| 7,197,778 B2 | 4/2007 | Sharps |
| 7,200,894 B2 | 4/2007 | Block et al. |
| 7,216,385 B2 | 5/2007 | Hill |
| 7,234,180 B2 | 6/2007 | Horton et al. |
| 7,290,302 B2 | 11/2007 | Sharps |
| 7,343,635 B2 | 3/2008 | Jackson |
| 7,343,916 B2 | 3/2008 | Biondo et al. |
| 7,496,980 B2 | 3/2009 | Sharps |
| 7,520,007 B2 | 4/2009 | Skripps |
| 7,520,008 B2 | 4/2009 | Wong et al. |
| 7,565,708 B2 | 7/2009 | Jackson |
| 7,600,281 B2 | 10/2009 | Skripps |
| 7,603,731 B2 | 10/2009 | Bradcovich |
| D603,967 S | 11/2009 | Berry et al. |
| 7,669,262 B2 | 3/2010 | Skripps et al. |
| 7,681,269 B2 | 3/2010 | Biggie et al. |
| 7,690,059 B2 | 4/2010 | Lemire et al. |
| 7,694,369 B2 | 4/2010 | Hinders et al. |
| 7,882,583 B2 | 2/2011 | Skripps |
| 8,006,332 B2 | 8/2011 | Lemire et al. |
| 8,060,960 B2 | 11/2011 | Jackson |
| RE43,193 E * | 2/2012 | Osborne .............. A47C 19/045 5/600 |
| 8,118,029 B2 | 2/2012 | Gneiting et al. |
| 8,196,237 B2 | 6/2012 | Herbst et al. |
| 8,234,730 B2 | 8/2012 | Skripps |
| 8,256,050 B2 | 9/2012 | Wong et al. |
| 8,397,323 B2 | 3/2013 | Skripps et al. |
| 2001/0011393 A1* | 8/2001 | Brooke .................. A61G 7/012 5/600 |
| 2001/0032362 A1* | 10/2001 | Welling ................. A61G 7/005 5/600 |
| 2004/0123389 A1 | 7/2004 | Boucher et al. |
| 2004/0133983 A1 | 7/2004 | Newkirk et al. |
| 2006/0010643 A1 | 1/2006 | Hornbach et al. |
| 2006/0185091 A1* | 8/2006 | Jackson ................. A61G 7/001 5/621 |
| 2007/0157385 A1* | 7/2007 | Lemire .................. A61G 7/005 5/600 |
| 2007/0174965 A1 | 8/2007 | Lemire et al. |
| 2008/0000028 A1 | 1/2008 | Lemire et al. |
| 2008/0172789 A1* | 7/2008 | Elliot ................... G06F 3/0488 5/616 |
| 2009/0205139 A1 | 8/2009 | Van Deursen et al. |
| 2000/9028825 | 11/2009 | Herbst |
| 2010/0187379 A1* | 7/2010 | Kragh ..................... A47B 9/12 248/188.4 |
| 2010/0192300 A1 | 8/2010 | Tannoury et al. |
| 2011/0099716 A1 | 5/2011 | Jackson |
| 2011/0107516 A1 | 5/2011 | Jackson et al. |
| 2011/0119829 A1 | 5/2011 | Skripps et al. |
| 2011/0120815 A1* | 5/2011 | Frolik ................... A61G 7/018 188/1.12 |
| 2011/0247903 A1 | 10/2011 | Boukhny et al. |

(56) References Cited

U.S. PATENT DOCUMENTS

| | | |
|---|---|---|
| 2012/0023672 A1 | 2/2012 | Jackson |
| 2012/0085595 A1* | 4/2012 | Chen ............... A61G 7/018 188/1.12 |
| 2013/0282234 A1* | 10/2013 | Roberts ............ A61G 1/0268 701/36 |
| 2013/0312188 A1* | 11/2013 | Jackson ............ A61G 7/015 5/618 |
| 2014/0130259 A1* | 5/2014 | Eisenmann ........ A61G 13/104 5/620 |
| 2014/0259413 A1* | 9/2014 | Johnson ............ A61G 7/012 5/611 |

FOREIGN PATENT DOCUMENTS

| | | |
|---|---|---|
| DE | 3438956 C2 | 11/1989 |
| DE | 4039907 A1 | 7/1991 |
| DE | 4429062 C2 | 8/2000 |
| DE | 19723927 C2 | 5/2003 |
| DE | 10158470 A1 | 6/2003 |
| DE | 202008001952 U1 | 6/2008 |
| EP | 617947 B1 | 1/1995 |
| EP | 1210049 A1 | 6/2002 |
| EP | 1686944 A1 | 8/2006 |
| EP | 1159947 B1 | 9/2006 |
| FR | 2247194 B1 | 10/1997 |
| GB | 2210554 B | 9/1989 |
| JP | 2001112582 A | 4/2001 |
| WO | WO8500967 A1 | 3/1985 |
| WO | WO8600221 A1 | 1/1986 |
| WO | WO9953997 A1 | 10/1999 |
| WO | WO0062731 A1 | 10/2000 |
| WO | WO02005740 A8 | 7/2002 |
| WO | WO03096958 A1 | 11/2003 |
| WO | WO2004026212 A1 | 4/2004 |
| WO | WO2006006106 A1 | 1/2006 |
| WO | WO2006061606 A9 | 8/2007 |
| WO | WO2009071787 A3 | 8/2009 |

OTHER PUBLICATIONS

EP Search Report for Application No. 13163692.0, dated Feb. 26, 2016 (9 pages).

* cited by examiner

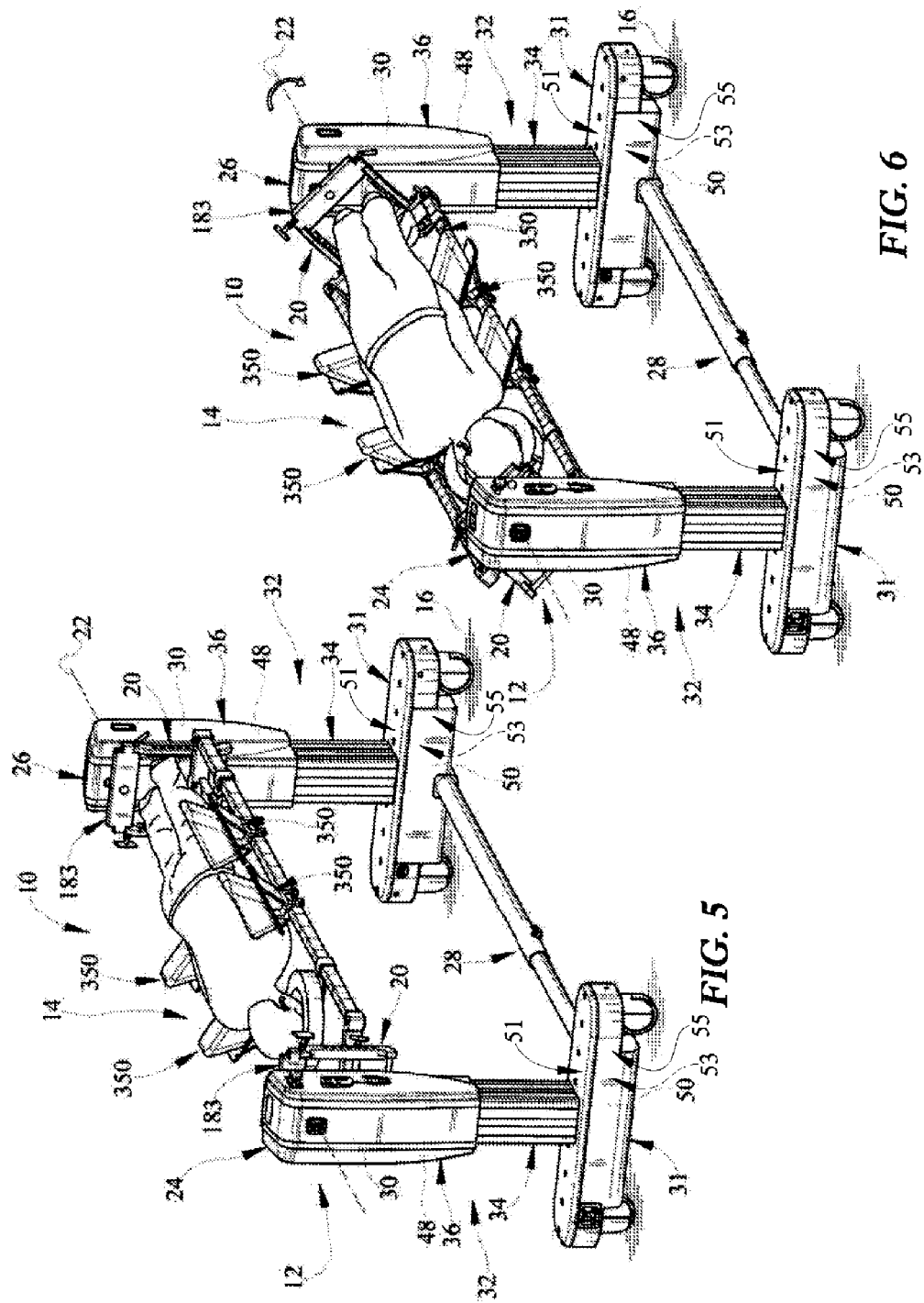

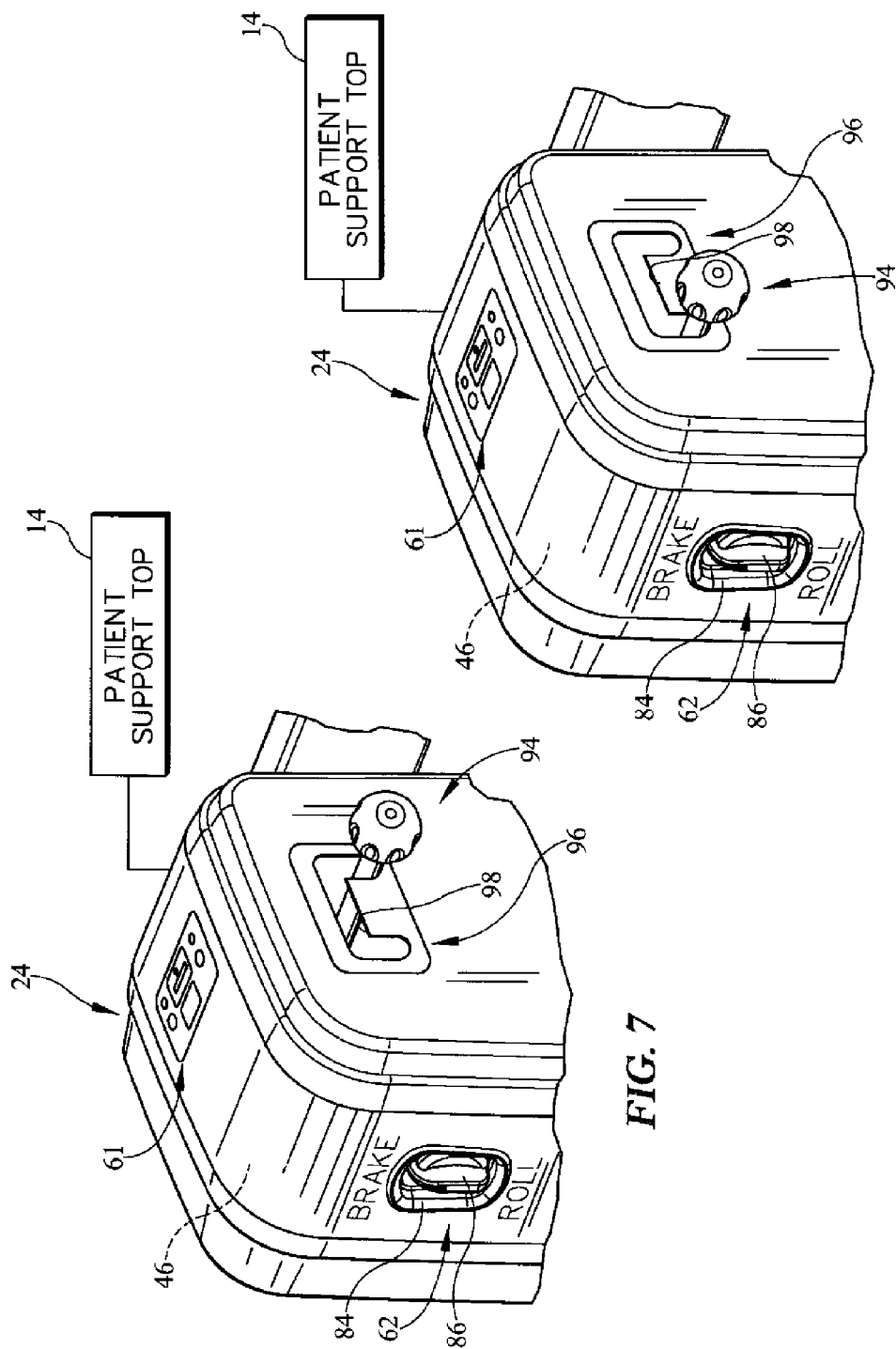

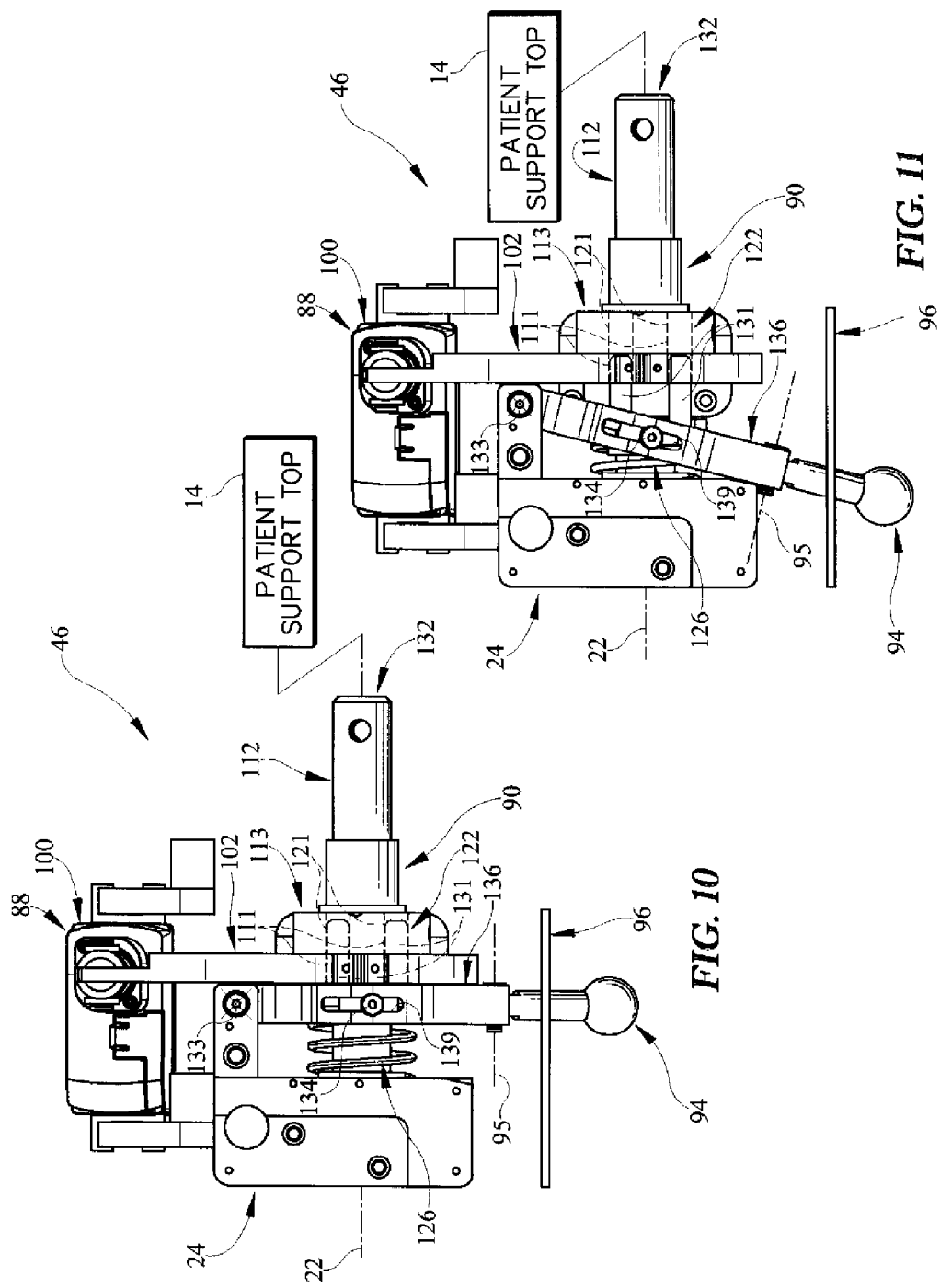

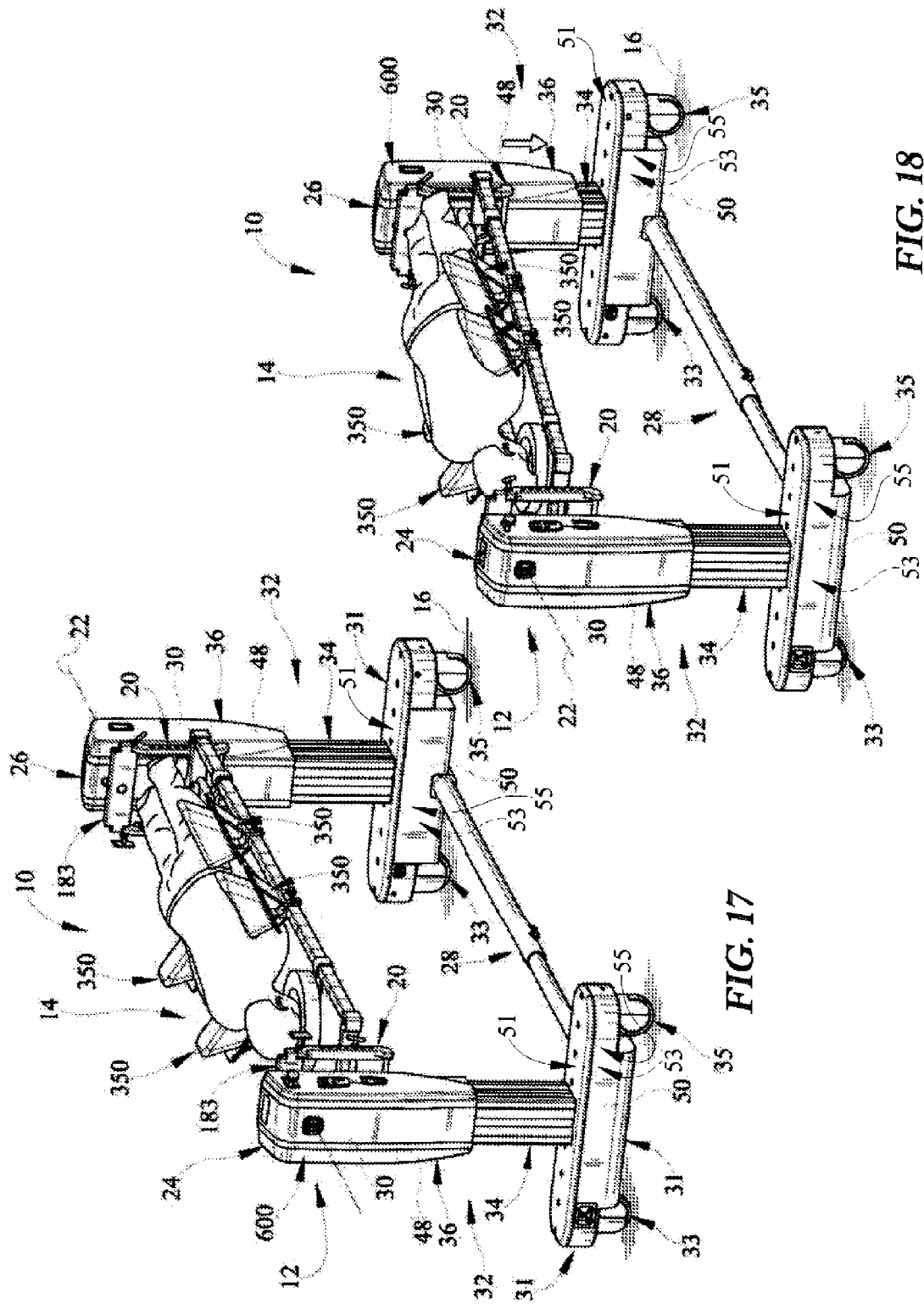

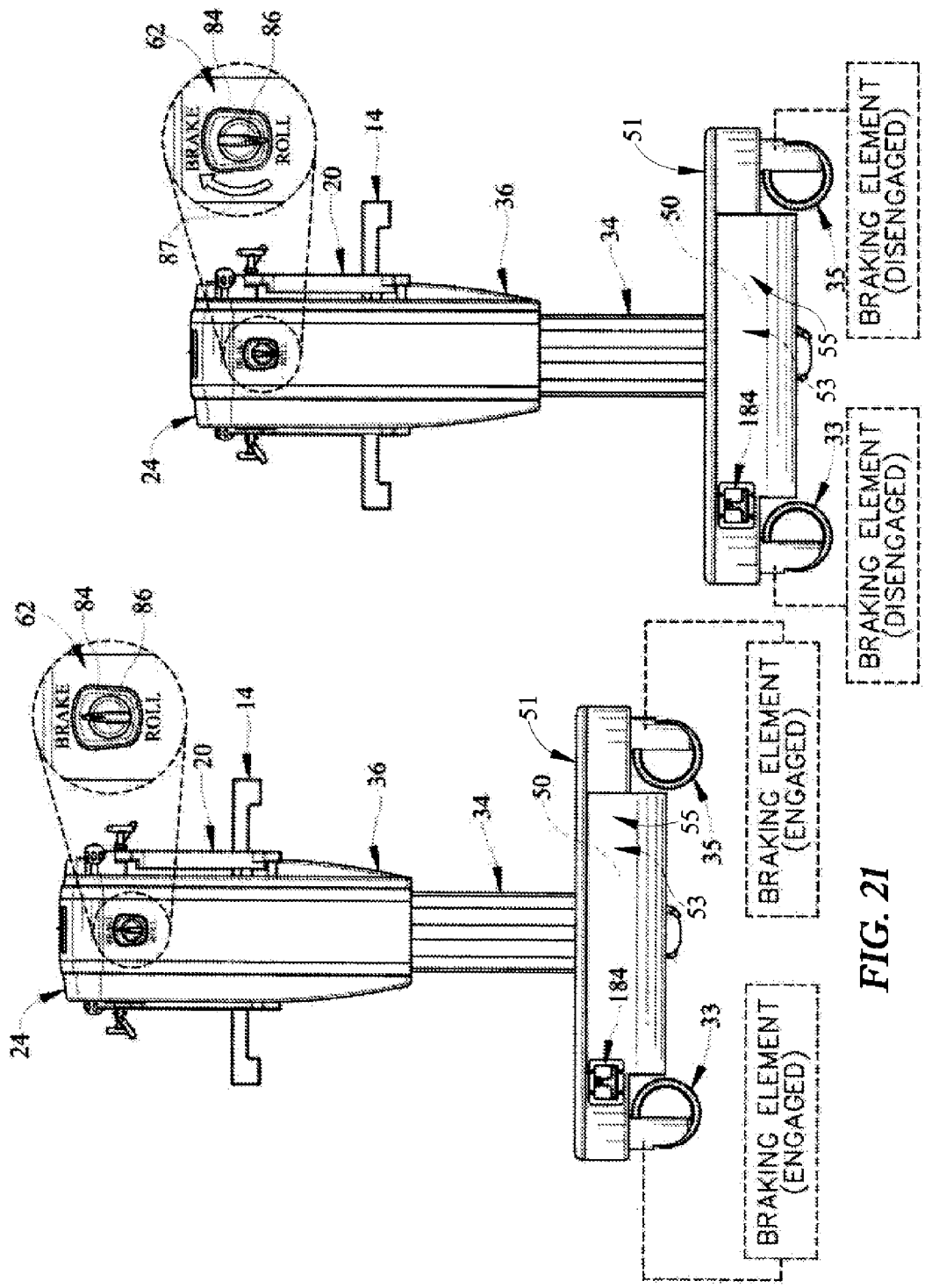

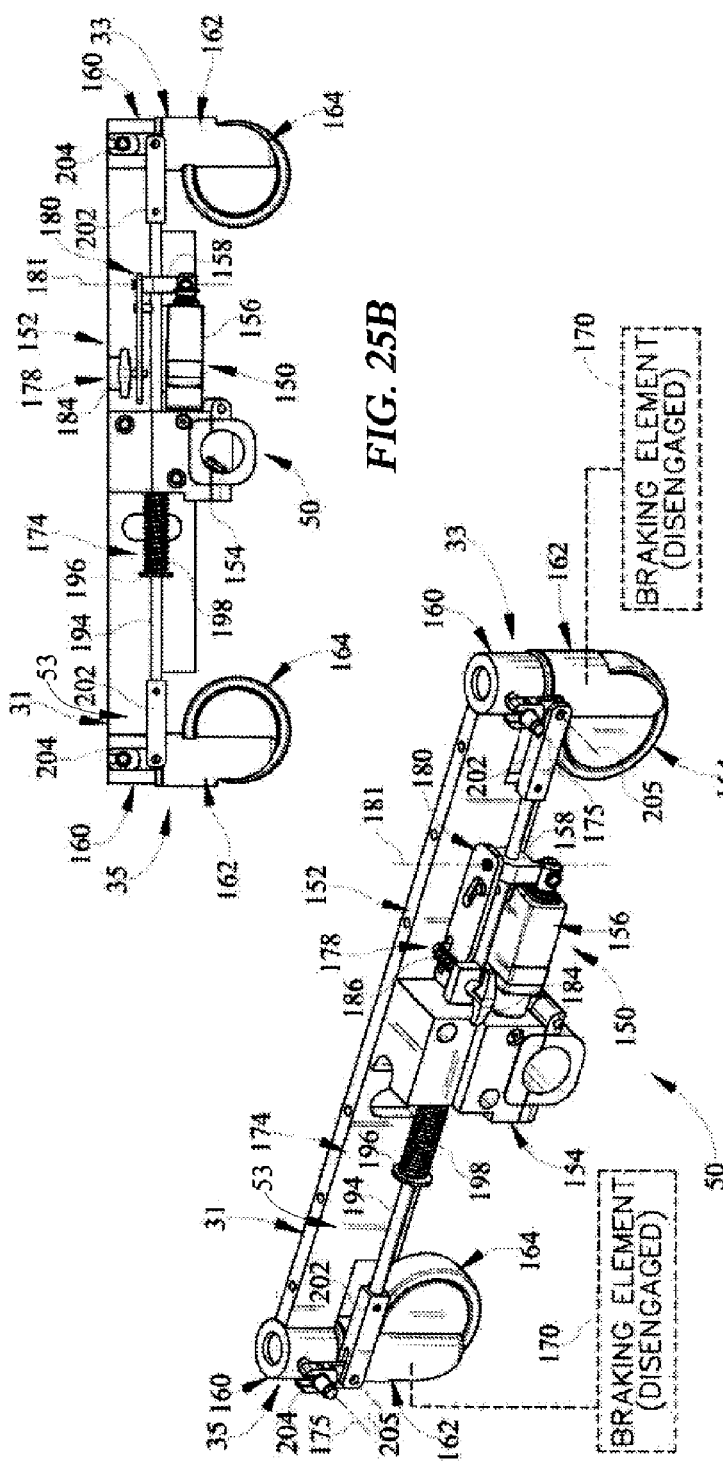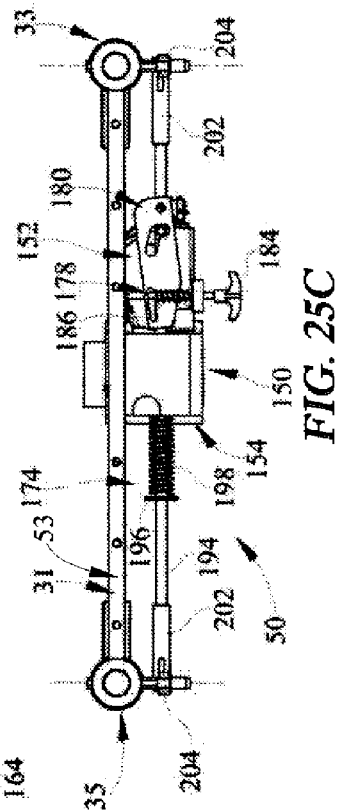

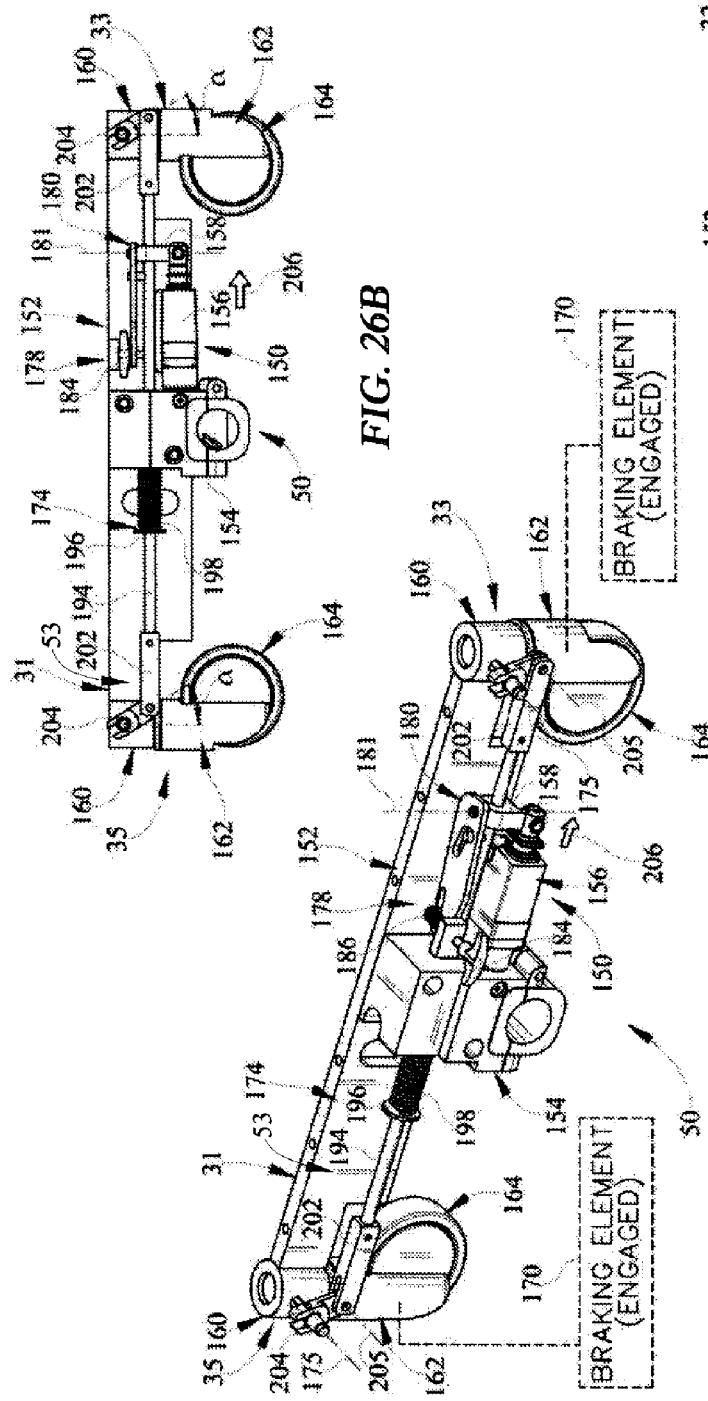

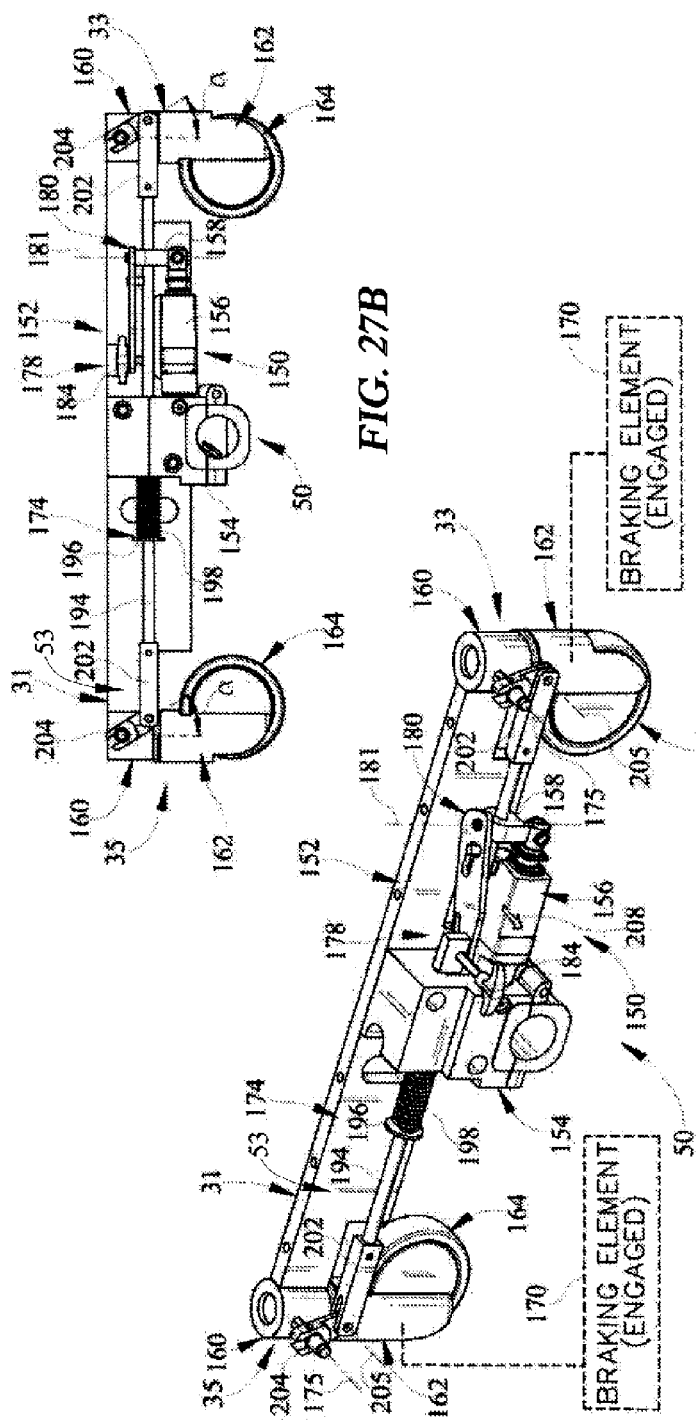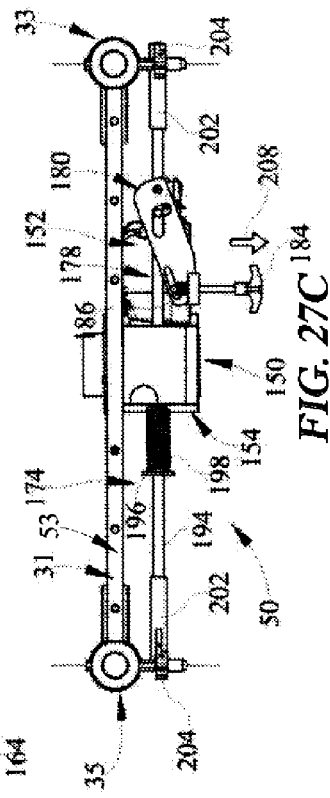

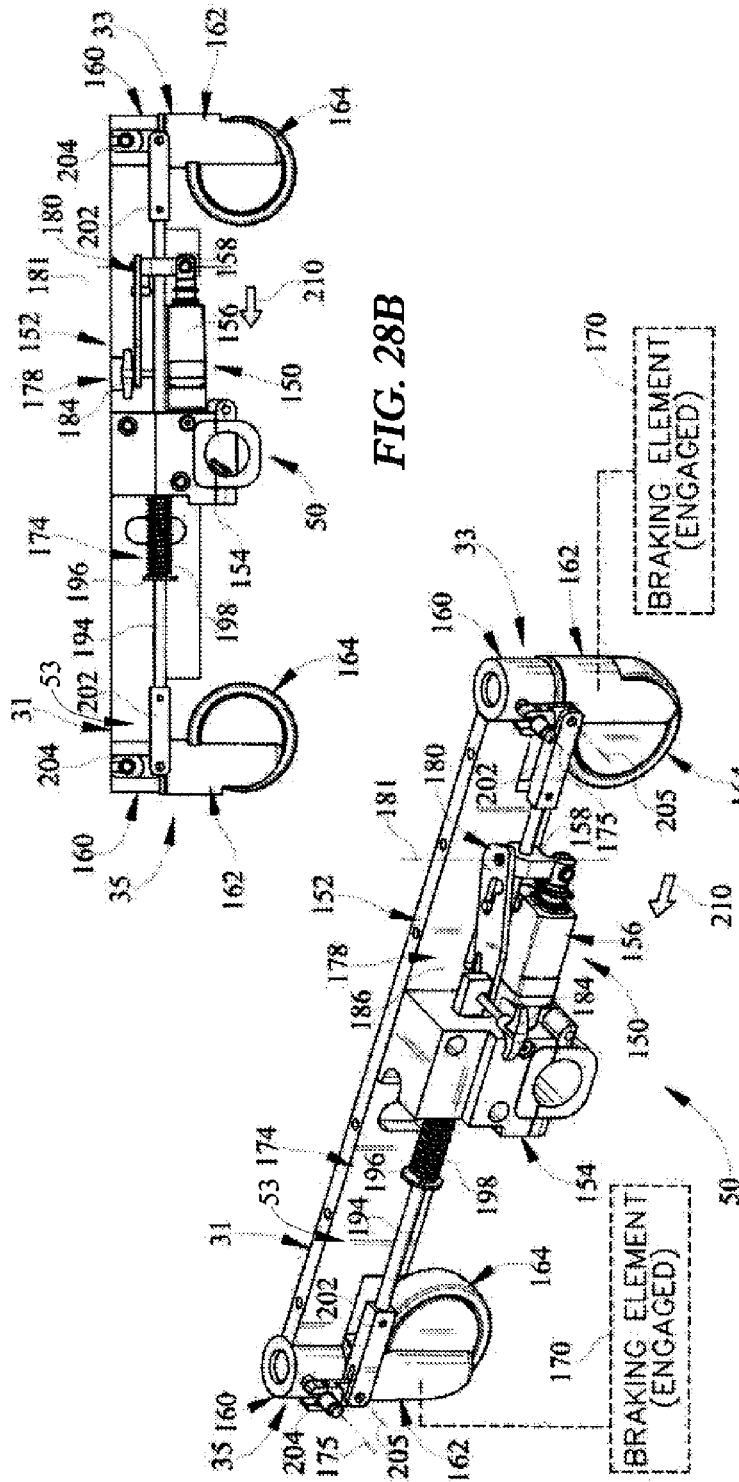
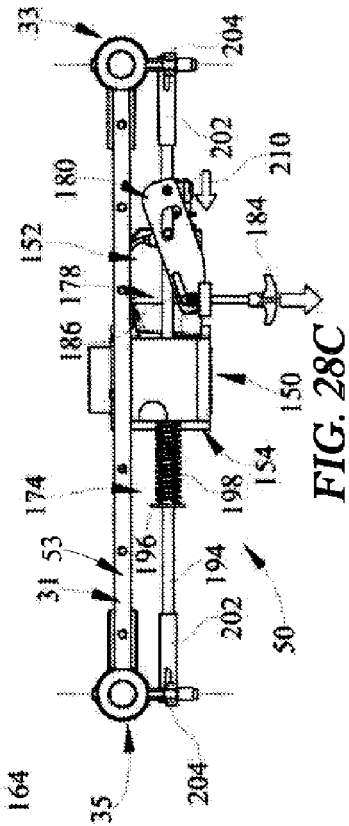
FIG. 28A
FIG. 28B
FIG. 28C

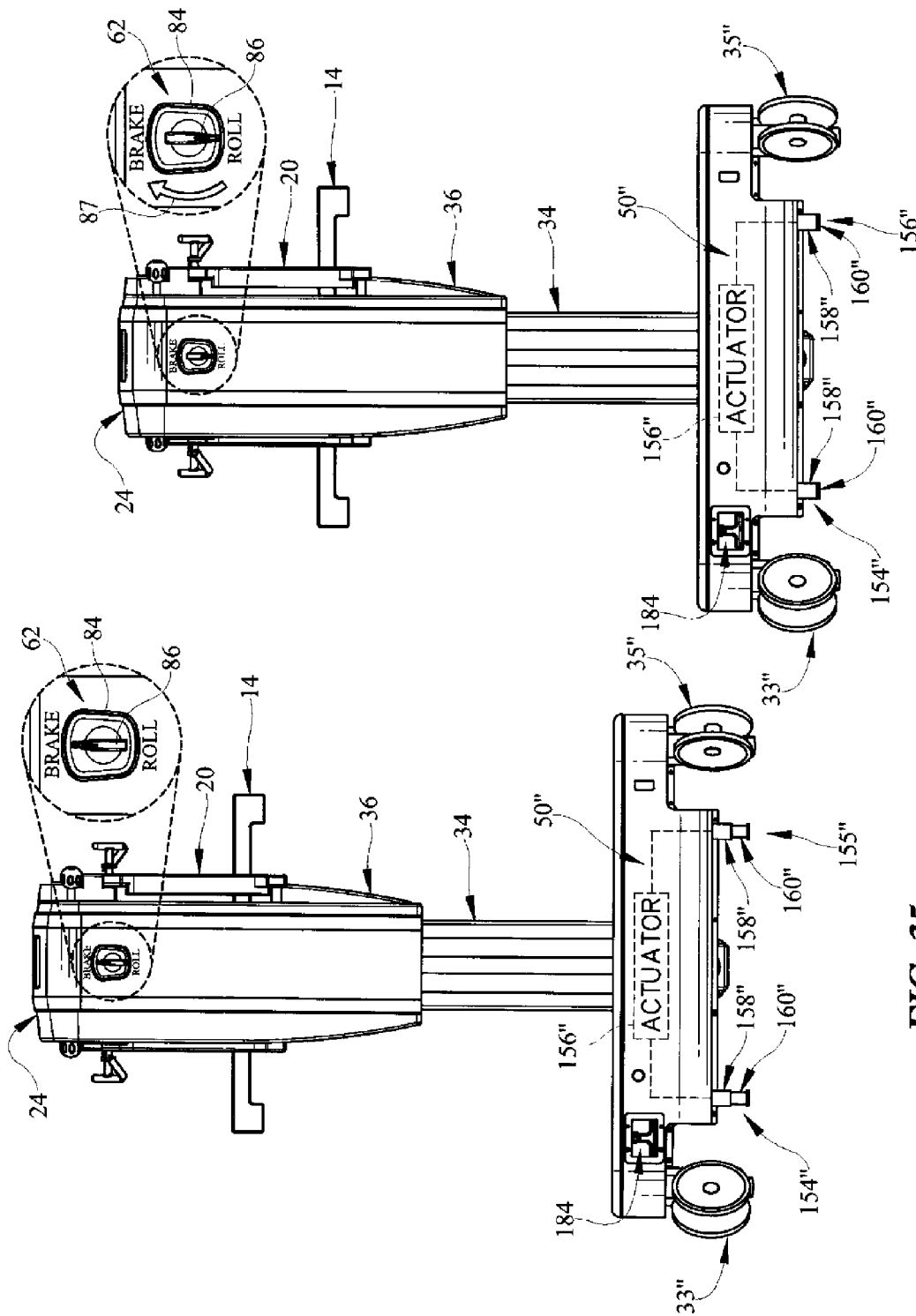

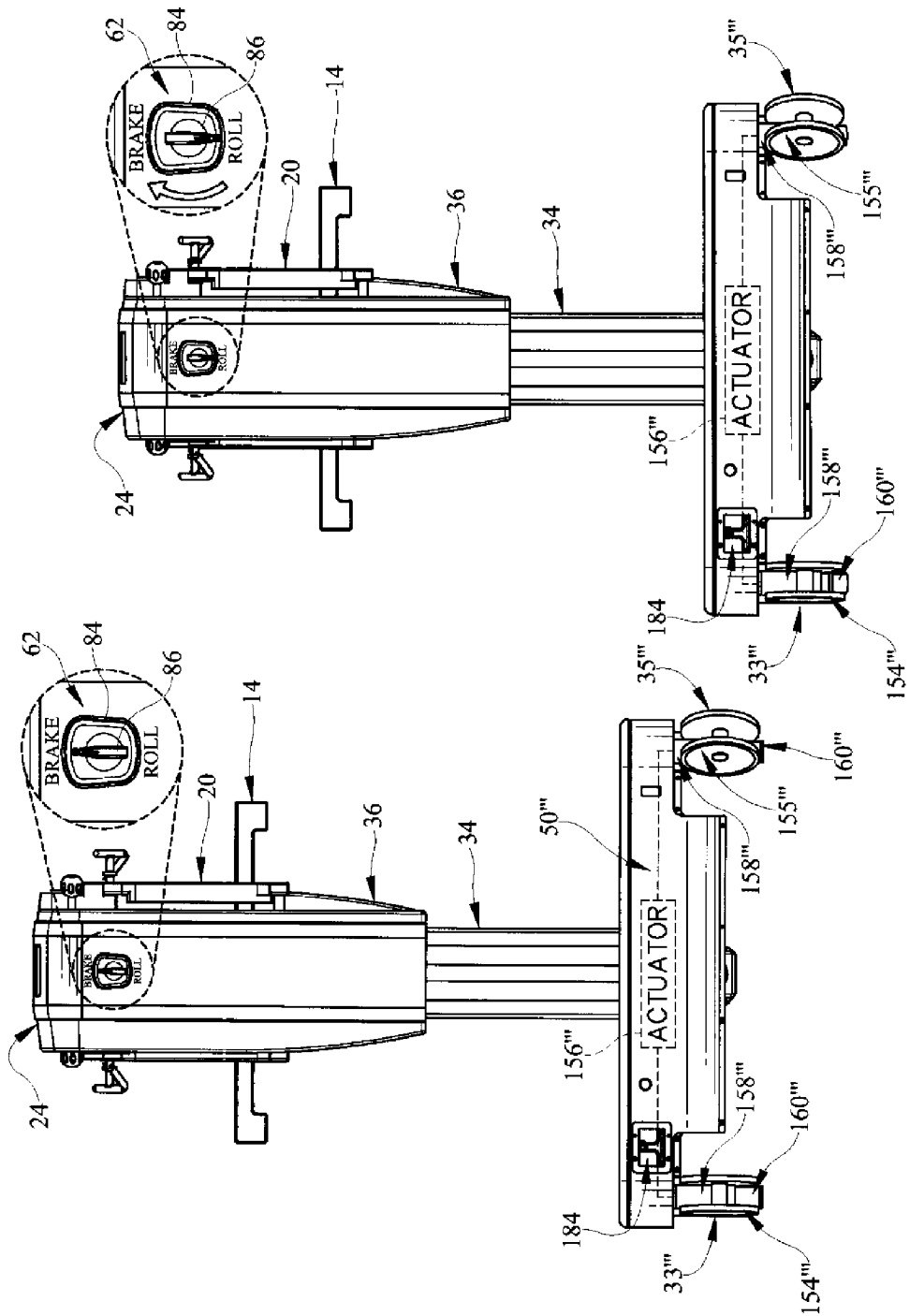

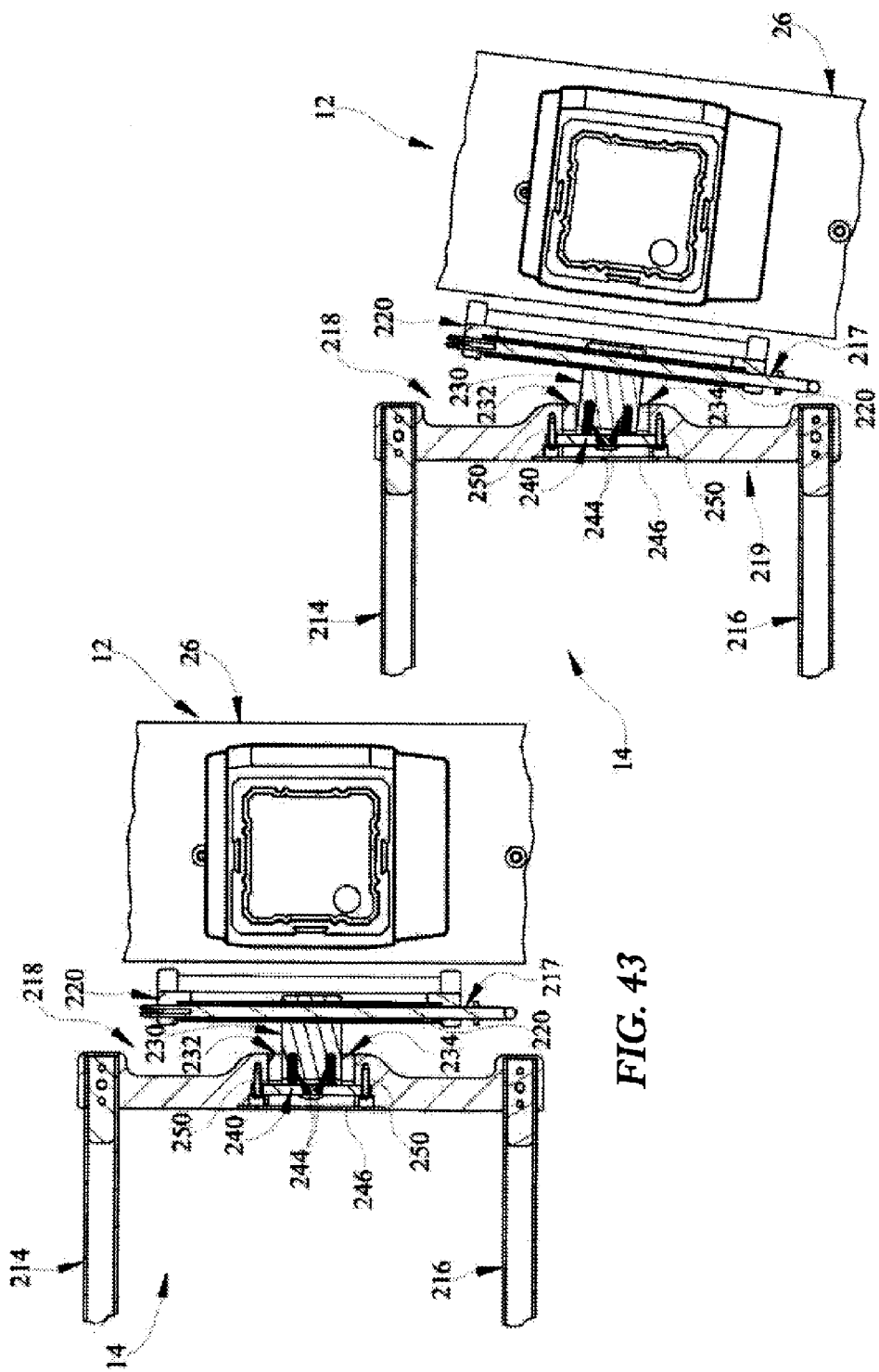

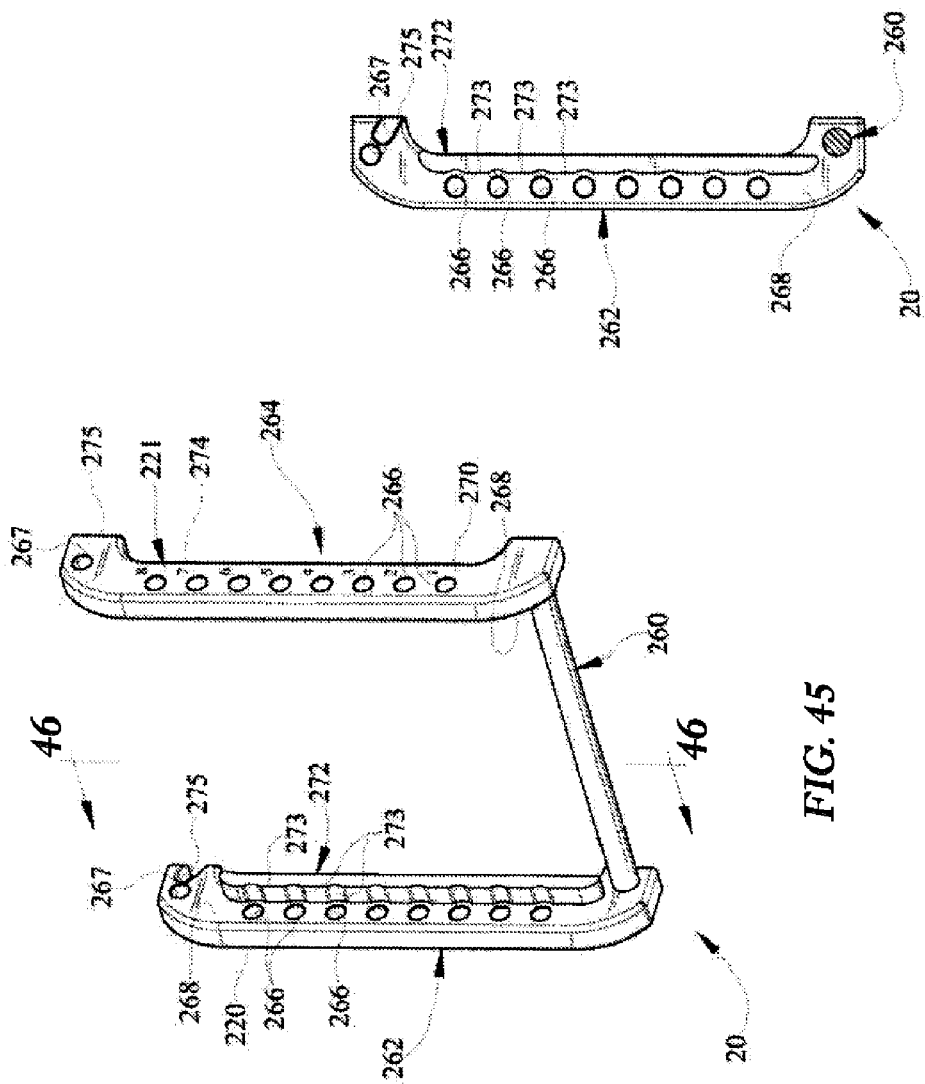

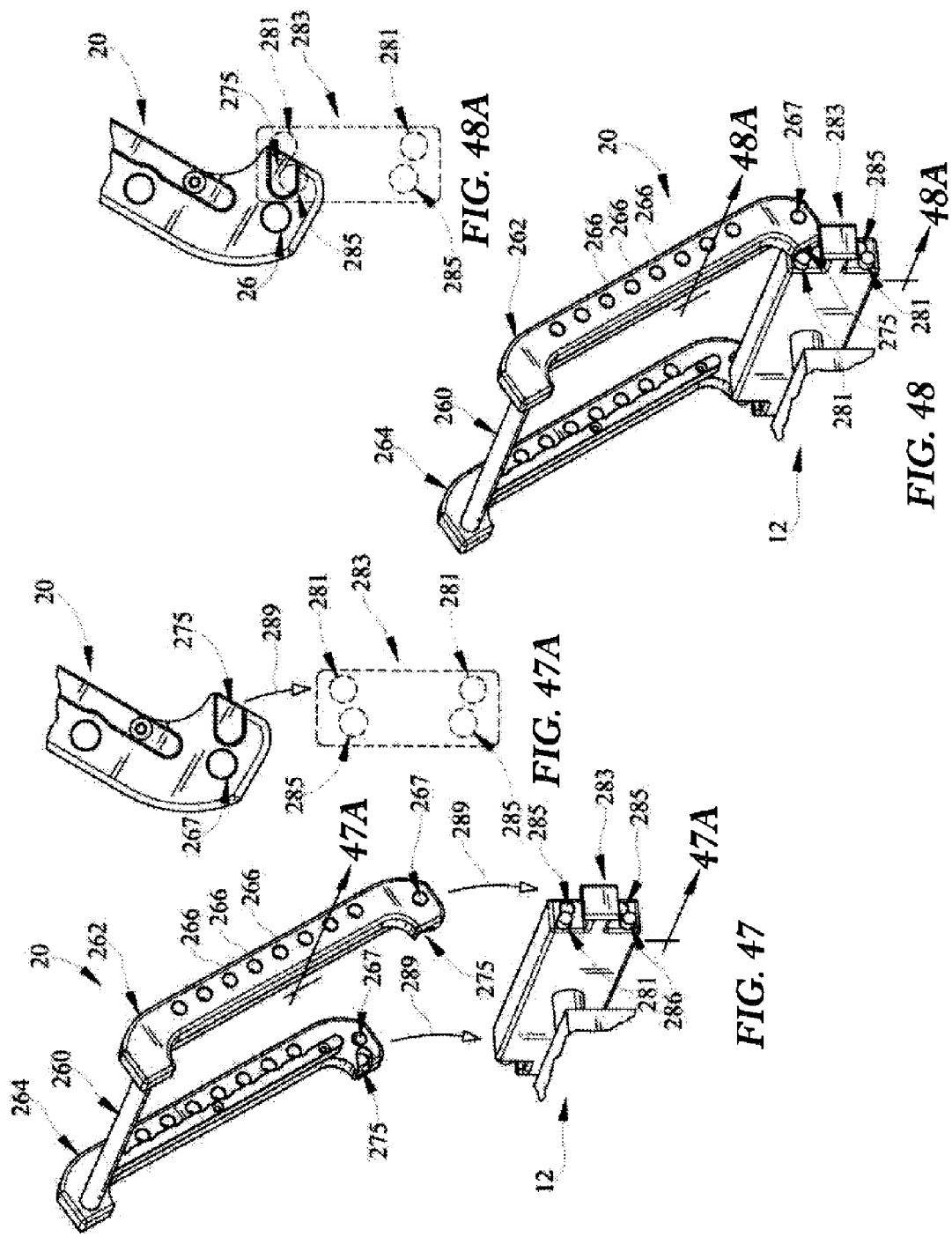

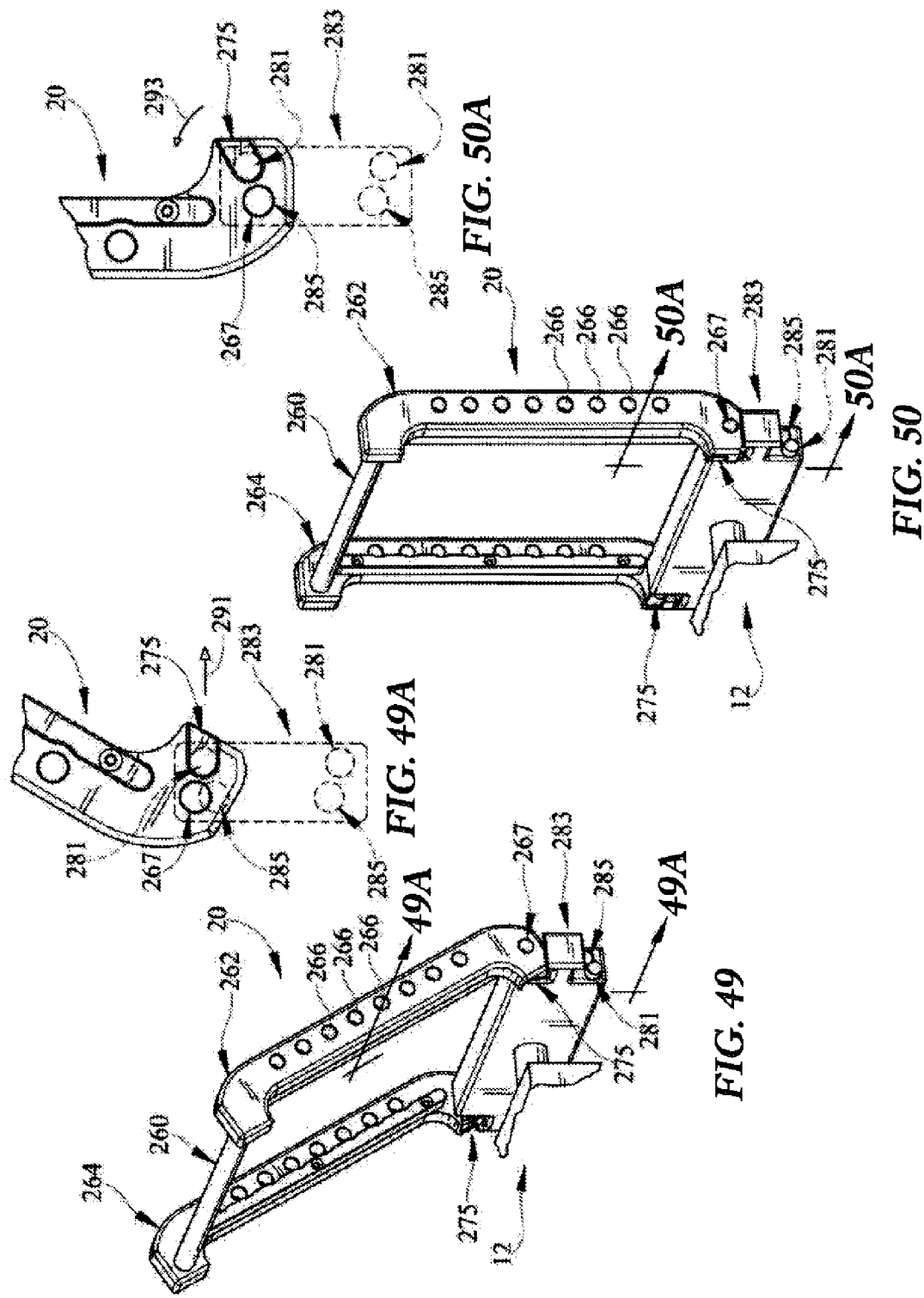

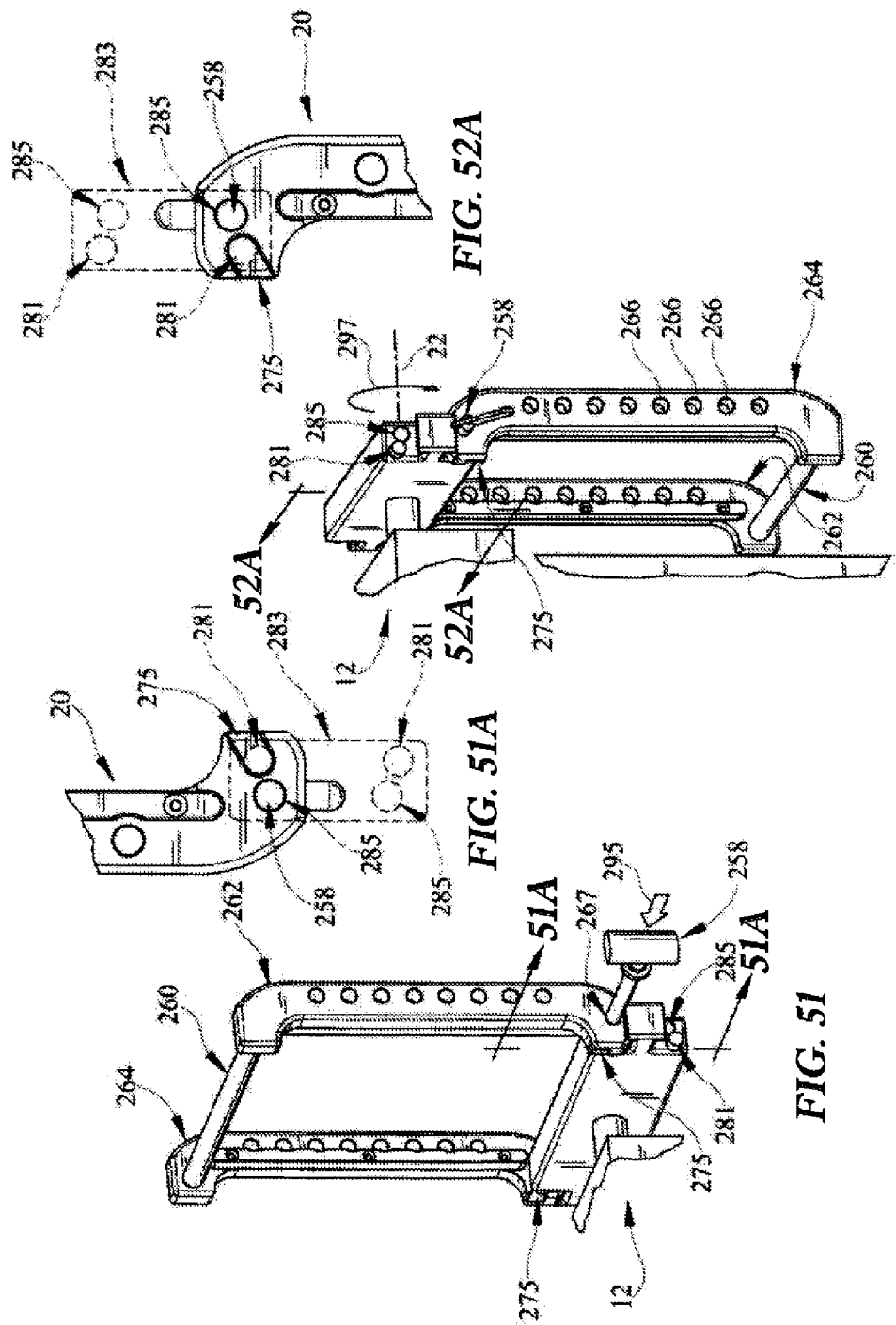

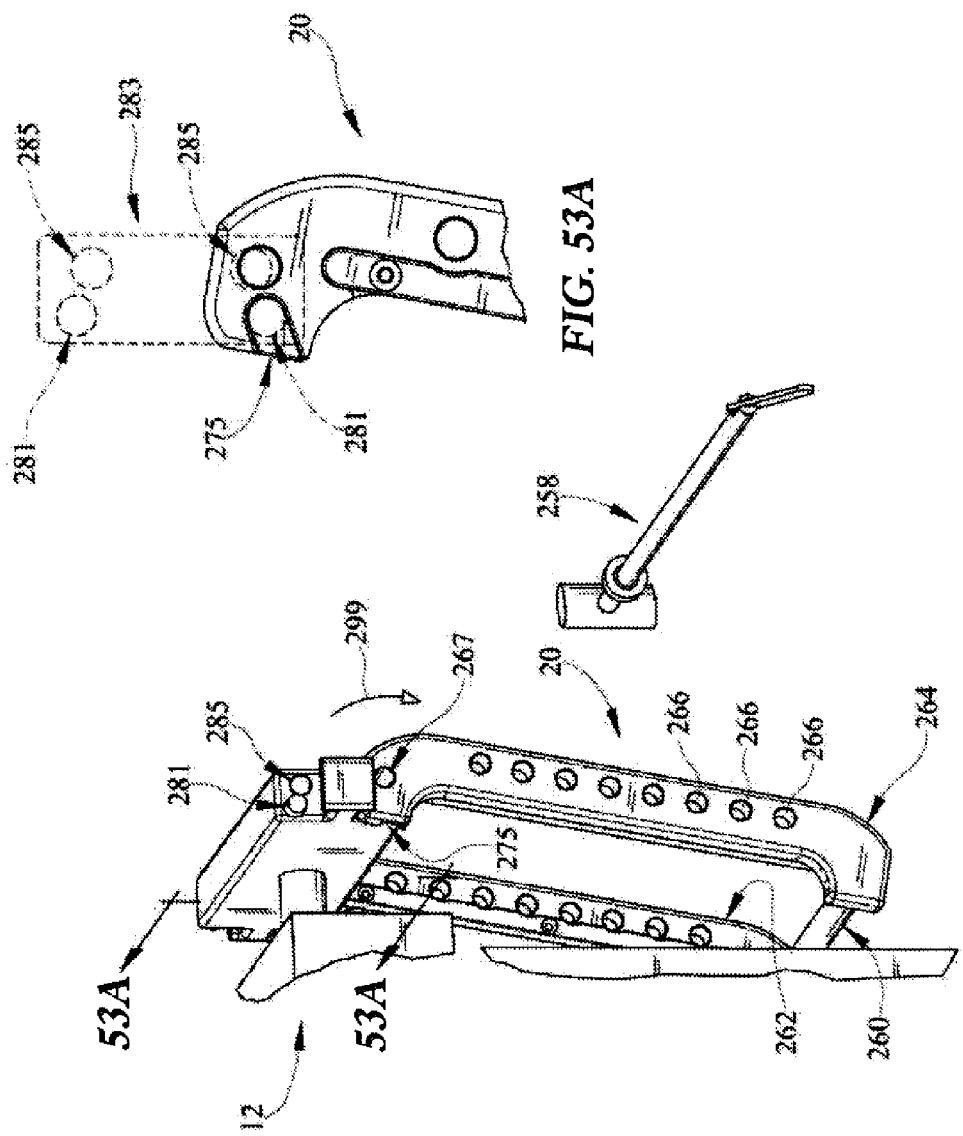

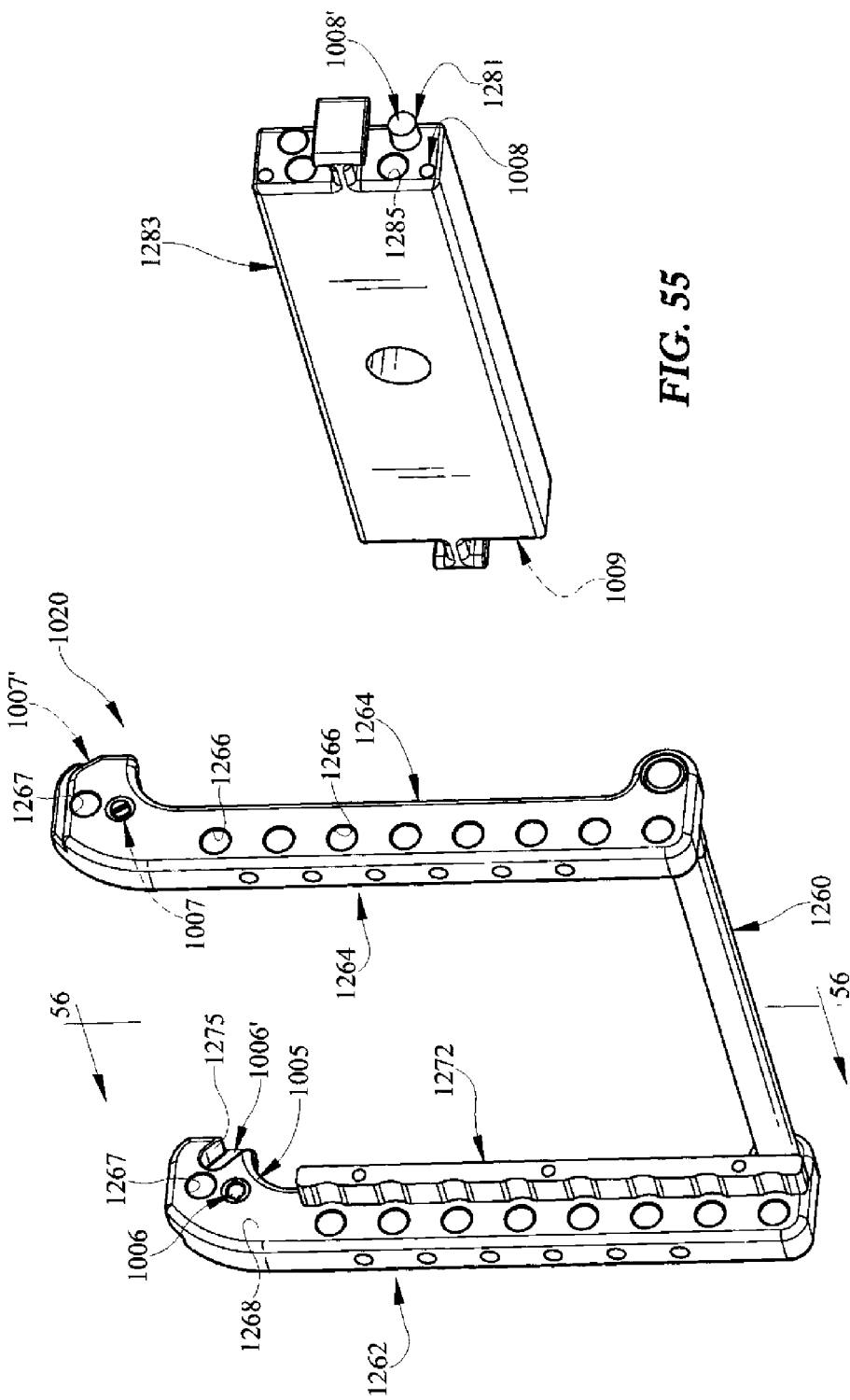

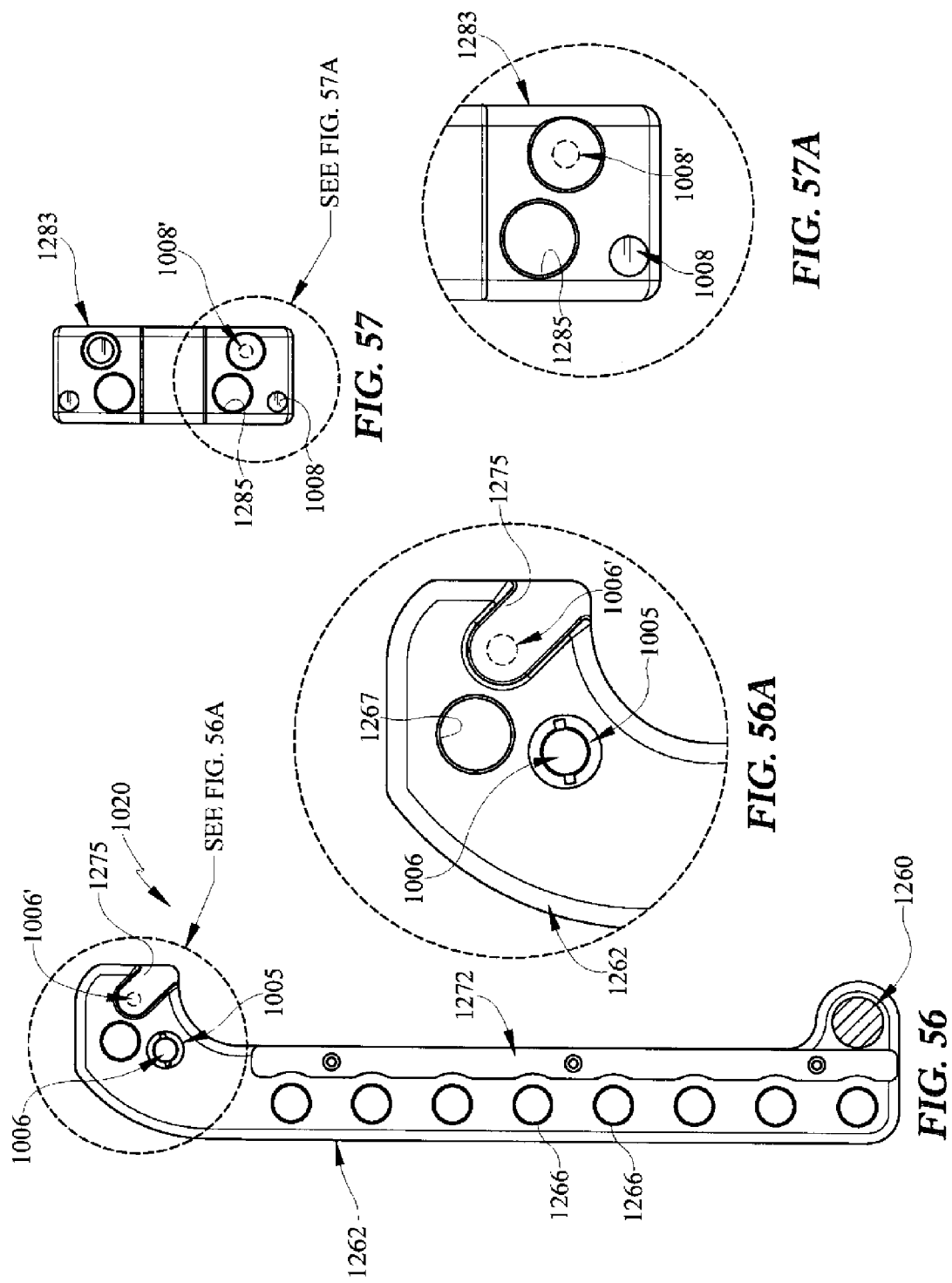

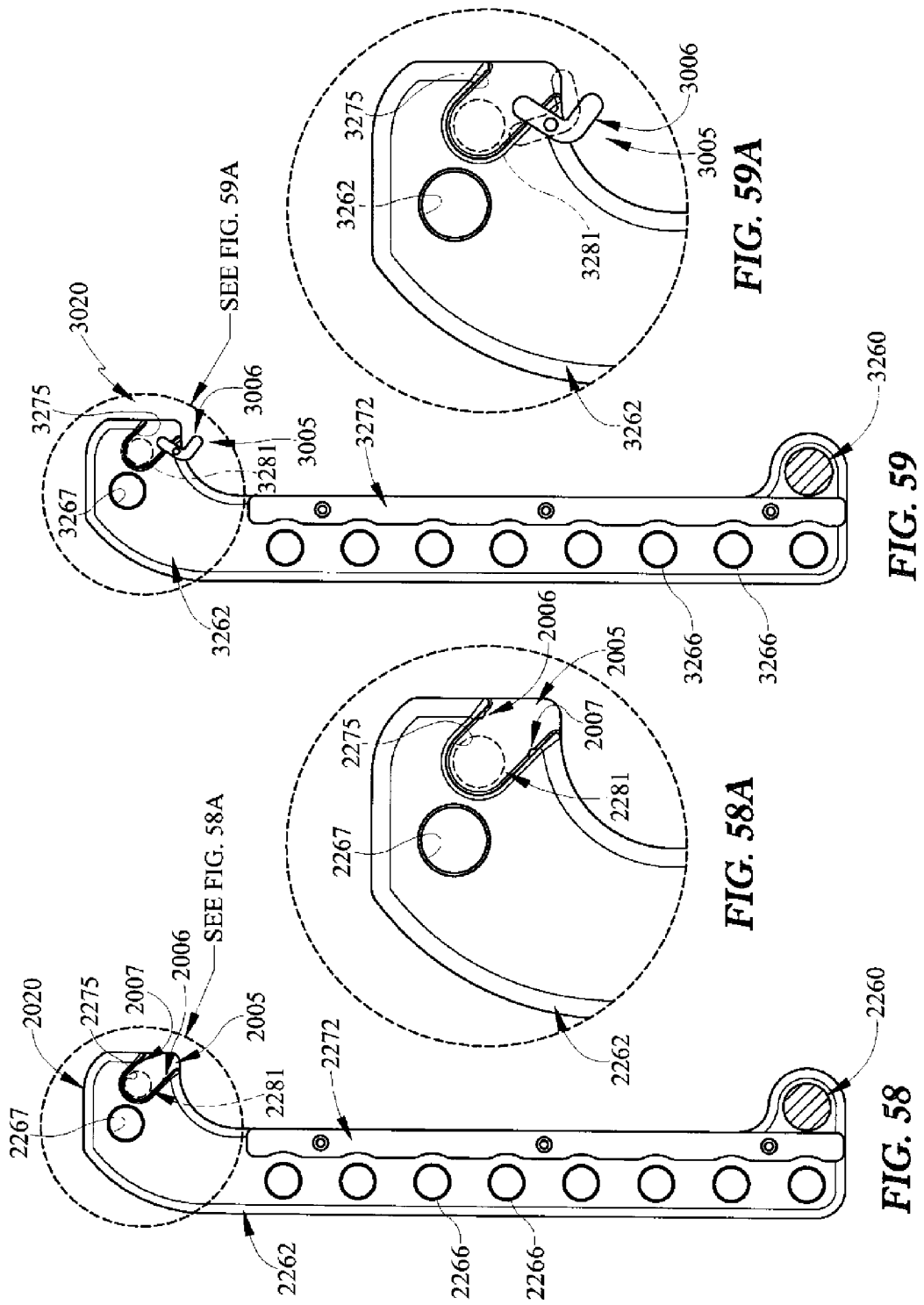

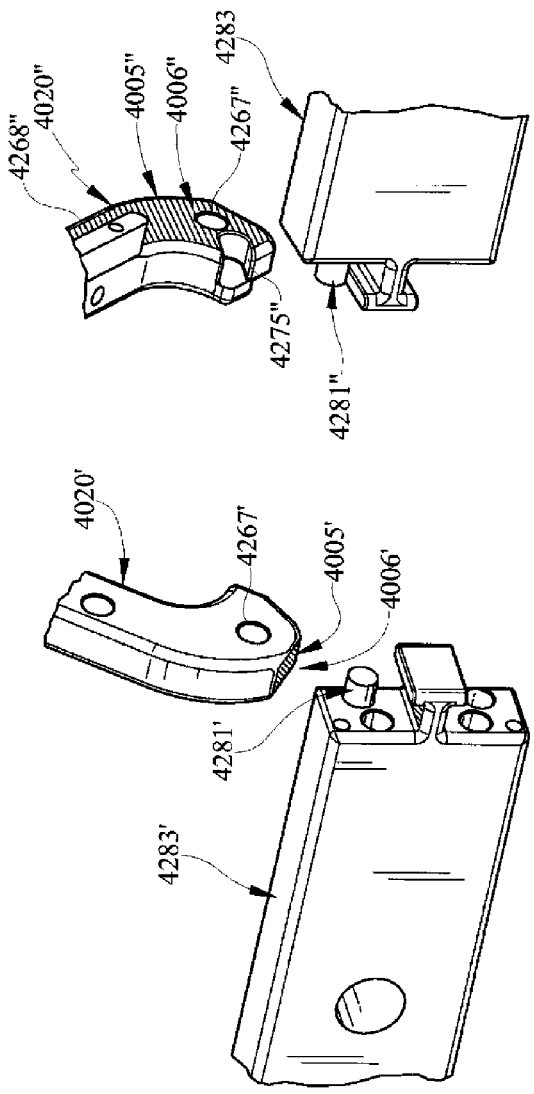
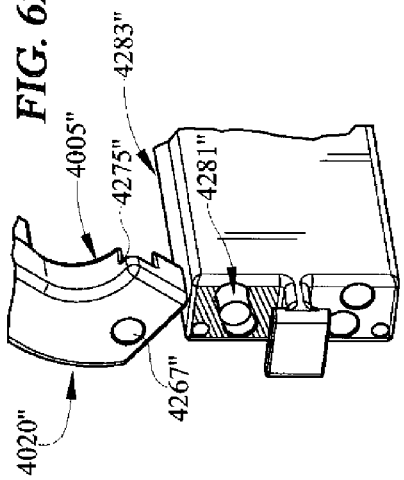
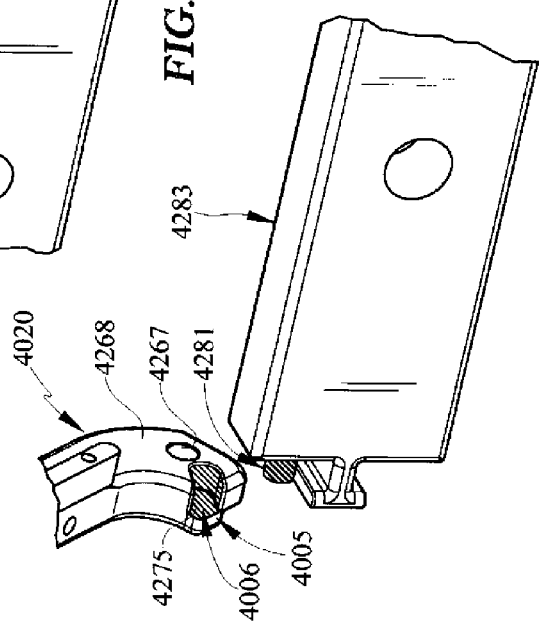
FIG. 62A
FIG. 62B
FIG. 61
FIG. 60

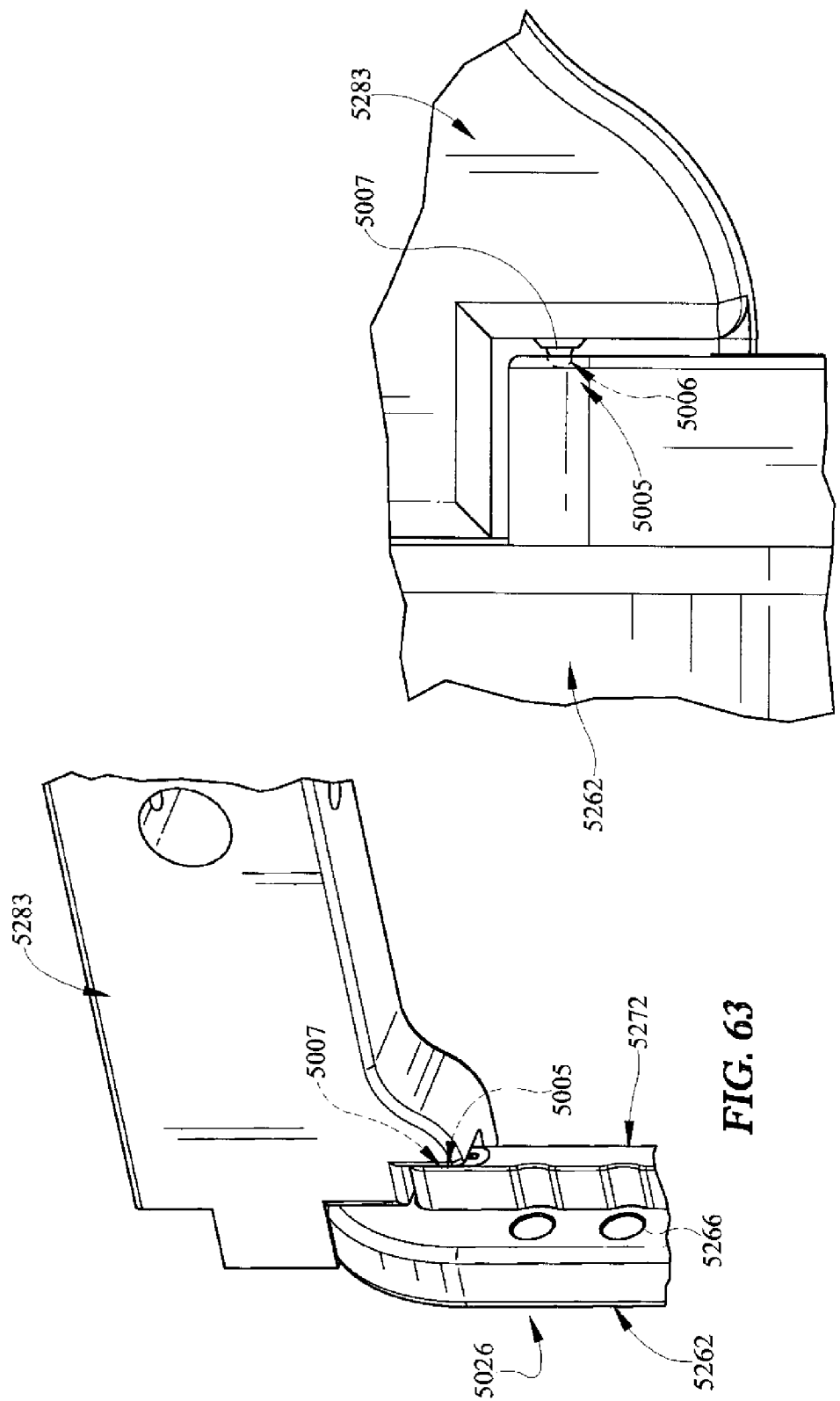

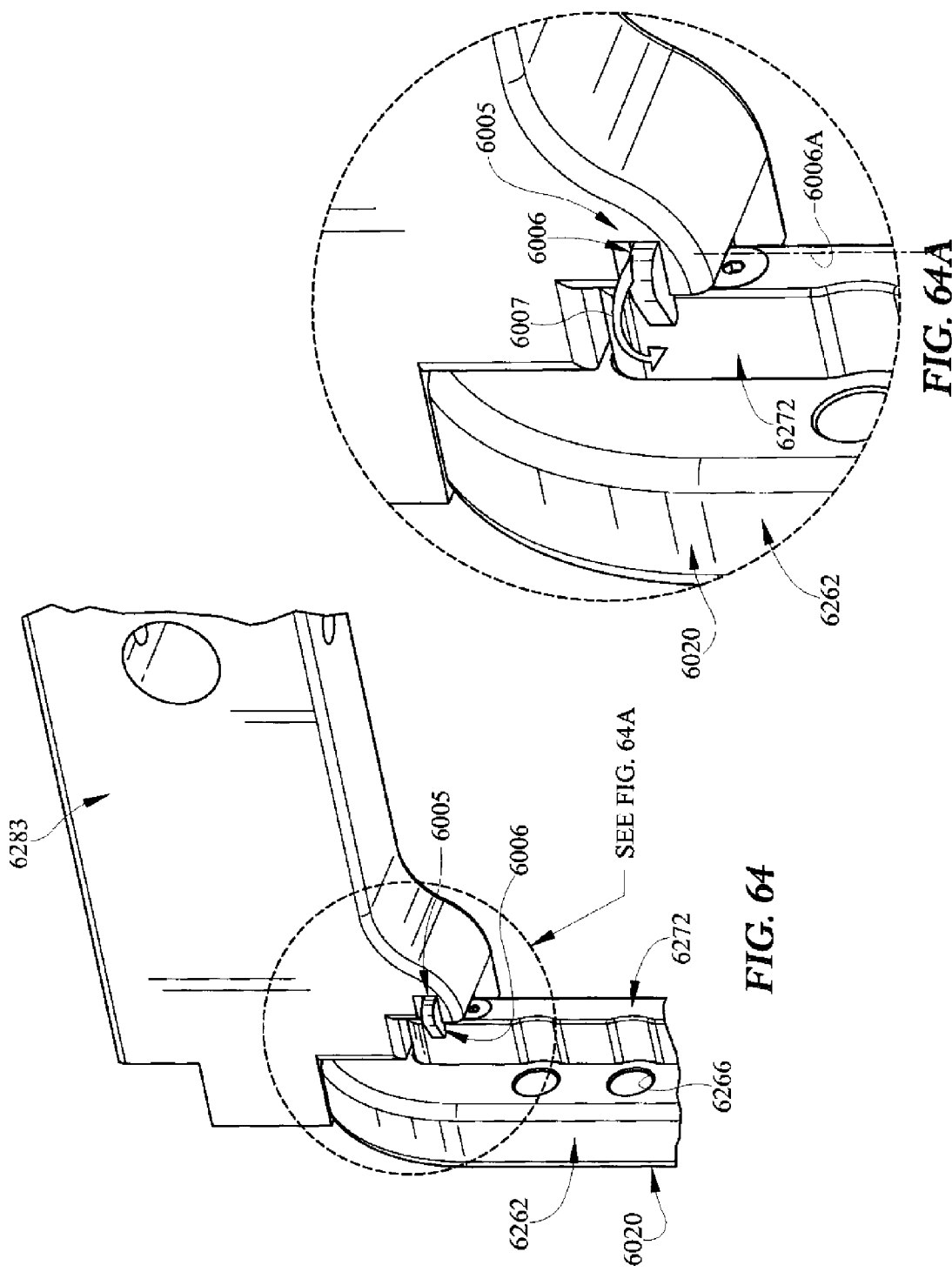

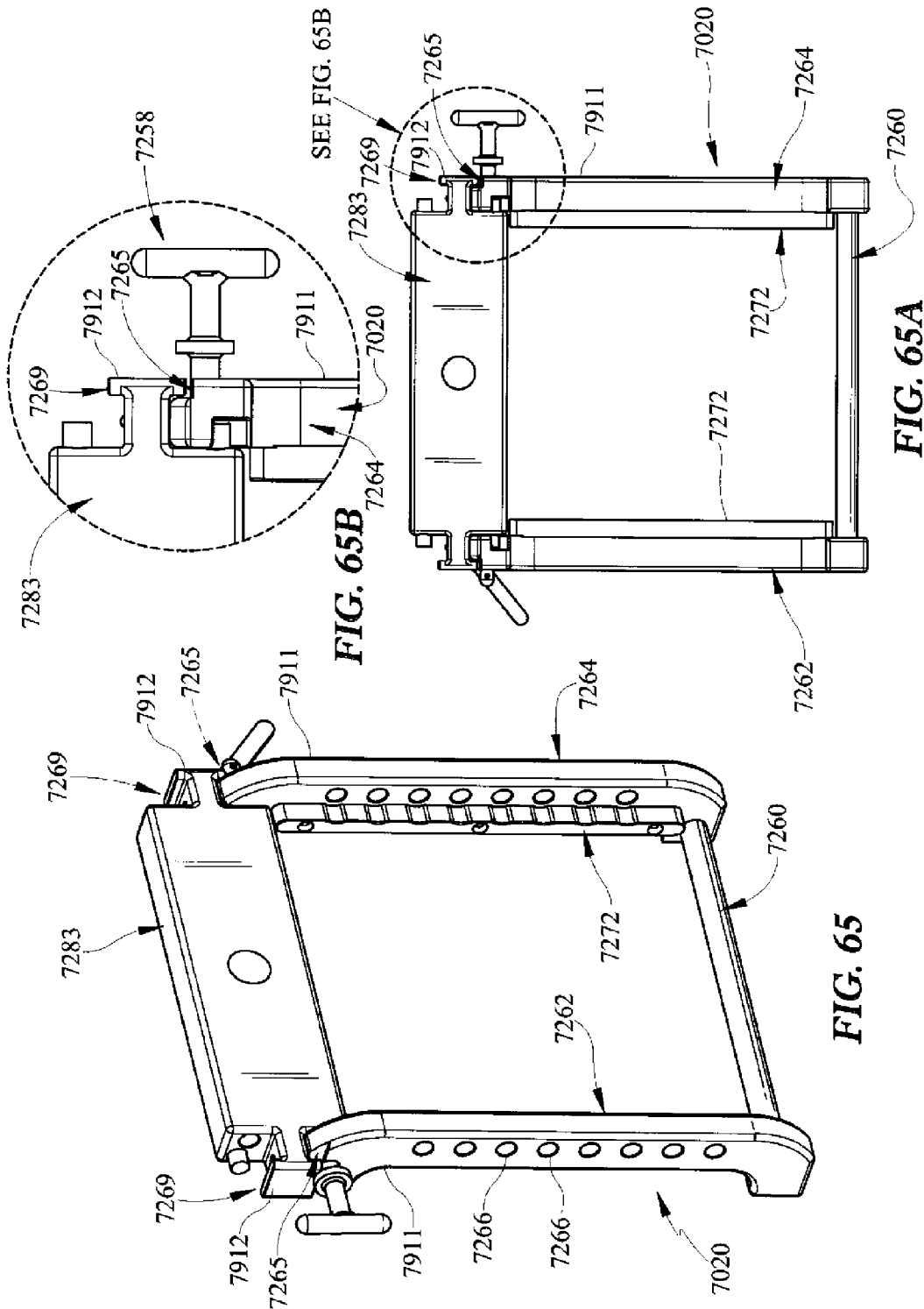

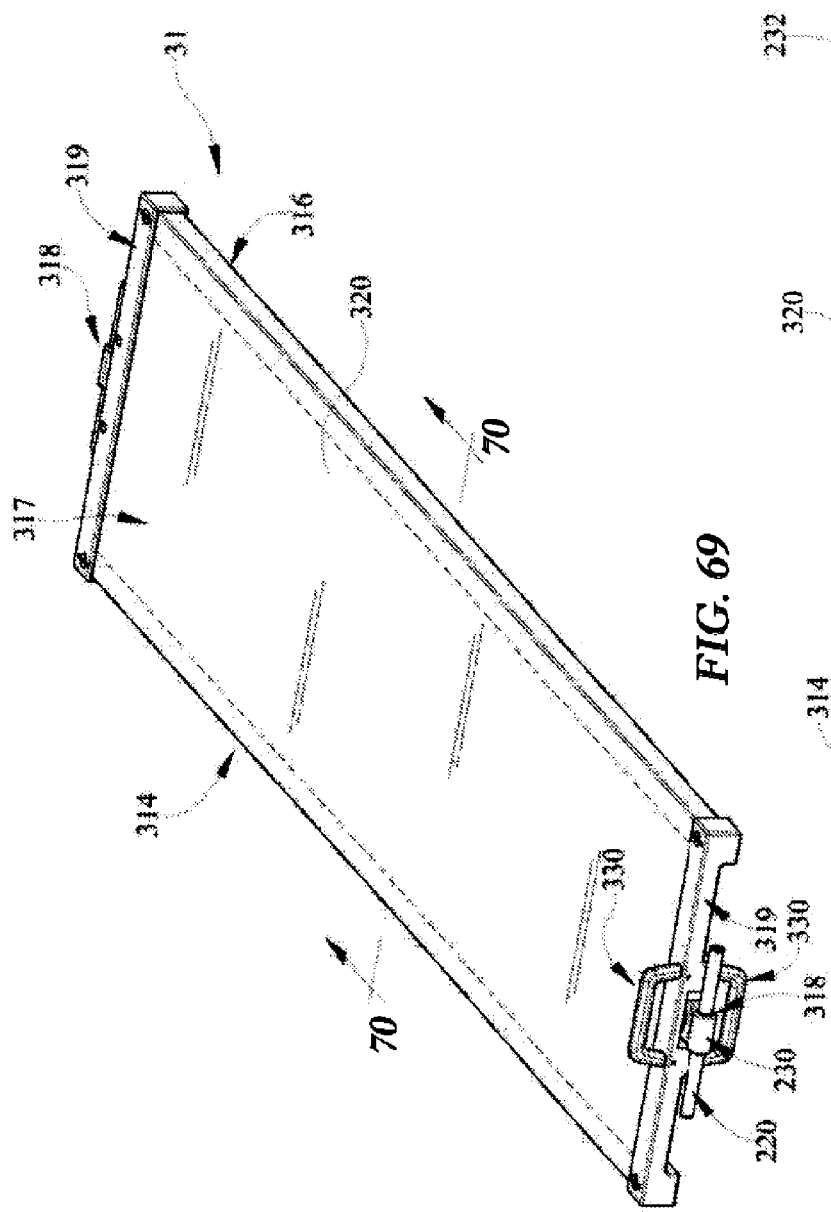
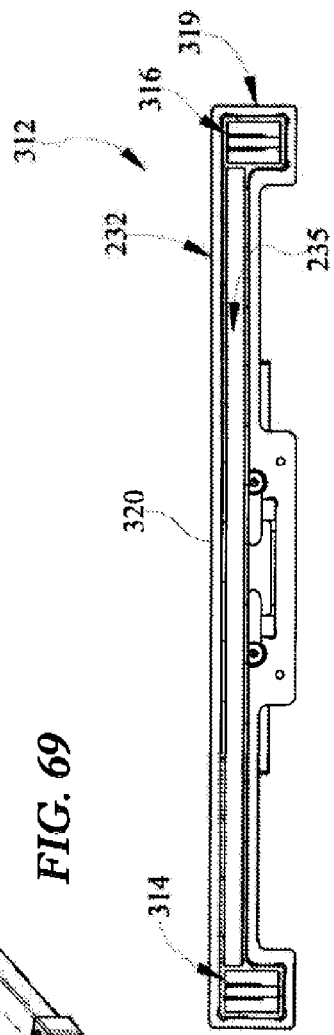
FIG. 69
FIG. 70

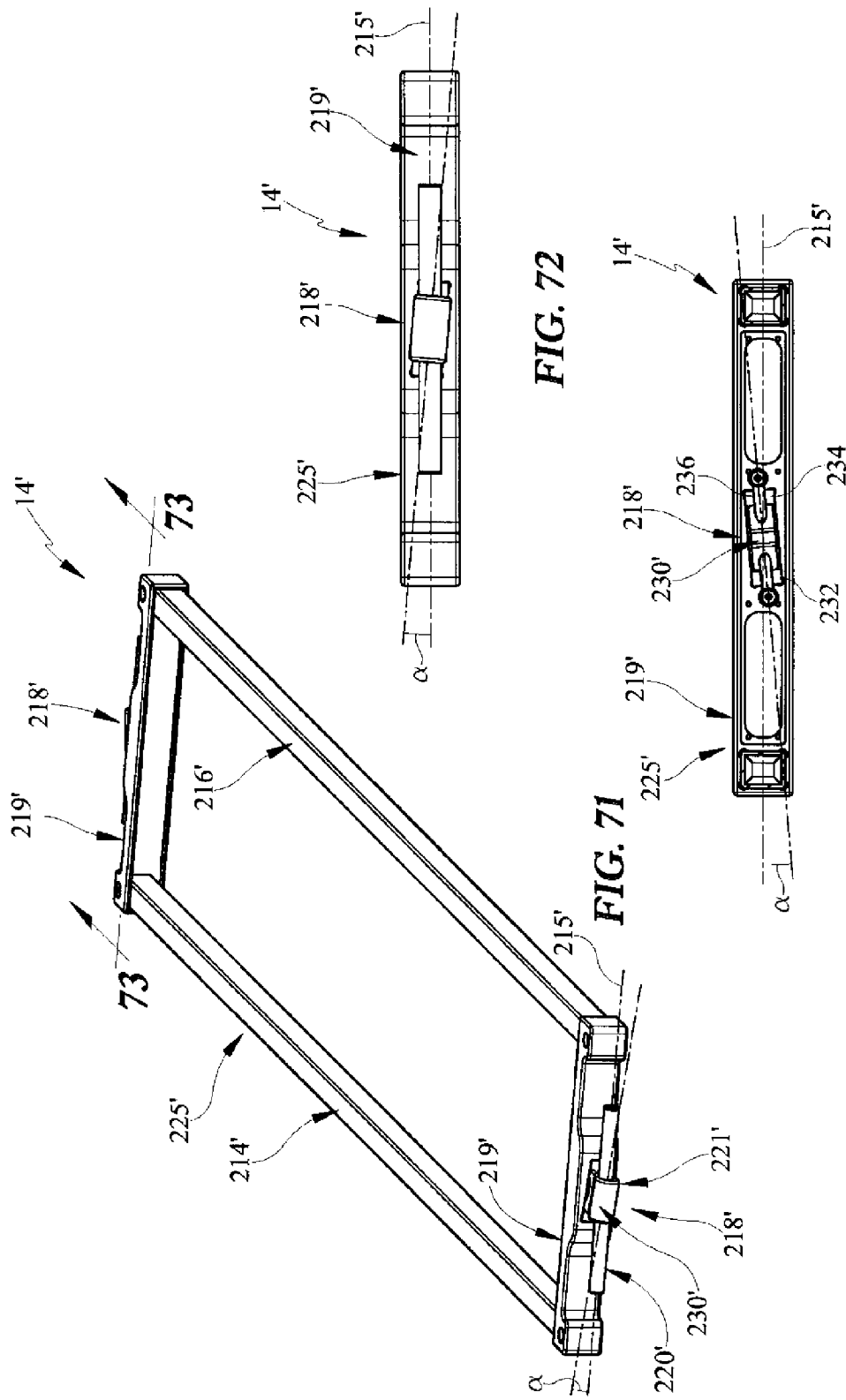

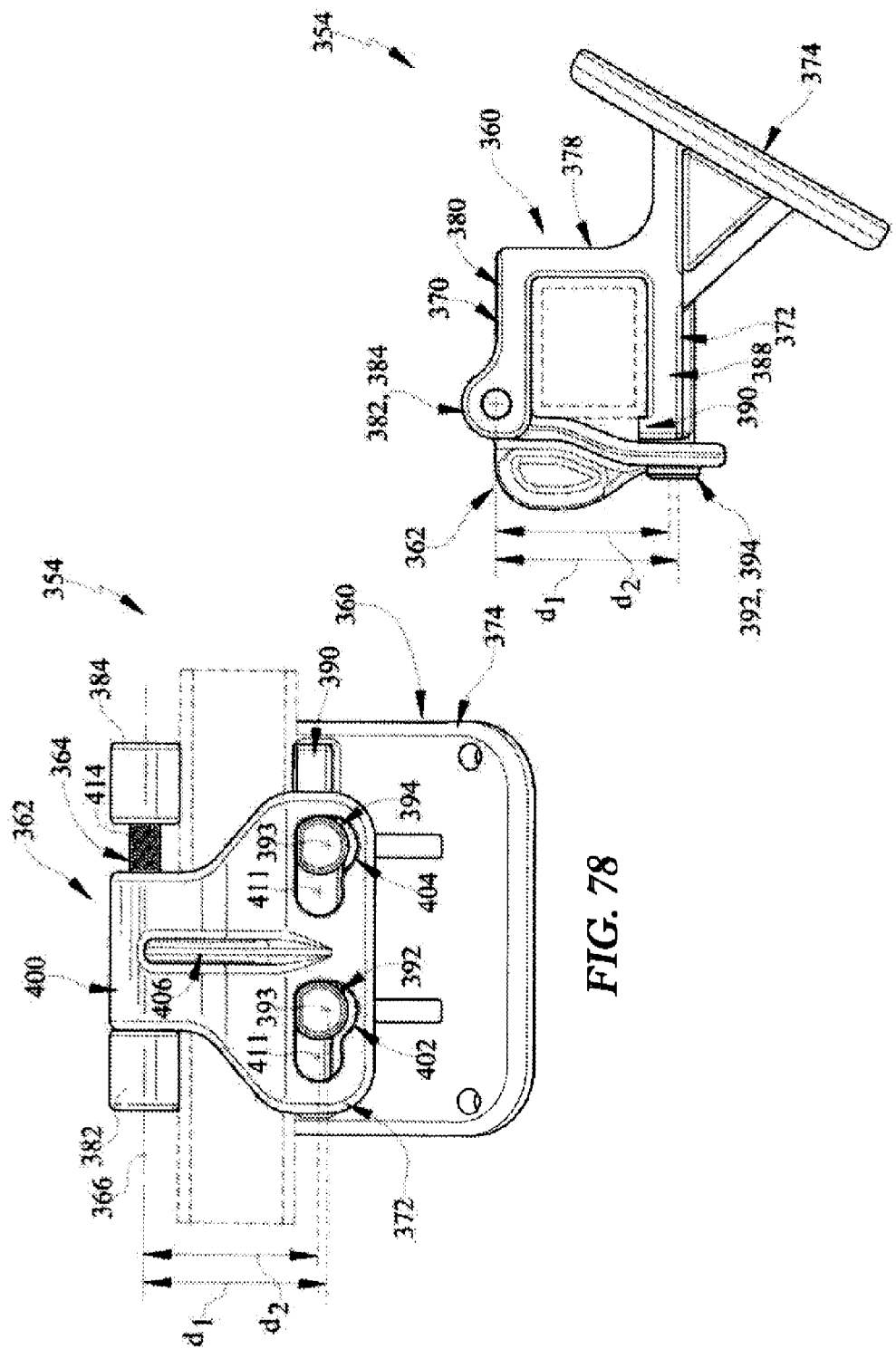

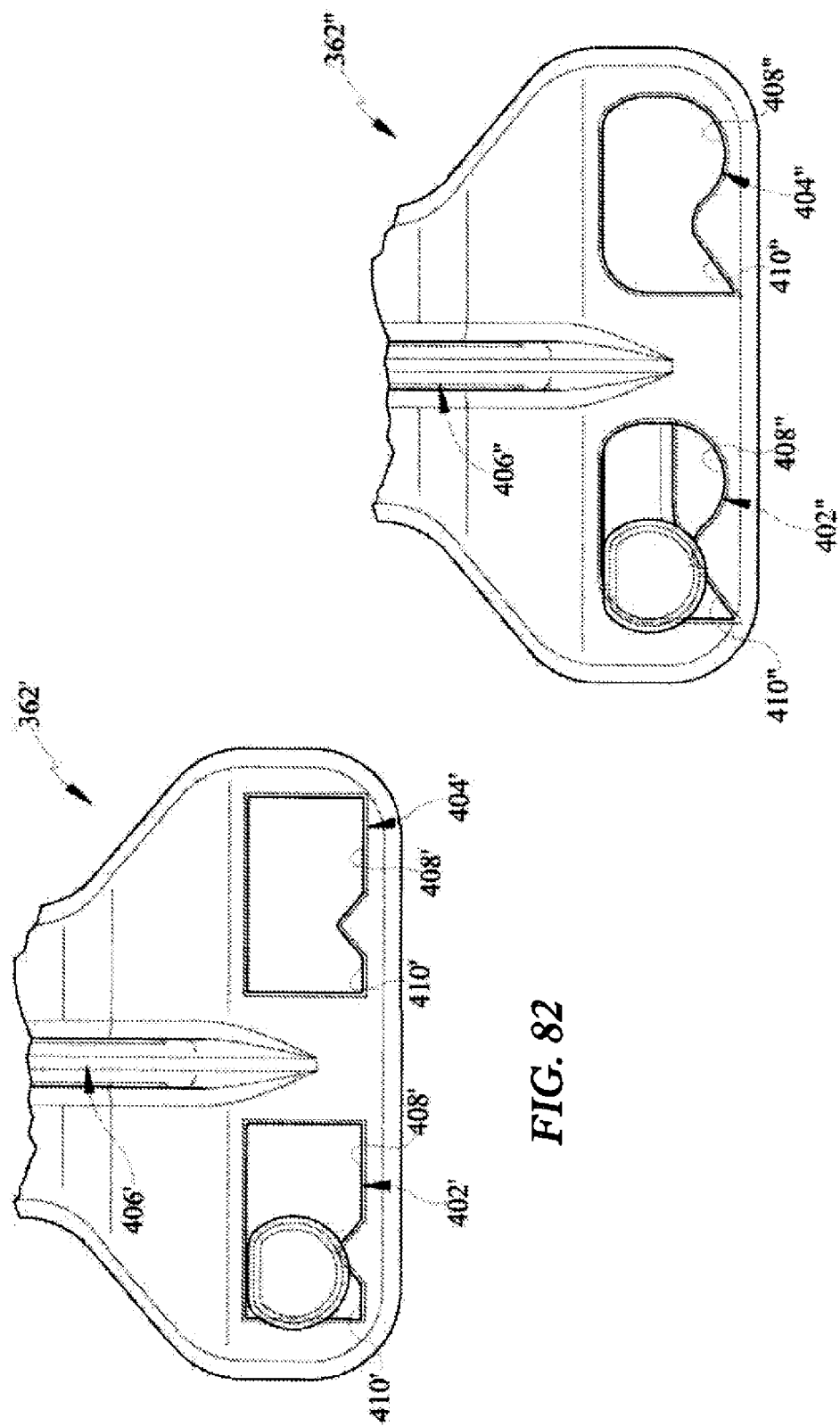

DUAL COLUMN SURGICAL SUPPORT SYSTEM

CROSS REFERENCE TO RELATED APPLICATIONS

The present application claims the benefit, under 35 U.S.C. §119(e), of U.S. Provisional Application No. 61/624,626 filed Apr. 16, 2012, U.S. Provisional Application No. 61/647,950 filed on May 16, 2012, and U.S. Provisional Application No. 61/703,561 filed on Sep. 20, 2012, each of which is hereby incorporated by reference herein.

BACKGROUND

The present disclosure relates to patient support apparatuses such as are used to support a patient in different positions. More particularly, the present disclosure relates to surgical tables used during surgery to support a patient in a predetermined position or number of positions. However, the present disclosure may also be applicable to other types of patient support apparatuses such as hospital beds, home care beds, x-ray tables, therapy supports, wheel chairs, and the like.

Sometimes, surgical tables allow adjustment of the table prior to surgery so that patients can be properly supported or held in place for a particular surgical operation. Also, some surgical tables allow adjustment during surgery so that a patient is moved to different positions during an operation. Many such surgical tables are difficult to adjust prior to and/or during surgery.

SUMMARY

The present application discloses one or more of the features recited in the appended claims and/or the following features which, alone or in any combination, may comprise patentable subject matter:

According to the present disclosure, a patient support apparatus may include a caster, a brake drive, and a linkage. The caster may include a stem, a wheel coupled to the stem to rotate about an wheel axis relative to the stem, and a braking element movable from a disengaged position allowing rotation of the wheel relative to the stem to an engaged position blocking the wheel from rotation relative to the stem. The brake drive may include a mount and a linear actuator coupled to the mount. The linear actuator may move from a retracted position to an extended position relative to the mount. The linkage may be coupled to the braking element of the caster and to the linear actuator of the brake drive.

In some embodiments, the linkage may be configured to transfer motion of the linear actuator from the retracted position to the extended position to the braking element to move the braking element from the disengaged position to the engaged position. The linkage may further be configured to selectively move the braking element from the engaged position to the disengaged position while the linear actuator is in the extended position so that a user can free the wheel of the caster to rotate even if the actuator is stuck in the extended position.

In some embodiments, the linkage may include a shaft coupled to the mount to slide relative to the mount and a release assembly coupled to the linear actuator. The release assembly may be configured to couple the shaft to the linear actuator so that the shaft slides relative to the mount during movement of the linear actuator from the retracted position to the extended position and to selectively release the shaft from the linear actuator when the linear actuator is in the extended position.

In some embodiments, the linkage may include a spring coupled to the shaft and the mount. The spring may be configured to move the shaft when the shaft is released from the linear actuator by the release assembly.

In some embodiments, the linkage may include a pivot connector coupled to the shaft for movement about a connector axis. The pivot connector may be coupled to the braking element of the caster to convert linear motion from the linear actuator into rotating motion applied to the braking element.

In some embodiments, the release assembly may include a plate and a handle coupled to the plate. The plate may be movable from a first position in which the plate couples the shaft to the linear actuator for movement therewith to a second position in which the plate releases the shaft from the linear actuator for motion independent of the shaft. The plate may move from the first position to the second position in response to a user moving the handle.

In some embodiments, the plate may be biased toward the first position. In some embodiments, the plate may be coupled to the linear actuator to pivot about a plate axis relative to the linear actuator. In some embodiments, the plate may be formed to include a slot that receives a pin coupled to the shaft. In some embodiments, the plate may be formed to include a hole through which the shaft extends, the hole having a first section sized to engage the shaft and a second section sized to allow the shaft to slide through the plate.

According to another aspect of the present disclosure, a patient support apparatus may include a pair of casters, a brake drive, and a linkage. The pair of casters may each include a stem, a wheel coupled to the stem to rotate about an wheel axis relative to the stem, and a braking element movable from a disengaged position allowing the wheel to rotate relative to the stem to an engaged position blocking the wheel from rotation relative to the stem. The brake drive may include a mount and an actuator coupled to the mount. The actuator may move from a first position to a second position relative to the mount. The linkage may be coupled to the braking element of each of the casters and to the actuator of the brake drive.

In some embodiments, the linkage may be configured to transfer motion of the actuator during motion from the first position to the second position to the braking elements. The linkage may further be configured to selectively move the braking elements from the engaged position to the disengaged position while the linear actuator is in the second position.

In some embodiments, the linkage may include an actuation member coupled to the actuator for movement therewith, a rod assembly coupled to the braking elements of the casters, and a plate coupled to the actuation member and to the rod assembly. In some embodiments, the plate may be coupled to the actuation member to pivot relative to the actuation member about a plate axis. In some embodiments, the rod assembly may include a shaft slidable along a shaft axis, a first pivot connector coupled to the shaft and to one of the braking elements included in one of the casters, and a second pivot connector coupled to the shaft and to the other of the braking elements included in the other of the casters.

In some embodiments, the rod assembly may further include a pin extending outwardly from the shaft and received in a slot formed in the plate. In some embodiments, the shaft may extend through a hole formed in the plate. In some embodiments, the actuation member may be a slider coupled to the shaft to slide along the shaft axis relative to the shaft.

According to another aspect of the present disclosure, a patient support apparatus may include a foundation frame, a patient support top, and a brake system. The foundation frame may include a first column and a second column spaced apart from the first column. The patient support top may be suspended from the first column and the second column for rotation about a support-top axis extending from the first column to the second column. The brake system may include a caster with a braking element coupled to the first column, a brake drive coupled to the first column, and a linkage coupled to the caster and to the brake drive.

In some embodiments, the linkage may be configured to transfer motion from the brake drive to the braking element of the caster to brake the caster. The linkage may also be configured to selectively move the braking element of the caster to unbrake the caster while the brake drive remains stationary.

In some embodiments, the brake drive may include a mount coupled to the first column and a linear actuator coupled to the mount. The linkage may include an actuation member coupled to the linear actuator for movement therewith, a rod assembly coupled to the braking element of the caster, and a plate coupled to the actuation member and to the rod assembly. The plate may be coupled to the actuation member to pivot relative to the actuation member about a plate axis.

According to another aspect of the present disclosure, a surgical patient support may include a foundation frame and a support top. The foundation frame may include a rotation driver, a drive shaft, and a drive coupler. The support top may be coupled to the drive shaft of the foundation frame and may rotate with the drive shaft. The support top may be configured to rotate relative to the foundation frame about a top axis extending along the length of the support top. The drive coupler of the foundation frame may be configured to move between an engaged position, coupling the drive shaft to the rotation driver so that the support top is rotated about the top axis, and a disengaged position, de-coupling the drive shaft from the rotation drive so that the support top is free to be manually rotated about the top axis.

In some embodiments, the drive coupler may include a first engagement member that extends through the rotation driver and into the drive shaft when the drive coupler is in the engaged position. The first engagement member may be withdrawn from the drive shaft when the drive coupler is in the disengaged position.

In some embodiments, the drive coupler may include a second engagement member that extends through the rotation driver and into the drive shaft when the drive coupler is in the engaged position. The second engagement member may be withdrawn from the drive shaft when the drive coupler is in the disengaged position.

In some embodiments, the drive coupler may include an engagement slider, a handle, and a biasing spring. The engagement slider may slide between a first position and a second position, the first position corresponding to the engaged position of the drive coupler and the second position corresponding to the disengaged position of the drive coupler. The engagement slider may slide along the top axis to move between the first position and the second position. In some embodiments, the biasing spring may bias the engagement slider toward the first position.

In some embodiments, the drive coupler may include a cover plate formed to include a guide track. The handle may be coupled to the engagement slider and may extend away from the engagement slider through the guide track of the cover plate.

According to another aspect of the present disclosure, a brake system for a patient support apparatus may include at least two casters, a powered actuator, and a releasable linkage. The at least two casters may be movable between a braked configuration and an unbraked configuration. The powered actuator may be configured to move the at least two casters between the braked configuration and the unbraked configuration. The releasable linkage may be coupled between the at least two casters and the brake drive. The releasable linkage may be configured to disconnect the at least two casters from the brake drive when the at least two casters are in the braked configuration and to move the at least two casters from the braked configuration to the unbraked configuration.

In some embodiments, each of the casters may include a stem, a hub coupled to the stem and configured to pivot about a vertical axis relative to the stem, a wheel coupled to the hub and configured to rotate about a horizontal axis relative to the hub, and a braking element. The braking elements of the at least two casters may be movable between a disengaged position, allowing the hubs to pivot about the vertical axes and allowing the wheels to rotate about the horizontal axes, and an engaged position, blocking the hubs from pivoting about the vertical axes and blocking the wheels from rotating about the horizontal axes. The braking elements may be in the disengaged position when the casters are in the unbraked configuration and the braking elements may be in the engaged position when the casters are in the braked configuration.

In some embodiments, the at least two casters may include at least four casters. Each of the casters may include a stem, a hub coupled to the stem and configured to pivot about a vertical axis relative to the stem, a wheel coupled to the hub and configured to rotate about a horizontal axis relative to the hub, and a braking element. The braking element may be movable between a disengaged position, allowing the hubs to pivot about the vertical axes and allowing the wheels to rotate about the horizontal axes, and an engaged position, blocking the hubs from pivoting about the vertical axes and blocking the wheels from rotating about the horizontal axes.

In some embodiments, the releasable linkage may include a plunger configured to be pulled by a user to disconnect the at least two casters from the brake drive. It is contemplated that the releasable linkage may include a biasing spring configured to move the at least two casters from the braked configuration to the unbraked configuration when the at least two casters are disconnected from the brake drive.

In some embodiments, the releasable linkage may include a spring biasing the plunger away from being pulled out by a user. It is contemplated that, the powered actuator may be a linear actuator.

According to another aspect of the present disclosure, a surgical patient support top for use with a foundation frame is disclosed. The surgical patient support top may include a support frame and a motion coupler. The support frame may include a first rail, a second rail spaced apart from and parallel to the first rail, and a cross beam. The motion coupler may include a connector configured to be coupled to the foundation frame and a joint coupled to the cross beam and to the connector. The joint may be configured to allow the connector to slide and shift relative to the crossbeam.

In some embodiments, the joint may include an arm extending from the connector and into a beam slot formed in the cross beam. The joint may include a first resilient bumper situated along a first side of the slot formed in the cross beam and a second resilient bumper situated along a second side, opposite the first side, of the slot formed in the cross beam. The first resilient bumper and the second resilient bumper may be formed from rubber.

In some embodiments, the joint may include a retainer configured to resist removal of the arm from the slot formed in the cross beam. The retainer may include a retainer pin extending through an arm slot formed in the arm and a spring extending from the retainer pin to the arm.

In some embodiments, the first rail may include a number of indicators spaced at predetermined intervals along the length of the first rail. It is contemplated that the second rail may include a number of indicators spaced at predetermined intervals along the length of the second rail. Each indicator on the first rail may correspond to an indicator on the second rail. The indicators of the first rail and the indicators of the second rail may be lines extending perpendicular to the length of the first rail and the second rail.

According to another aspect of the present disclosure, a yoke bracket for coupling a patient support top to a foundation frame is disclosed. The yoke bracket may include a base member, a left coupling member, a right coupling member, a left ledge and a right ledge.

In some embodiments, the left coupling member may be coupled to the base member and may extend substantially perpendicular to the base member. The left coupling member may be formed to include a number of attachment holes situated between a front surface and a back surface of the left coupling member, the attachment holes extending through the left coupling member parallel to the base member.

In some embodiments, the right coupling member may be coupled to base member and may extend substantially perpendicular to the base member. The right coupling member may be formed to include a number of attachment holes situated between a front surface and a back surface of the right coupling member. The attachment holes may extend through the right coupling member parallel to the base member.

In some embodiments, the left ledge may extend from the left coupling member toward the right coupling member and may be arranged along the back surface of the left coupling member. The right ledge may extend from the right coupling member toward the left coupling member and may be arranged along the back surface of the right coupling member.

In some embodiments, the left ledge may be formed to include a number of notches, each notch corresponding to and aligned with an attachment hole of the left coupling member and extending into the ledge away from the corresponding hole. The right ledge may be formed to include a number of notches, each notch corresponding to and aligned with an attachment hole of the right coupling member and extending into the ledge away from the corresponding hole.

In some embodiments, the number of attachment holes formed in the left coupling member may be arranged along a line spaced apart from and extending perpendicular to the base member. The left coupling member may be formed to include a coupling hole extending through the right coupling member parallel to the base member and arranged out of alignment with the number of attachment holes.

In some embodiments, the number of attachment holes formed in the right coupling member may be arranged along the line spaced apart from and extending perpendicular to the base member. The right coupling member may be formed to include a coupling hole extending through the right coupling member parallel to the base member and arranged out of alignment with the number of attachment holes.

In some embodiments, each of the attachment holes of the left coupling member may be aligned with a corresponding attachment hole of the right coupling member. Each of the left and the right coupling members may include a series of markings associating each pair of corresponding attachment holes.

According to another aspect of the present disclosure, a rail coupler for coupling an accessory to a rail is taught. The accessory rail coupler may include a bracket and a flap. The bracket may include a first jaw and a second jaw cooperating with the top wall to define a rail opening sized to receive the rail. The flap may be coupled to the first jaw for pivotable movement relative to the first jaw about an axis. One of the second jaw and the flap may include a first headed post and the other of the second jaw and the flap may be formed to include an first post opening. The flap may be configured to pivot between an open position, wherein the first headed post is withdrawn from the first post opening, and a closed position wherein the first headed post is received in the first post opening.

In some embodiments, the first post opening may be formed to include a first section sized to allow the head of the first post to be received in the first post opening and a second section sized to block the headed first post from withdrawing from the first post opening. The flap may be slidable relative to the bracket along the axis between the closed position, wherein the first headed post is received in the first section of the first opening and the flap is free to pivot relative to the bracket, and a clamped position, wherein the headed bracket is received in the second section of the first post opening and the flap is blocked from pivoting relative to the bracket.

In some embodiments, the first headed post may be coupled to the second jaw and the first post opening is formed in the flap. In some such embodiments, the second jaw may include a second headed post and the first opening may be formed to include a second post opening. The second headed post may be configured to be received in the second post opening when the flap is in the closed position. The second post may be blocked from being withdrawn from the second post opening when the flap is in the clamped position.

In some embodiments, the flap may pivot relative to the bracket between the open position and the closed position about a pivot pin extending along the pivot axis. It is contemplated that the center line of the first headed post may be spaced a first distance from the pivot pin. The center line of the second section of the first post opening may be spaced a second distance from the pivot pin. The second distance may be smaller than the first distance.

In some embodiments, the rail coupler may include an unlocked indicator configured to be displayed when the flap is slid away from the clamped position and a locked indicator configured to be displayed with the flap is slid to the clamped position. The pivot pin may include a first portion marked with the unlocked indicator and a second portion marked with the locked indicator. The locked indicator may be blocked from view when the flap is slid away from the clamped position and the locked indicator may be blocked from view when the flap is slid to the clamped position According to another aspect of the present disclosure, a surgical patient support may include a foundation frame, a support top, and a rotation system. The foundation frame may include a first column and a second column spaced from the first column. The support top may be supported between the first column and the second column of the foundation frame and may rotate about a top axis. The rotation system may include a rotation driver configured to drive rotation of the support top about the top axis and a rotation brake configured to resist rotation of the support top about the top axis. The rotation driver may be coupled to the first column and the rotation brake may be coupled to the second column.

In some embodiments, the rotation brake may include a shaft, a friction member, and an actuation linkage. The shaft may be configured to be coupled to the support top. The friction member may be configured to move between a first position allowing rotation of the shaft and a second position resisting rotation of the shaft. The actuation linkage may be configured to move the friction member from the first position to the second position.

In some embodiments, the actuation linkage may include a linear actuator. The actuation linkage may include a pivot arm configured to convert linear motion of the linear actuator into rotational movement. The actuation linkage may include a cam coupled to the pivot arm and configured to move the friction member from the first position to the second position.

In some embodiments, the friction member may be a clamp including an upper jaw and a lower jaw. The lower jaw may be moved toward the upper jaw when the friction member moves from the first position to the second position. The friction member may be U-shaped. The lower jaw may follow a cam included in the actuation linkage when the friction member moves from the first position to the second position.

In some embodiments, the rotation brake may be coupled to the second column. In some such embodiments, the rotation brake may be slidable relative to the second column.

According to another aspect of the present disclosure, a surgical patient support may include a foundation frame, a support top, and a surgical traction device. The foundation frame may include a first column and a hollow shaft supported by the first column for rotation relative thereto. The support top may be coupled to the shaft of the foundation frame to rotate with the shaft relative to the first column. The surgical traction device may include a traction attachment configured to be coupled to a patient during surgery, a force provider, and a link that may extend through the shaft from the patient coupler to the force provider.

In some embodiments, the force provider may be a weight coupled to the link. The traction attachment may be configured to be coupled to a patient's head to provide cervical traction.

In some embodiments, the link may include a cable. The cable may be guided by a horizontal pulley coupled to the first column and a vertical pulley coupled to the first column.

According to another aspect of the present disclosure a surgical patient support includes a foundation frame, a support top, and a brake system. The foundation frame includes a first column having a first base, a left caster coupled to the first base, a right caster coupled to the first base, and an upright extending up from the first base. The support top is coupled to the upright of the first column for rotation about a rotation axis extending along a longitudinal axis of the support top. The brake system includes a first plunger mounted to the first base for movement from a retracted position to an extended position and an actuator for moving the first plunger from the retracted position to the extended position. The first plunger in the retracted position is disengaged from the floor to allow the left caster and the right caster of the first column to roll along the floor. The first plunger in the extended position is engaged with the floor to lift the left caster and the right caster of the first column away from the floor to prevent the left caster and the right caster of the first column from rolling along the floor.

In some embodiments, the left caster and the right caster of the first column may contact the floor when the first plunger is in the retracted position. The left caster and the right caster of the first column may be spaced apart from the floor when the first plunger is in the extended position.

The foundation frame may include a second column having a second base, a left caster coupled to the second base, a right caster coupled to the second base, and an upright extending up from the second base. The braking system may include a second plunger mounted to the second base for movement from a retracted position to an extended position. The second plunger in the retracted position may be disengaged from the floor to allow the left caster and the right caster of the second column to roll along the floor. The first plunger in the extended position may be engaged with the floor to lift the left caster and the right caster of the second column away from the floor to prevent the left caster and the right caster of the second column from rolling along the floor.

In some embodiments, the first plunger may be spaced apart from and located between the left caster and the right caster of the first column. The second plunger may also be spaced apart from and located between the left caster and the right caster of the second column.

In some embodiments, the braking system may include a third plunger spaced apart from and located between the left caster and the right caster of the first column. The third plunger may be mounted to the first base for movement from a retracted position to an extended position. The braking system may also include a fourth plunger spaced apart from and located between the left caster and the right caster of the second column. The fourth caster may be mounted to the second base for movement from a retracted position to an extended position.

In some embodiments, the braking system may include a third plunger mounted to the first base for movement from a retracted position to an extended position. The braking system may also include a fourth plunger mounted to the second base for movement from a retracted position to an extended position.

In some embodiments, the first plunger may be located between a pair of wheels included in the left caster of the first column. The second plunger may be located between a pair of wheels included in the left caster of the second column. The third plunger may be located between a pair of wheels included in the right caster of the first column. The fourth plunger may be located between a pair of wheels included in the right caster of the second column.

In some embodiments, the brake system may include a user input coupled to the upright of the first column. The actuator may be configured to move the first plunger between the retracted position and the extended position in response to a signal from the user input.

In some embodiments, the brake system may include a releasable linkage coupled between the first plunger and the actuator. The releasable linkage may be configured to disconnect the first plunger from the actuator when the first plunger is in the extended position. The first plunger may be biased toward the retracted position when the first plunger is disconnected from the actuator.

According to another aspect of the present disclosure, a surgical patient support includes a foundation frame, a support top, and a brake system. The foundation frame includes a first column having a first base, a left caster coupled to the first base, a right caster coupled to the first base, and an upright extending up from the first base. The support top is coupled to the upright of the first column for rotation about a rotation axis extending along a longitudinal axis of the support top. The brake system includes a first ring mounted to the first base for movement from a raised position to a lowered position and an actuator for moving the first ring from the raised position to the lowered position. The first ring in the raised position is disengaged from the left caster of the first column to allow the left caster to roll along the floor. The first ring in the lowered position is engaged with the left caster of the first column to block the left caster of the first column from rolling along the floor.

In some embodiments, the foundation frame includes a second column spaced apart from the first column. The second column may include a second base, a left caster coupled to the second base, a right caster coupled to the second base, and an upright extending up from the second base.

In some embodiments, the brake system may include a second ring mounted to the second base for movement from a raised position to a lowered position. The second ring in the raised position may be disengaged from the left caster of the second column to allow the left caster to roll along the floor. The second ring in the lowered position may be engaged with the left caster of the second column to block the left caster of the second column from rolling along the floor.

In some embodiments, the brake system may include a third ring mounted to the first base for movement from a raised position to a lowered position and a fourth ring mounted to the second base for movement from a raised position to a lowered position. The third ring in the raised position may be disengaged from the right caster of the first column to allow the right caster to roll along the floor. The third ring in the lowered position may be engaged with the right caster of the first column to block the right caster of the first column from rolling along the floor. The fourth ring in the raised position may be disengaged from the right caster of the second column to allow the right caster to roll along the floor. The fourth ring in the lowered position may be engaged with the right caster of the second column to block the right caster of the second column from rolling along the floor.

In some embodiments, the brake system may include a user input coupled to the upright of the first column. The actuator may be configured to move the first ring between the raised position and the lowered position in response to a signal from the user input.

According to another aspect of the present disclosure, a yoke bracket is disclosed for coupling a patient support top to a foundation frame including a connection block with retainer pegs. The yoke bracket includes a base member, a left coupling member, a right coupling member, and secondary retainer means. The left coupling member is coupled to base member and extends substantially perpendicular to the base member. The left coupling member is formed to include a retainer slot adapted to receive the retainer pegs of the connector block when the yoke bracket is coupled to the coupler block. The right coupling member is coupled to base member and extends substantially perpendicular to the base member with an interior side facing an interior side of the left coupling member. The right coupling member is formed to include a retainer slot adapted to receive the retainer pegs of the connector block when the yoke bracket is coupled to the coupler block. The secondary retainer means is configured to resist movement of the yoke bracket away from engagement with the connection block when the yoke bracket is coupled to the connection block. Thus the patient support top is held in place relative to the foundation frame unless the yoke bracket is acted upon by a user.

In some embodiments, the secondary retainer means may include a spring-loaded ball coupled to the bracket. The spring-loaded ball may be sized to be received in a divot formed in the connector block. Illustratively some embodiments, the spring-loaded ball may extend from the interior side of the right coupling member toward the left coupling member.

In some embodiments, the spring-loaded ball may be located in the retainer slot. The secondary retainer means may include a pair of spring-loaded balls. The pair of spring-loaded balls may each extending in to the retainer slot.

In some embodiments, the secondary retainer means may include a latch coupled to the left coupling member for pivotable movement about a pivot axis extending parallel to the base member. The latch may move from an open position that allows the retainer peg of the connector block to enter the retainer slot of the left coupling member to a closed position that blocks the retainer peg of the connector block from moving out of the retainer slot of the left coupling member.

In some embodiments, the secondary retainer means may include a friction pad formed on a surface of the yoke bracket and arranged to contact the connector block. The retainer slot may be defined by a sidewall and a floor, and the friction pad may be formed on the sidewall. The friction pad may be formed on the interior surface of the left coupling member. The friction pad may be formed on the surface of the yoke bracket is arranged to contact a friction pad formed on a surface of the connector block.

In some embodiments, the left retention slot may extend through the left coupling member. The right retention slot may also extend through the right coupling member.

In some embodiments, the retainer slot is defined by a sidewall and a floor. The secondary retention means may include a peg-recess pocket extending into the floor of the retainer slot. The peg-recess pocket may be sized to receive a retainer peg of the connector block. The peg-recess pocket may be cylindrical.

According to another aspect of the present disclosure, a surgical patient support top for use with a foundation frame is taught. The surgical patient support top includes a support top frame and a motion coupler. The support frame includes a first rail, a second rail spaced apart from and parallel to the first rail, and a cross beam extending from the first rail to the second rail. The motion coupler includes a connector configured to be coupled to the foundation frame for movement about a horizontal axis so that the support frame is free to pivot relative to the foundation frame about the horizontal axis. The motion coupler also includes a joint coupled to the connector and coupled to the cross beam of the support frame for slidable movement relative to the cross beam so that the support frame is free to slide relative to the foundation frame.

In some embodiments, the joint may include an arm extending from the connector and into a beam slot formed in the cross beam. The beam slot may be angled relative to the longitudinal axis of the cross beam so that the support frame shifts and slides relative to the cross beam in a plane that intersects the horizontal axis at only one point.

In some embodiments, the joint may include a first resilient bumper situated along a first side of the slot formed in the cross beam and a second resilient bumper situated along a second side, opposite the first side, of the beam slot. The joint may include a retainer configured to resist removal of the arm from the slot formed in the cross beam.

Additional features, which alone or in combination with any other feature(s), such as those listed above and those listed in the claims, may comprise patentable subject matter and will become apparent to those skilled in the art upon consideration of the following detailed description of various embodiments exemplifying the best mode of carrying out the embodiments as presently perceived.

BRIEF DESCRIPTION OF THE DRAWINGS

The detailed description particularly refers to the accompanying figures, in which:

FIG. 5 is a perspective view of the patient support of FIG. 1 showing a patient supported in the prone position facing straight down;

FIG. 6 is a perspective view of the patient support of FIG. 5 showing the patient rotated about the longitudinal axis of the support top;

FIG. 7 is a partial perspective view of the first (head end) column included in the foundation frame of FIG. 1 showing the rotation system in a powered mode of operation for rotating a patient;

FIG. 8 is a view similar to FIG. 7 showing the rotation system disengaged to a manual mode of operation allowing a patient to be rotated by hand;

FIG. 10 is a top plan view of the rotation system in the powered mode of operation;

FIG. 11 is a view similar to FIG. 10 showing the rotation system in the manual mode of operation;

FIG. 17 is a perspective view of the patient support apparatus of FIG. 1 showing the patient supported in a flat prone position;

FIG. 18 is a perspective view similar to FIG. 17 showing the second column lowered so that the patient is supported in an inclined prone position;

FIG. 21 is an outboard view of the first column included in the patient support apparatus of FIG. 1 showing a rotary switch coupled to the first column in a "BRAKE" position so that braking elements included in the casters of the first column are in an engaged position blocking the casters from turning or rolling;

FIG. 22 is a view similar to FIG. 21 showing the rotary switch moved to a "ROLL" position so that braking elements included in the casters of the first column are moved to a disengaged position allowing the casters to turn and roll;

FIGS. 25A-C are a set of views of the braking system of FIGS. 23 and 24 diagrammatically showing braking elements in a disengaged (unbraked) condition;

FIGS. 26A-C are a set of views similar to FIGS. 25A-C diagrammatically showing the braking element moved to an engaged (braked) condition;

FIGS. 27A-C are a set of views similar to FIGS. 26A-C diagrammatically showing the braking element in the engaged (braked) condition as a user pulls the plunger to release and disengage the braking element;

FIGS. 28A-C are a set of view similar to FIGS. 27A-C diagrammatically showing the braking element in the disengaged (unbraked) condition after a user has pulled the plunger;

FIG. 35 is an outboard view of a first column included in an alternative patient support apparatus with another alternative braking system showing a rotary switch coupled to the first column in a "BRAKE" position so that plungers included in legs located between casters of the column are in an extended, engaged position contacting the floor so that the column is unable to turn or roll;

FIG. 36 is a view similar to FIG. 35 showing the rotary switch moved to a "ROLL" position so that the plungers are in a retracted, disengaged position spaced apart from the floor so that the column is free to turn and roll on the casters;

FIG. 37 is an outboard view of a first column included in another alternative patient support apparatus with another alternative braking system showing a rotary switch coupled to the first column in a "BRAKE" position so that plungers included in stems of the casters of the column are in an extended, engaged position contacting the floor so that the column is unable to turn or roll;

FIG. 38 is a view similar to FIG. 43 showing the rotary switch moved to a "ROLL" position so that the plungers are in a retracted, disengaged position spaced apart from the floor so that the column is free to turn and roll on the casters;

FIG. 43 is a top plan view of the motion joint of FIG. 41 showing the rails of the patient support top extending at a first angle from a column of the foundation frame, and showing the patient support top cutaway to show that the joint of the motion joint includes an arm extending through the cross beam, a pair of resilient bumpers situated on either side of the arm inside the cross beam, and a retainer configured to keep the arm from being pulled out from the cross beam;

FIG. 44 is a view similar to FIG. 43 showing rails of the rails of the patient support top shifted relative to the foundation frame;

FIG. 45 is a perspective view of the yoke bracket included in the patient support of FIG. 1;

FIG. 46 is a cross-sectional view of FIG. 45 taken at line 46-46 and showing that the yoke bracket includes a ledge with a number of notches formed therein so that a pin connector is guided into one of a number of attachment holes formed in the yoke bracket;

FIGS. 47-52 are a series of views showing the yoke bracket of FIG. 39 being mounted on a connector block included in the foundation frame;

FIG. 47 is a perspective view of the yoke bracket being lowered on to the connector block of the foundation frame;

FIG. 47A is a partial cross-section view of FIG. 47 showing that a slot formed in the yoke bracket is facing the connector block;

FIG. 48 is a perspective view similar to FIG. 47 showing the yoke bracket contacting the connector block of the foundation frame;

FIG. 48A is a partial cross-sectional view of FIG. 48 showing the slot formed in the yoke bracket aligned with a retainer peg included in the connector block;

FIG. 49 is a perspective view similar to FIGS. 47 and 48 showing the slot formed in the yoke bracket receiving the retaining peg included in the connector block;

FIG. 49A is a partial cross-sectional view of FIG. 49 showing that the yoke bracket slides along the connector block so that the slot formed in the yoke bracket receives the retainer peg included in the connector block;

FIG. 50 is a perspective view similar to FIGS. 47-49 showing the yoke bracket rotated about the retainer peg;

FIG. 50A is a partial cross-sectional view of FIG. 50 showing that when the yoke bracket pivots about the retainer peg, a hole extending through the yoke bracket aligns with a hole extending through the connector block;

FIG. 51 is a perspective view similar to FIGS. 47-50 showing a pin being inserted through the aligned holes of the yoke bracket;

FIG. 51A is a partial cross-sectional view of FIG. 51 showing the pin extending through the yoke bracket and the connector block;

FIG. 52 is a perspective view similar to FIGS. 47-51 showing the yoke bracket and the connector block rotated about a pivot axis so that the yoke bracket is mounted to the connector block for supporting a patient;

FIG. 52A is a partial cross-sectional view of FIG. 52 showing that the connector pin and the retainer peg both connect the yoke bracket to the connector block of the foundation frame when the yoke bracket is mounted to the connector block;

FIG. 53 is a perspective view similar to FIGS. 47-52 showing the pin connecting the yoke bracket to the connector block removed and the yoke bracket pivoted about the retainer peg;

FIG. 53A is a partial cross-sectional view of FIG. 53 showing that the retainer peg can independently connect the yoke bracket to the connector block of the foundation frame even if the pin extending through the yoke bracket and the connector block is removed;

FIG. 54 is a perspective view of an alternative yoke bracket configured for use with an alternative connector block shown in FIG. 55, the alternative yoke bracket including a spring-loaded ball sized to be received in a detent formed in the connector block;

FIG. 55 is a perspective view of an alternative connector block configured for use with the alternative yoke bracket of FIG. 54, the alternative connector block is formed to include a detent sized to receive the spring-loaded ball of the alternative yoke bracket;

FIG. 56 is a cross-sectional view of the alternative yoke bracket of FIG. 54 showing the location of the spring-loaded ball and suggesting an alternative location for the spring-loaded ball;

FIG. 56A is a detail view of a portion of the cross-sectional view of FIG. 56;

FIG. 57 is a side-elevation view of the connector block of FIG. 55 showing the location of the detent and suggesting an alternative location for the detent;

FIG. 57A is a detail view of a portion of the side-elevation view of FIG. 57;

FIG. 58 is cross-sectional view similar to FIG. 56 of another alternative yoke bracket including a pair of spring-loaded balls configured to resist removal of the yoke bracket from a connector block;

FIG. 58A is a detail view of a portion of the cross-sectional view of FIG. 58 showing the location of the spring-loaded balls;

FIG. 59 is cross-sectional view similar to FIGS. 56 and 58 of yet another alternative yoke bracket including a pivoting latch configured to block unwanted removal of the yoke bracket from a connector block;

FIG. 59A is a detail view of a portion of the cross-sectional view of FIG. 59 showing the location of the pivoting latch;

FIG. 60 is a perspective view of another alternative yoke bracket along with another alternative connector block showing that the friction pad of the yoke bracket is located in a slot formed in the yoke bracket and the friction pad of the connector block is formed on a connector peg of the connector block;

FIG. 61 is a perspective view of another alternative yoke bracket along with another alternative connector block similar to those shown in FIG. 60 showing that a top surface of the yoke bracket is formed to include a friction pad arranged to contact a friction pad formed on the connector block when the yoke bracket is coupled to the connector block to resist removal of the yoke bracket from the connector block;

FIG. 62A is a first perspective view of another alternative yoke bracket along with another alternative connector block similar to those shown in FIGS. 60 and 61 showing that the friction pad of the yoke bracket is located on an internal side of a left coupling member of the yoke bracket;

FIG. 62B is a second perspective view of the alternative yoke bracket and connector block shown in FIG. 62A showing that the friction pad of the connector block is located on an external side of the connector block and is arranged to contact the friction pad of the alternative yoke bracket;

FIG. 63 is a perspective view of another alternative yoke bracket and an alternative connector block including a downwardly-jutting retainer that contacts a ledge included in the yoke bracket;

FIG. 63A is a front elevation view of the connection of the alternative yoke bracket and connector block of FIG. 63 showing that the downwardly-jutting retainer supports a spring-loaded ball that is received by the ledge included in the yoke bracket;

FIG. 64 is a perspective view of another alternative yoke bracket and an alternative connector block including a downwardly-jutting retainer that contacts a ledge included in the yoke bracket similar to the alternative connector block of FIG. 63;

FIG. 64A is a front elevation view of the connection of the alternative yoke bracket and connector block of FIG. 64 showing that the downwardly-jutting retainer supports a latch that pivots about an axis to move from a closed position blocking the ledge from moving away from the connector block to an open position allowing the ledge to move away from the connector block;

FIG. 65 is a perspective view of another alternative yoke bracket coupled to a connector block;

FIG. 65A is a front elevation view of the alternative yoke bracket of FIG. 65 coupled to the connector block;

FIG. 65B is a detail view of a portion of the alternative yoke bracket and connector block of FIG. 65A;

FIG. 68A is a detail perspective view of a portion of FIG. 68 showing the peg-receiving pocket formed in the slot of the left connection member;

FIG. 69 is a perspective view of an alternative patient support top for use with the foundation frame of FIG. 1, the alternative patient support top including a plate forming a panel and a pair of rails;

FIG. 70 is a cross-sectional view of FIG. 48 taken at line 49-49 showing that the plate of the alternative patient support top is integrally formed with the rails;

FIG. 71 is a perspective view of another alternative patient support top for use with the foundation frame of FIG. 1, the alternative patient support top including a support frame and a motion joint;

FIG. 72 is a front elevation view of the alternative patient support of FIG. 71 showing that the motion joint includes an arm received in a slot formed in a cross beam of the support frame and a connector extending parallel to the cross beam;

FIG. 73 is a cross-sectional view of the alternative patient support of FIGS. 71 and 72 showing that the slot formed in the cross beam is not parallel with the connector of the motion joint;

FIG. 78 is a front view of the rail coupler of FIGS. 74 and 75 showing the flap pivoted to a closed position;

FIG. 79 is a side elevation view of the rail coupler of FIG. 78;

FIG. 82 is a partial front elevation view of an alternative flap lock for use with the rail coupler of FIG. 74;

FIG. 83 is a partial front elevation view of another alternative flap lock for use with the rail coupler of FIG. 74;

DETAILED DESCRIPTION

Figure 1:
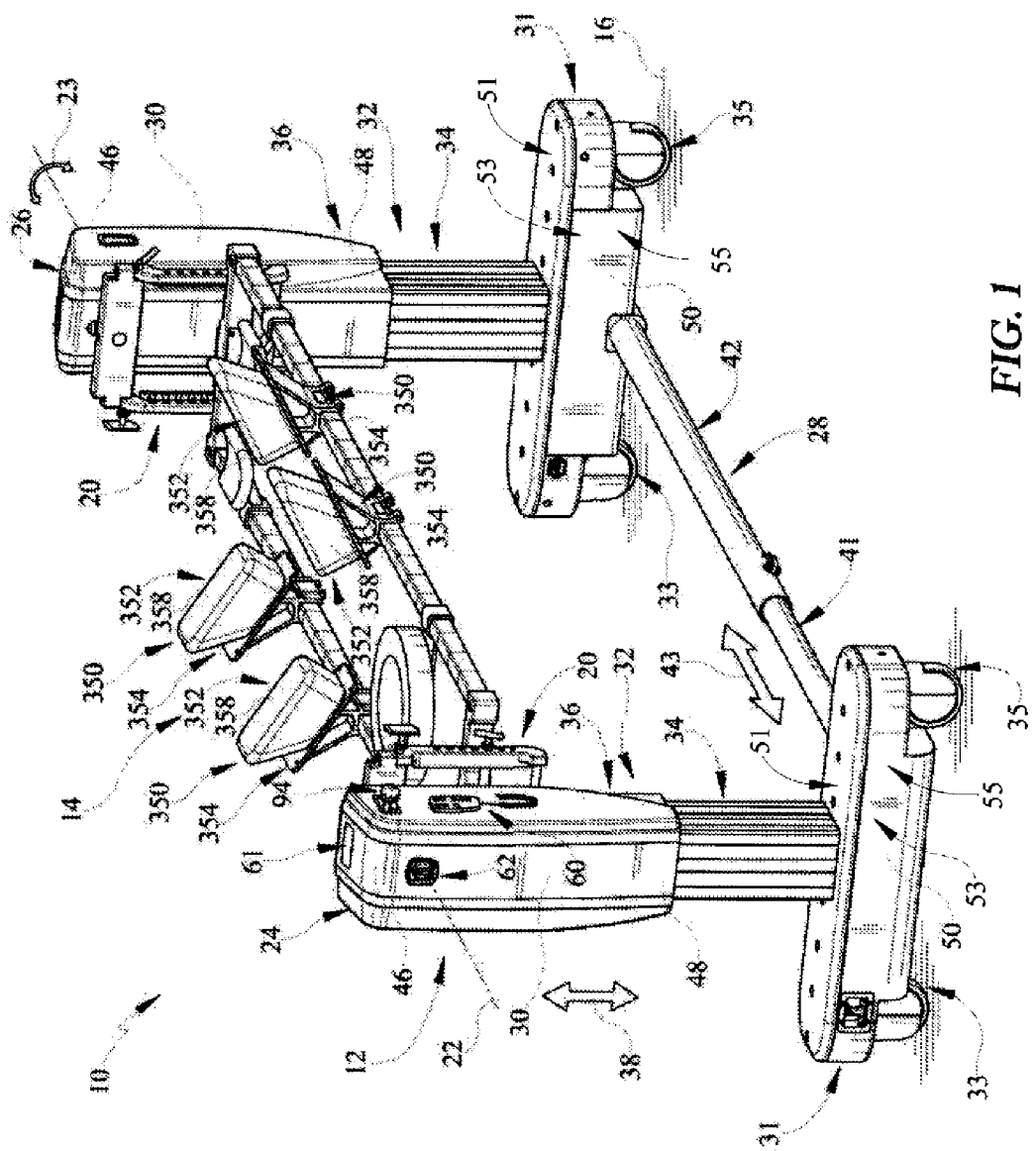
FIG. 1 is a perspective view of a patient support apparatus including a foundation frame and a patient support top supported on the foundation frame to rotate about an axis.

A patient support apparatus 10 for supporting a patient during surgery is shown in FIG. 1. The patient support apparatus 10 illustratively includes a foundation frame 12 and a patient support top 14. The foundation frame 12 rests on a floor 16 and is configured to suspend the support top 14 in a number of different positions above the floor 16. Thus, a patient undergoing surgery can be moved with the support top 14 to a number of different positions and orientations depending on the particular surgical operation to be performed on the patient.

The foundation frame 12 includes a first column 24, a second column 26, an extension 28, and a control system 30 as shown in FIG. 1. In the illustrative embodiment, the first column 24 is a head-end column and the second column 26 is a foot-end column. The support top 14 is coupled to the foundation frame 12 between the columns 24, 26 via yoke brackets 20. The support top 14 and the yoke brackets 20 are configured to rotate relative to the foundation frame 12 about a pivot axis 22 as suggested by arrow 23 in FIG. 1. The pivot axis 22 extends parallel to, and is spaced apart from, the length of the support top 14. Thus, a patient can be rotated prior to or during a surgical operation.

Each column 24, 26 includes a base 31 and an upright 32 extending up from the base 31 as shown in FIG. 1. Each base 31 includes a horizontal top plate 51, a vertical lower plate 53 extending down from the horizontal plate 51, and a cover 55 coupled the top plate 51 to house the lower plate 53. Each upright 32 includes a lower section 34 and an upper section 36 that is movable vertically up and down along the lower section 34 as suggested by arrow 38 to raise and lower each end of the support top 14. Thus, a patient can be raised, lowered, or inclined prior to or during a surgical operation at the discretion of a surgeon.

Additionally, each column 24, 26 of the patient support apparatus 10 includes a pair of casters 33, 35 that engage the floor 16 as shown in FIG. 1. All of the casters 33, 35 are selectively freed to allow the patient support apparatus 10 to roll along the floor 16 to different surgery or storage rooms within a healthcare facility. However, during surgical operations, the patient support apparatus 10 may be held in place relative to the floor 16 to minimize unwanted movement of the patient during the operation.

The extension 28 extends between the columns 24, 26 and includes a first tube 41 and a second tube 42 configured to telescope as suggested by arrow 43 in FIG. 1. Telescoping of the tubes 41, 42 allow the columns 24, 26 to be moved between a deployed position, spaced to support the support top 14, and a storage position, collapsed together reducing the footprint of the foundation frame 12.

The control system 30 is configured to control the motions of the patient support apparatus 10. Specifically, the control system 30 directs rotation of the support top 14 about the pivot axis 22, movement of the upper section 36 along the lower section 34 of each upright 32 to raise and lower the ends of the support top 14, and freedom of the casters 33, 35 to roll along the floor 16.

Figure 2:
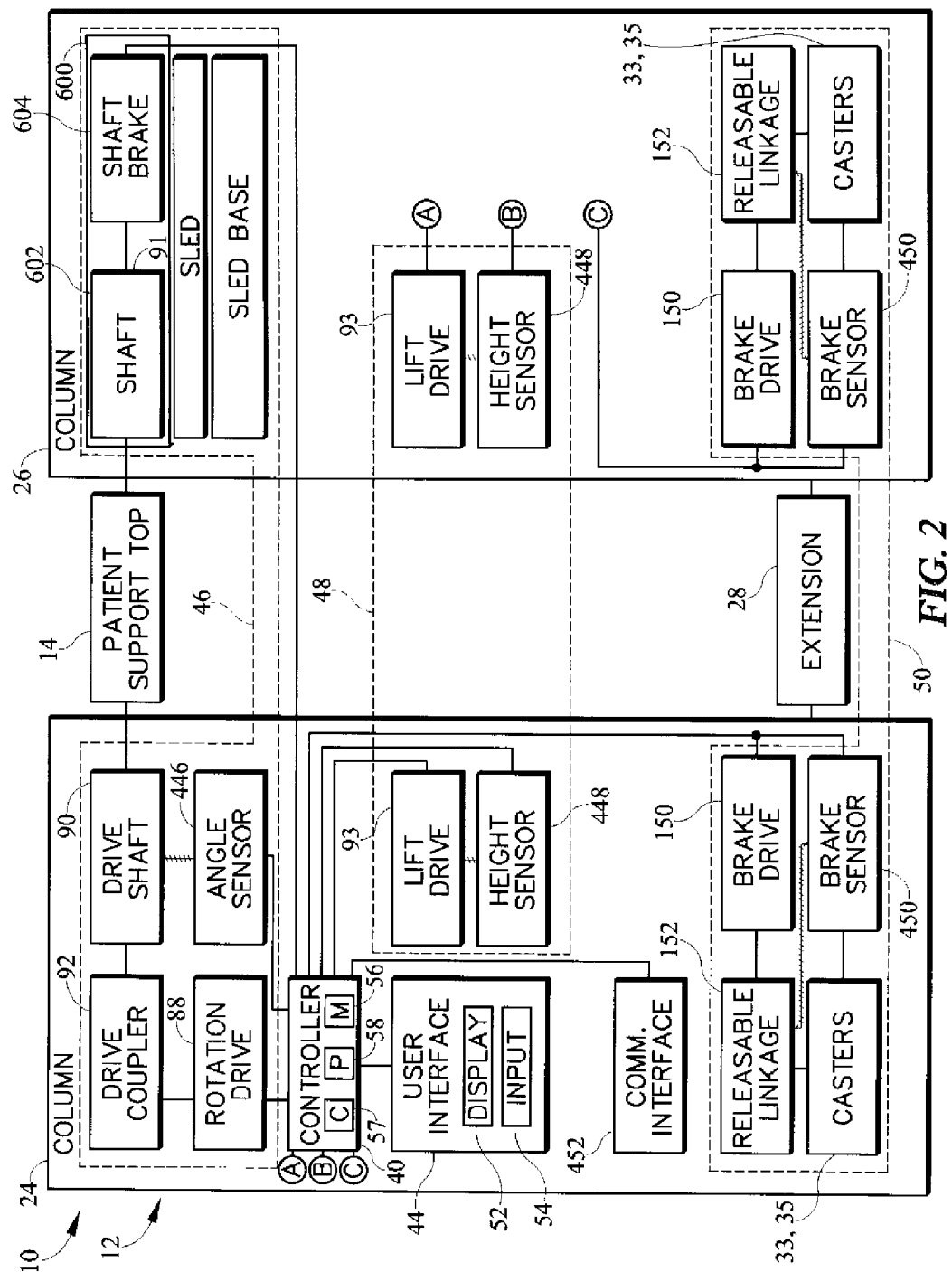
FIG. 2 is a diagrammatic view of the patient support apparatus of FIG. 1 showing that the foundation frame includes a pair of columns housing a rotation system, a lift system, and a braking system.

The control system 30 includes a controller 40, a user interface 44, a rotation system 46, a lift system 48, and a brake system 50 as shown diagrammatically in FIG. 2. The controller 40 is electrically coupled to the user interface 44, the rotation system 46, the lift system 48, and the brake system 50. The user interface 44 includes a display 52 and a user input 54 configured to allow a surgeon to direct operation of and receive information about the foundation frame systems 46, 48, 50. The rotation system 46 is configured to provide powered and manual rotation of the support top 14 about the pivot axis 22. The lift system 48 is configured to provide powered movement of the upper section 36 relative to the lower section 34 to raise and lower the ends of the support top 14. The brake system 50 is configured to provide powered braking and unbraking of the casters 33, 35 and to allow manual unbraking of the casters 33, 35 in case of a power failure.

The controller 40, shown diagrammatically in FIG. 2, illustratively includes a memory 56 containing instructions, a clock 57, and a processor 58 coupled to the clock 57 and to the memory 56 to execute the instructions stored therein. The memory 56 may be embodied as or otherwise include one or more memory devices or data storage locations including, for example, dynamic random access memory devices (DRAM), synchronous dynamic random access memory devices (SDRAM), double-data rate synchronous dynamic random access memory device (DDR SDRAM), mask read-only memory (ROM) devices, erasable programmable ROM (EPROM), electrically erasable programmable ROM (EEPROM) devices, flash memory devices, and/or other volatile and/or non-volatile memory devices. The processor 58 may be embodied as any type of processor capable of executing the instructions stored in the memory 56. The illustrative processor 58 is a single core processor, but processors having multiple cores may be used in other embodiments.

The user interface 44 of the illustrative embodiment includes a remote pendant 60, a panel 61, and a switch box 62 as shown in FIG. 1. The remote pendant 60 is illustratively coupled to the first column 24 by an extendable cord 64 and is received in a dock 66 situated along a right side 63 of the upper section 36 included in the first column 24. In other embodiments, the remote pendant 60 may be wireless. The panel 61 is illustratively mounted to a top side 64 of the upper section 36 included in the first column 24. The switch box 62 is mounted along a back side 65 of the upper section 36 included in the first column 24.

Figure 3:
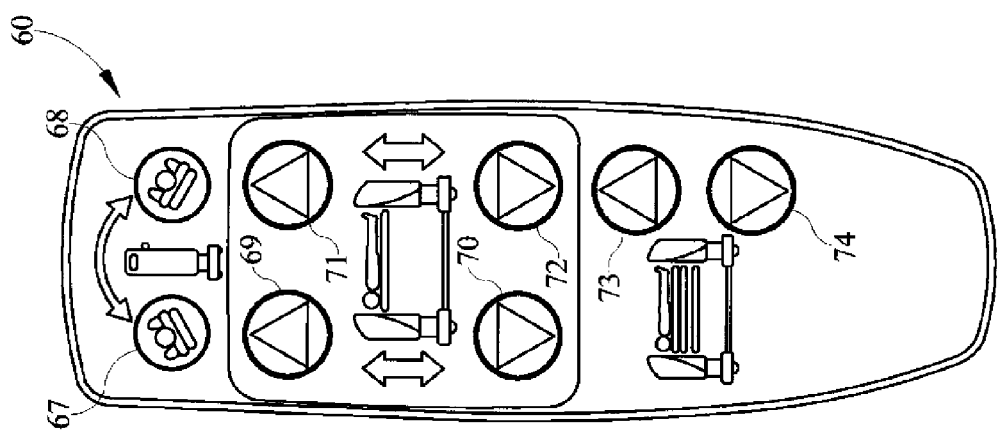
FIG. 3 is a front elevation view of an input pad for operating the rotation system, the lift system, and the braking system.

As shown in FIG. 3, the remote pendant 60 includes buttons 67-74. Buttons 67, 68 are configured to activate rotation system 46 to rotate support top 14 about the pivot axis 22. Buttons 69, 70 are configured to activate the lift system 48 to raise or lower the upper section 36 of the first column 24 relative to the lower section 34 of the first column 24. Buttons 71, 72 are configured to activate a lift drive 93 included in the lift system 48 to raise or lower the upper section 36 of the second column 26 relative to the lower section 34 of the second column 26. Buttons 73, 74 are configured to simultaneously raise or lower the upper sections 36 of the first and second columns 24, 26 relative to the lower sections 34 of the first and second columns 24, 26. In the illustrative embodiment, buttons 67-74 are electro-mechanical push-button switches arranged adjacent icons suggesting the associated movement type and each button is marked with an indicator to suggest the direction of movement to be activated by pressing the respective button. In other embodiments, the remote pendant 60 may include GUI interfaces such as LCD screens with menus and/or touch sensitive areas to achieve the functions described.

Figure 4:
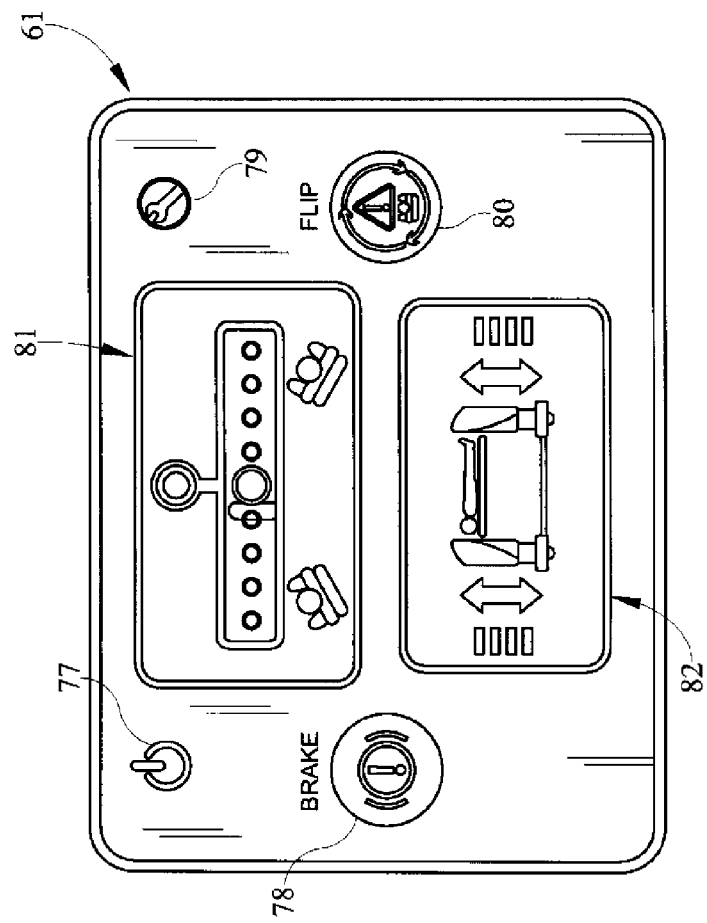
FIG. 4 is a front elevation view of a display included in the user interface of the patient support apparatus of FIG. 1.

As shown in FIG. 4, the panel 61 includes indicator lights 77-80 and status displays 81-82 showing status information related to the foundation frame 12 and support top 14. A power indicator light 77 is lit when the control system 30 has power received from an external power source (not shown) or a battery power source (not shown), thereby showing power status. A brake indicator light 78 is unlit when the brake system 50 is unbraked so that casters 33, 35 are free to roll along the floor 16, thereby showing brake status. A maintenance indicator light 79 is lit when the controller 40 determines that the foundation frame 12 needs service, thereby showing service status. When the maintenance indicator light 79 is lit, all powered functions of the foundation frame 12 may be disabled. A flip indicator light 80 is lit when the rotation system 46 is configured to allow manual rotation of the support top 14 about the pivot axis 22, thereby showing rotation status. A rotation display 81 indicates the rotation angle of the rotation system 46, thereby showing rotation angle status of the support top 14 relative to the foundation frame 12. A lift display 82 indicates the location of each upper section 36 of the columns 24, 26, thereby showing height and lift angle statuses of the support top 14. The rotation and lift displays 81, 82 may be used by a surgeon to determine the orientation and position of a patient supported on the patient support 10 even when the patient is covered in surgical drapes or covers. In other embodiments, panel 61 may be a GUI with an LCD for displaying information and/or a touch-screen for displaying information and for receiving user inputs.

As shown in FIG. 7, the switch box 62 includes a housing 84 and a rotary switch 86 received in the housing 84. Rotary switch 86 is configured to move between a first position, wherein the brake system 50 is braked, and a second position, wherein the brake system 50 is unbraked. When the brake system 50 is unbraked, the casters 33, 35 are free to roll along the floor 16 in different directions. When the brake system is braked, the casters 33, 35 are blocked from rolling along the floor 16 and are held in a single direction. In some embodiments, the rotary switch is movable to a third position to initiate a brake reset sequence to reset the brake system 50 after the brake system 50 has been manually released as further described below. In other embodiments, one or more membrane switches, pivot switches, or other suitable user inputs may be used to control the brake system 50.

The rotation system 46 for rotating the patient support top 14 relative to the foundation frame 12 is housed in the columns 24, 26 of the foundation frame 12 and is coupled to the support top 14 as shown diagrammatically in FIG. 2. The rotation system 46 is operable in a powered mode to rotate the support top 14 about the pivot axis 22 in response to a user pressing one of the buttons 67, 68 on the remote pendant 60. Thus, a user can rotate a patient without adjusting mechanical locks or manually controlling turning of the patient. Alternatively, in a manual mode, the rotation system 46 allows manual rotation of the support top 14 about the pivot axis 22 relative to foundation frame 12.

The rotation system 46 includes a rotation drive 88, a drive shaft 90 configured to be coupled to the support top 14, and a drive coupler 92 as shown in FIG. 2. The drive coupler 92 connects the rotation drive 88 to the drive shaft 90 when the rotation system 46 is in the powered mode and disconnects the rotation drive 88 from the drive shaft 90 when the rotation system is in the manual mode. The rotation drive 88, drive shaft 90, and drive coupler 92 are coupled to the first column 24.

The powered mode of the rotation system 46 is established when a knob 94 included in the drive coupler 92 is located in a forward-and-down position in a guide plate 96 as shown in FIG. 7. The manual mode of the rotation system 46 is established when the knob 94 is located in a back-and-down position in the guide plate 96 as shown in FIG. 8. To move the rotation system 46 between the powered mode and the manual mode, a user lifts the knob 94, slides the knob 94 back or forward, and pushes the knob 94 down along an inverted U-shaped slot 98 formed in the guide plate 96.

The rotation drive 88 includes a linear actuator 100 and a rotation arm 102 coupled to the linear actuator 100 by a pin 104 as shown in FIG. 7. The linear actuator 100 extends and retracts in response to a user operating buttons 67, 68 of remote pendant 60. The rotation arm 102 includes a body 106 and a finger 108 configured to be coupled to the linear actuator 100. The body 106 of the rotation arm 102 is formed to include a central opening 110 and a number of engagement holes 111 (illustratively four) arranged around the central opening 110.

The drive shaft 90 includes a shaft 112, a collar 113, and a key 114. The collar 113 is configured to be coupled to the shaft 112 by a set screw 116 to locate the collar 113 axially along the shaft. The shaft 112 is illustratively hollow and forms a central opening 118. The collar 113 is formed to include a central opening 120 sized to receive the shaft 112 and a number of engagement holes 121 (illustratively four) arranged around the central opening 120. The engagement holes 121 of the collar 113 are spaced to correspond with the engagement holes 111 of the rotation arm 102. The key 114 extends along the shaft 112 and engages notches 125, 127 formed in the shaft 112 and the collar 123 to block the collar 123 from rotating about the shaft 112.

Figure 9:
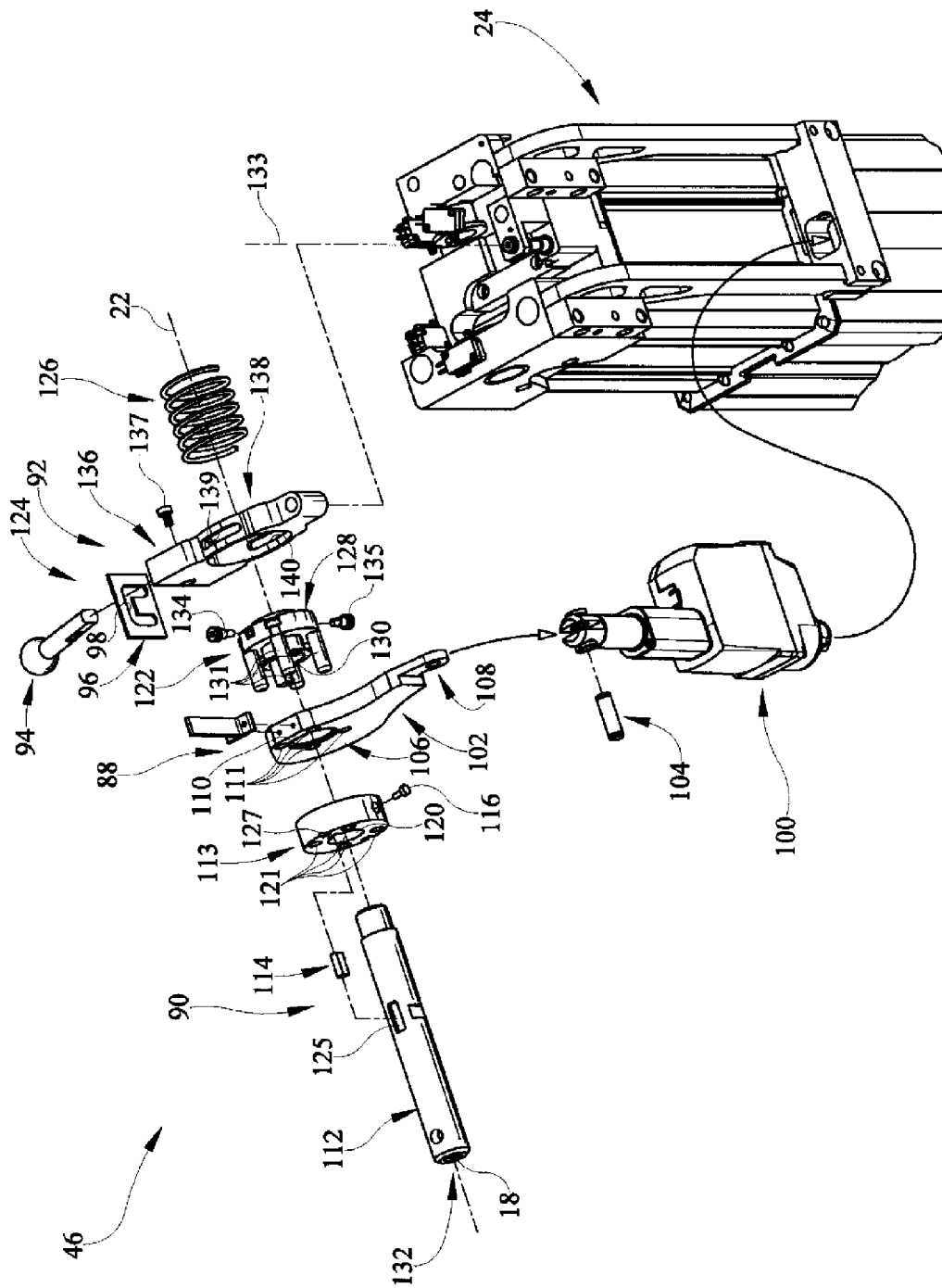
FIG. 9 is an exploded assembly view of the rotation system.
Figure 12:
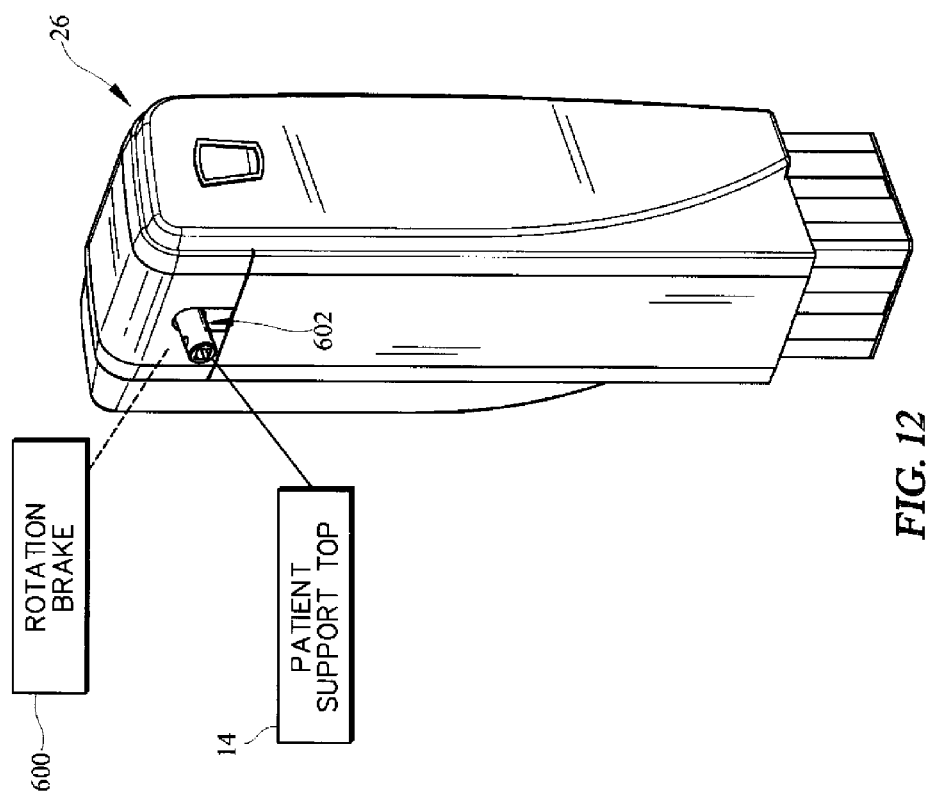
FIG. 12 is a partial perspective view of the second (foot end) column included in the foundation frame of FIG. 1.

The drive coupler 92 includes an engagement member 122, a user control 124, and a biasing spring 126 as shown in FIG. 9. The engagement member 122 is configured to engage the rotation arm 102 of the rotation drive 88 and the collar 113 of the drive shaft 90 when the rotation system 46 is in the powered mode and to disengage from the collar 113 of the drive shaft 90 when the rotation system 46 is in the manual mode. The user control 124 is configured move and hold the engagement member 122 out of engagement with the collar 113 of the drive shaft 90 in response to a mechanical user input. The biasing spring 126 biases engagement member 122 toward engagement with the collar 113 of the drive shaft 90.

The engagement member 122 includes a ring 128 formed to includes a central opening 130 and a number (illustratively four) of pegs 131. The central opening 130 of the engagement member 122, the central opening 120 of the collar 113, the central opening 110 of the rotation arm 102, and the hollow shaft 112 cooperate to form a passage 132 extending through the rotation system 46 along the pivot axis 22 through which cervical traction cables, intravenous tubes, patient monitoring sensor wires, and other lines can be run so that the lines are not twisted during rotation of a patient about the pivot axis 22 during surgery. The pegs 131 are spaced to correspond with the engagement holes 111 of the rotation arm 102 and the engagement holes 121 of the collar 113. The drive coupler 92 also includes a pair of screws 134, 135 coupling the engagement member 122 to the user interface 124.

The user control 124 includes a sleeve 136, the knob 94, and the guide plate 96 as shown in FIG. 9. The sleeve 136 is coupled to the first column 24 for pivotable movement relative to the column 24 about an axis 133. The knob 94 is coupled to the sleeve 136 by a screw 137 for pivotable movement relative to the sleeve 136 about a pivot axis 95. The guide plate 96 is formed to include the inverted U-shaped slot 98 and the knob 94 extends through the slot 98.

The sleeve 136 includes a band 138 sized to receive the ring 128 of the engagement member 122 and is formed to include a top slot 139 and a bottom slot 140. The top and bottom slots 139, 140 extend partially around the pivot axis 22. The slots 139, 140 receive the screws 134, 135 for movement along the slots 139, 140 so that the engagement member 122 is movable relative to the sleeve 136 as the sleeve 136 pivots about the axis 133.

In the powered mode of the rotation system 46, the pegs 131 of the engagement member 122 are received in the engagement holes 111 of the rotation arm 102 and the engagement holes 121 of the collar 113, as shown in FIG. 10. Thus, rotation of the rotation arm 102 is transmitted to the drive shaft 90 and the support top 14 is rotated under power from the linear actuator 100 about the pivot axis 22. The linear actuator 100 is extended and retracted in response to a user input from the remote pendant 60. Additionally, the knob 94 of the user control 124 is in the forward-and-down position and the engagement member 122 is blocked from disengagement by the guide plate 96 until a user lifts up on the knob 94.

In the manual mode of the rotation system 46, the pegs 131 of the engagement member 122 are received in the engagement holes 111 of the rotation arm 102 but are withdrawing from the engagement holes 121 of the collar 113 as shown in FIG. 11. Thus, the drive shaft 90 and the support top 14 are free to rotate about the pivot axis 22 in response to a user manipulating the support top 14. Additionally, the knob 94 of the user control 124 is in the back-and-down position and the engagement member 122 is blocked from engaging the engagement holes 121 of the collar 113 by the guide plate 96 until a user lifts up on the knob 94.

The rotation system 46 also includes a rotation brake 600 configured to resist rotation of the support top 14 when the rotation system 46 is in the powered mode of operation and a user is not pressing one of the buttons 67, 68 on the remote pendant 60. Thus, a patient is held in a desired rotational position when the user of the surgical table 10 stops powered rotation of the patient without the user adjusting manually set locks or brakes.

Rotation brake 600 is coupled to second column 26 as shown in FIGS. 12-16. The rotation brake 600 includes a shaft 602, a shaft brake 604, and an actuation linkage 606, as shown, for example, in FIG. 14. The shaft 602 is configured to be coupled to the support top 14 and to rotate therewith. The shaft brake 604 is configured to move between an unbraked position allowing rotation of the shaft 602 and a braked position resisting rotation of the shaft 602. The actuation linkage 604 is configured to move the shaft brake 604 between the unbraked and braked position.

Figure 14:
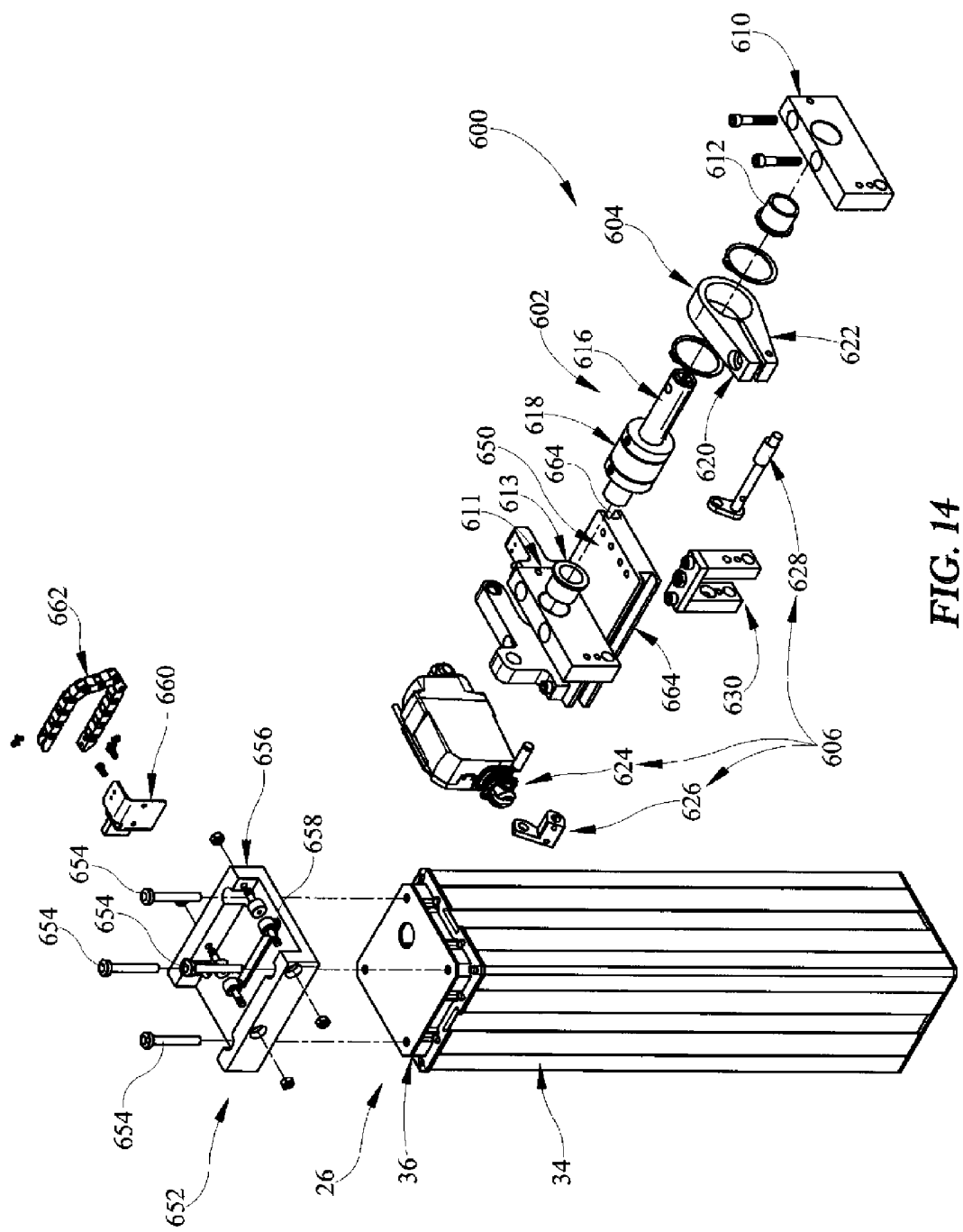
FIG. 14 is a view similar to FIG. 13 showing the braking system exploded away from the second column.

The shaft 602 is supported for rotation on second column 26 by a pair of plates 610, 611 fitted with bushings 612, 613 as shown in FIG. 14. Shaft 602 illustratively includes a hollow shaft 616 supported on bushings 612, 613 and a collar 618 coupled to the hollow shaft 616. Hollow shaft 616 is configured to be coupled to support top 14 and may guide a cable for a traction device used during surgery. Collar 618 is configured to be engaged and disengaged by shaft brake 602.

Shaft brake 604 is illustratively a U-shaped clamp configured to receive collar 618 of shaft 602 as shown in FIG. 14. Shaft brake 604 includes an upper jaw 620 and a lower jaw 622. The upper jaw 620 is mounted to a bracket 630 between plates 610, 611. The lower jaw 622 is biased a first distance from the upper jaw 620 so that the shaft 602 is allowed to rotate relative to second column 26 as suggested in FIG. 15. The lower jaw 622 is moved by the actuation linkage 604 toward the upper jaw 620 so that the shaft 602 is engaged by the shaft brake 604 and so that shaft brake 604 resists rotation of the shaft 602 as suggested in FIG. 16.

Actuation linkage 606 is configured to move the lower jaw 622 of the shaft brake 604 toward the upper jaw 620 of the shaft brake 604. Actuation linkage 606 includes a linear actuator 624, a pivot arm 626, and a cam 628 supported by a bracket 630 located between the plates 610, 611. The linear actuator 624 is configured to extend and retract to pivot the cam 628. The pivot arm 626 is coupled to the linear actuator 624 and is configured to convert linear motion of the linear actuator 624 into rotational movement of the cam 628 as suggested by arrow 629 in FIG. 16. The cam 628 is coupled to the pivot arm 626 and contacts the lower jaw 622 of shaft brake 604 so that the lower jaw 622 follows the cam 628 and moves toward the upper jaw 620 as suggested by arrow 623 in FIG. 16 thereby causing the shaft brake 604 to resist rotation of the shaft 602.

In the illustrative embodiment, the connection of the support top 14 to the second column 26 is slidable toward the first column 24 to accommodate increased distance between the top of the second column 26 and the top of the first column 24. The distance between the top of the second column 26 and the top of the first column 24 is increased when the lift system 48 is operated to incline a patient as shown in FIG. 18.

Figures 19, 20:
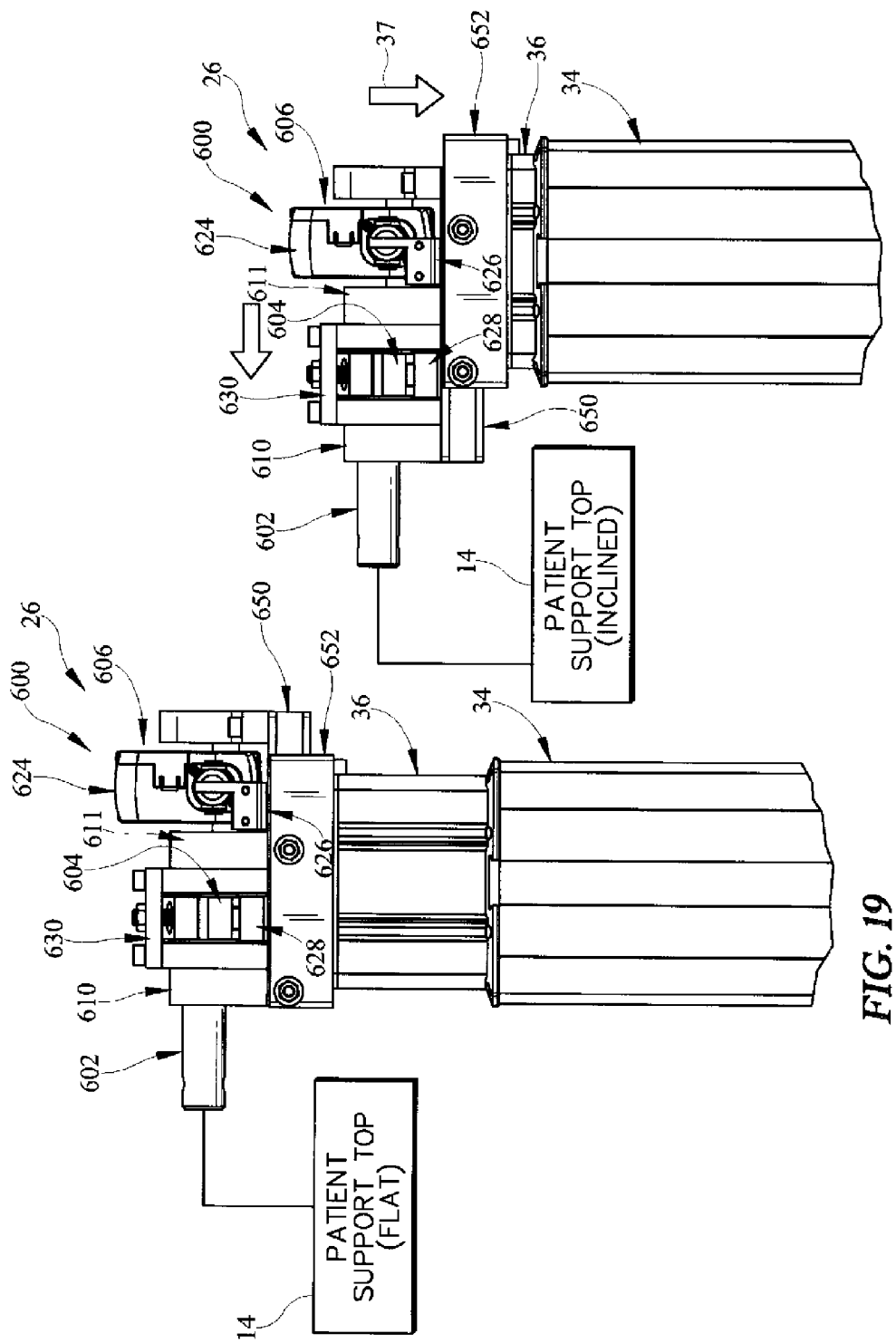
FIG. 19 is a side elevation view of the second column corresponding to the second column in FIG. 17 with the cover removed to show that the braking system coupled to the patient support top is slid-back relative to the second column when the patient-support top is in a flat arrangement.
FIG. 20 is a side elevation view of the second column corresponding to the second column in FIG. 18 showing that the braking system coupled to the patient support top is slid-forward relative to the second column when the patient support top is in an inclined arrangement.

To provide the slidable connection between the second column 26 and the support top 14, the rotation brake 600 that couples to the support top 14 is mounted on a sled plate 650 as shown in FIGS. 19 and 20. Sled plate 650 is configured to slide along a sled base 652 mounted on the second column 26 so that when the upper section 36 of second column 26 is lowered as suggested by arrow 37 the sled plate 650 slides toward the first column 24 as suggested by arrow 651 in FIG. 20.

The sled base 652 includes a plate 656, a number of rollers 658, and a retainer bracket 660 as shown in FIG. 14. The plate 656 is mounted to upper section 36 of second column 26 by bolts 654. The rollers 658 are coupled to the plate 656 and are configured to support the sliding motion of the sled plate 650. The retainer bracket 660 is coupled to the plate 656 of the sled base 652. The retainer bracket 660 is also connected to the sled plate 650 by a chain 662 to retain the sled plate 650 on the sled base 652 when the sled moves relative to the sled base 652.

Figure 13:
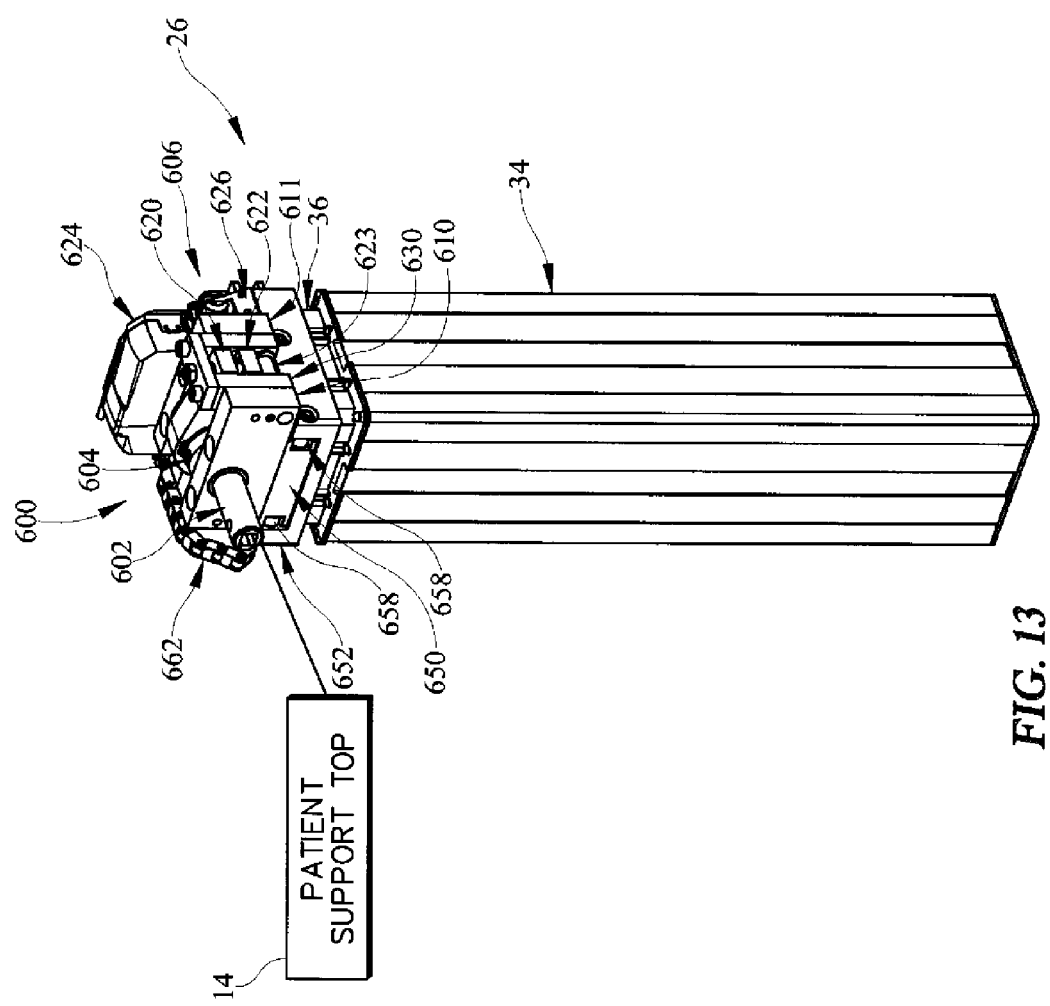
FIG. 13 is a view similar to FIG. 12 showing a cover of the second column removed to expose a braking system.

The sled plate 650 is formed to include channels 664 along right and left sides of the sled plate 650. Each channel 664 is sized to receive the rollers 658 included in the sled base 652 as shown in FIG. 13.

The brake system 50 for holding the patient support apparatus in place on the floor 16 includes a pair of brake drives 150, a pair of caster sets 33, 35, and a pair of releasable linkages 152 as shown diagrammatically in FIG. 2. For ease of description, only one of each pair of components is further described below. However, the following description is applicable to each of the components included in each pair. The brake drive 150 is coupled to the controller 40 and is configured to drive the braking system 50 between a braked configuration and an unbraked configuration in response to a user turning rotary switch 86 as suggested by arrow 87 from a BRAKE position, shown in FIG. 21, to a ROLL position as shown in FIG. 22. The releasable linkage 152 is coupled between the brake drive 150 and the casters 33, 35. The releasable linkage is configured to allow a user to manually free the braking system 50 to move to a released-and-unbraked configuration. The manually achieved released-and-unbraked configuration allows a user to move the patient support apparatus 10 in case of a power failure, an emergency, or an equipment failure.

Figure 24:
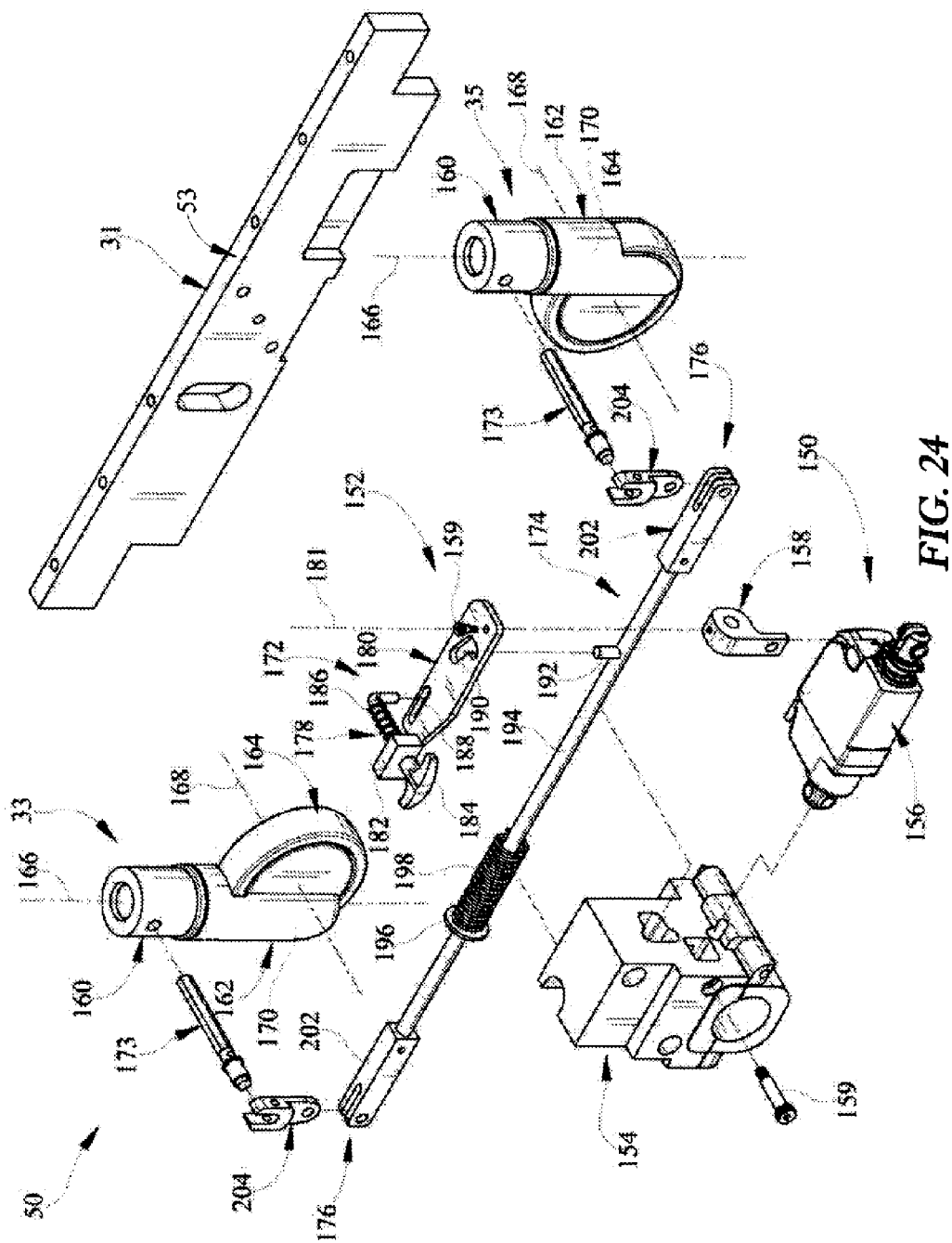
FIG. 24 is an exploded view of the braking system of FIG. 23.

The brake drive 150 includes a mount block 154, a linear actuator 156, and a slider 158 as shown in FIG. 24. The mount block 154 is coupled to the lower plate 53 included in one of the columns 24, 26 and supports the linear actuator 156 and the releasable linkage 152. The linear actuator 156 is coupled to the mount block 154 by a bolt 159 and extends and retracts in response to a user input to the remote pendant 60. The slider 158 is coupled to the releasable linkage 152 and to the linear actuator 156.

The casters 33, 35 each include a stem 160, a hub 162, and a wheel 164 as shown in FIG. 24. The stem 160 is coupled to the lower plate 53 of one of the columns 24, 26. The hub 162 and the wheel 164 are coupled to the stem 160 for pivotable movement about a vertical axis 166 so that the caster can change direction relative to the base 31. The wheel 64 is coupled to the hub 162 for rotation about a horizontal axis 168 so that the casters 33, 35 can roll along the floor 16. In the illustrative embodiment, the casters 33, 35 are each of a type described in U.S. Pat. No. 7,506,404, herein incorporated by reference, and are available from TENTE USA.

Each of the four casters 33, 35 also include a braking element 170 shown diagrammatically in FIGS. 25A, 26A, 27A, and 28A. The braking element 170 is movable between a disengaged and an engaged configuration. In the disengaged configuration, the braking element 170 allows pivoting of the hub 162 and the wheel 164 about the vertical axis 166 and allows rotation of the wheel 164 about the horizontal axis 168. In the engaged configuration, the braking element 170 blocks pivoting of the hub 162 and the wheel 164 about the vertical axis 166 and blocks rotation of the wheel 164 about the horizontal axis 168, thereby completely immobilizing the casters 33, 35. Unlike the prior art in which only one caster is completely immobilized to provide a steer mode or to resist some movement of a patient support in a brake mode, when the casters 33, 35 of the braking system 50 are driven to the braked configuration, the braking elements 170 of all four casters 33, 35 are engaged to immobilize the casters 33, 35. The immobilization of the casters 33, 35 prevents movement of the patient support apparatus 10 relative to the floor 16 during surgery. To move the braking elements 170 of the casters 33, 35 between the disengaged and the engaged configuration, a dowel 173 extending into the stem 160 is rotated. The dowel 173 has at least one flat side and is hexagonal in the illustrative embodiment.

The releasable linkage 152 is configured to convert linear motion from the brake drive 150 into rotation of the dowels 173 so that the braking system 50 is driven between the unbraked and the braked configuration as suggested in FIGS. 25 and 26. The releasable linkage 152 is also configured to manually release the casters 33, 35 from the brake drive 150 and to move the braking elements 170 of the casters 33, 35 from the engaged configuration to the disengaged configuration so that the braking system is in the released-and-unbraked configuration when a user manually releases the linkage 152 as suggested in FIGS. 27 and 28.

Figure 23:
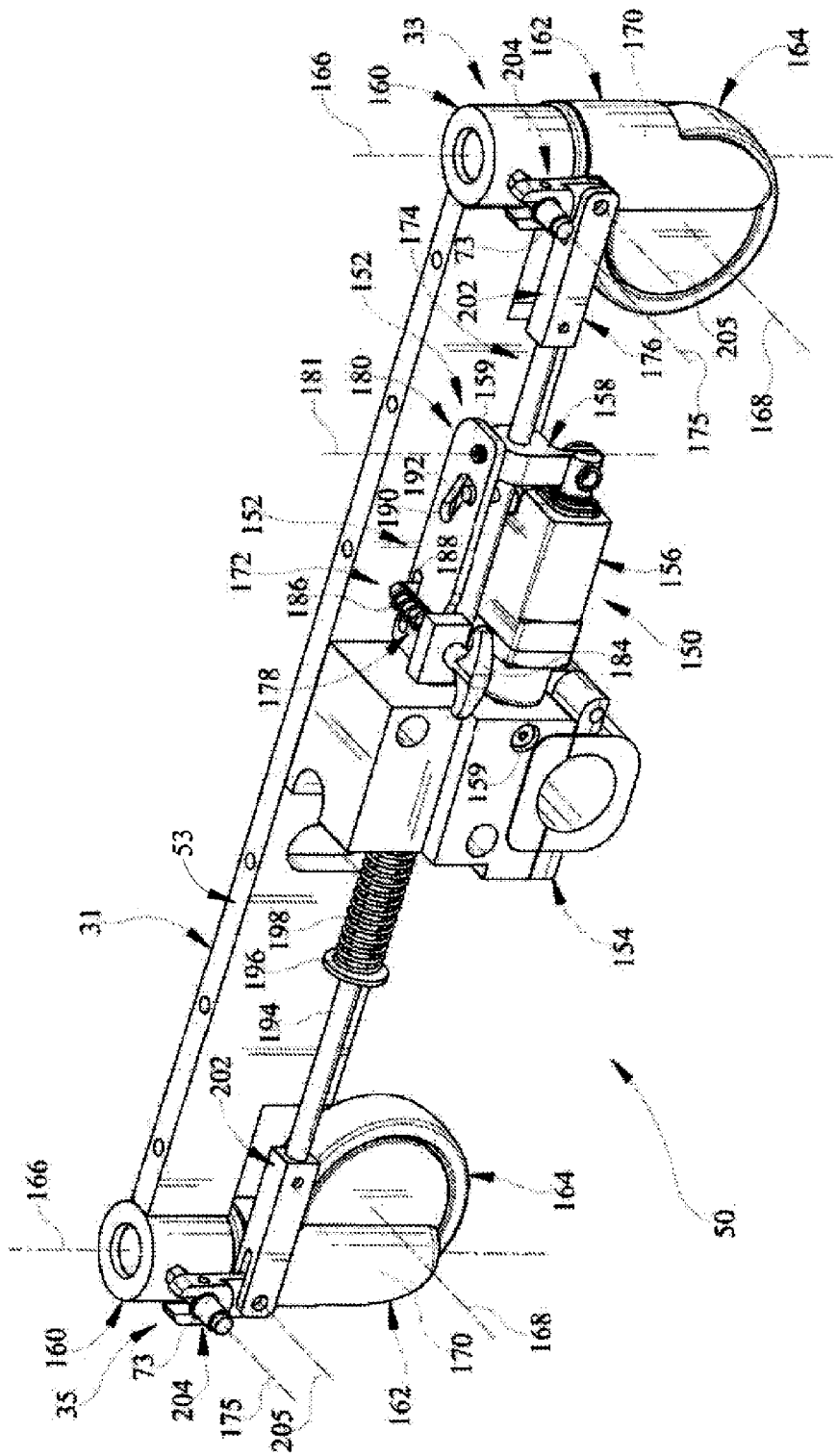
FIG. 23 is a perspective view of the braking system included in the patient support apparatus of FIGS. 1 and 2 showing that the braking system includes a manual release for disengaging brake elements of the brake system in response to a user manually pulling a plunger.

The releasable linkage 152 includes a release assembly 172, a rod assembly 174, and a pair of pivot connectors 176 connected at opposing ends of the rod assembly 174 as shown in FIG. 23. The release assembly 172 is coupled to the slider 158 of the brake drive 150 and transfers motion of the brake drive 150 to the rod assembly 174 as shown in FIG. 23. The rod assembly 174 extends through the mount block 154 and along the base 31. The pivot connectors 176 couple the rod assembly 174 to the dowels 173 and are configured to convert linear motion from the linear actuator 156 to rotating motion so that the dowels 173 are turned and the braking elements 170 of the casters 33, 35 are moved between the disengaged and the engaged configurations.

The release assembly 172 includes a handle 178 and a plate 180 as shown in FIG. 24. The handle 178 includes a support block 182, a plunger 184, and a biasing spring 186. The support block 182 is coupled to the mount block 154 and supports the plunger 184 for sliding movement perpendicular to the rod assembly 174. The plunger 184 is configured to be pulled out by a user to release the casters 33, 35 from the braked configuration. The biasing spring 186 is configured to bias the plunger 184 away from being pulled out.

The plate 180 is coupled to the slider 158 of the brake drive 150 for pivotable movement relative thereto about an axis 181 as shown in FIG. 23. The plate 180 is formed to include a plunger slot 188 and a rod slot 190. The plunger slot 188 receives the plunger 184 and allows the plunger to slide along the plunger slot 188. The rod slot 190 is illustratively L-shaped and receives a pin 192 included in the rod assembly 174.

The rod assembly 174 includes a shaft 194, the pin 192, a flange 196, and a biasing spring 198 as shown in FIG. 24. The shaft 194 extends through the mount block 154 along the length of the base 31. The pin 192 extends perpendicularly up from the shaft 194. The flange 196 extends outwardly from the shaft 194 and is spaced apart from the mount block 154. The biasing spring 198 is configured to bias the releasable linkage 152 so that the braking system 50 is moved from the braked configuration to the unbraked configuration when the plunger 184 is pulled out and the linear actuator 156 of the brake drive 150 is extended.

Each of the pair of pivot connectors 176 includes an end cap 202 and a pivot fork 204 as shown in FIG. 24. The end cap 202 is coupled to an end of the shaft 194. The pivot fork 204 is coupled to the end cap 202 for pivotable movement relative to the end cap 202 about an axis 205. Each pivot fork 204 is also configured to receive the one of the dowels 173 to turn the dowels 173 about an axis 175 in response to linear motion of the shaft 194 and the end caps 202 as shown in FIGS. 25A and 26A.

In powered operation, the braking system 50 is in the unbraked configuration when the linear actuator 156 is in the retracted position as shown in FIG. 25A. In response to a user input to remote pendant 60, the linear actuator 156 is extended as suggested by arrow 206 shown in FIG. 26A-C. When the linear actuator 156 is extended, the releasable linkage 152 converts the linear motion of the actuator 156 to rotation of the dowels 173 about 30 degrees as suggested by angle α so that the braking elements 170 are engaged and the casters 33, 35 are moved to the braked configuration. The braking system 50 may be returned to the unbraked configuration by a user operating the remote pendant 60 to retract the linear actuator 156.

To manually release the casters 33, 35 from the brake drive 150 when the brake system is in the braked configuration, a user pulls the plunger 184 out as suggested by arrow 208 in FIG. 27A. In response to the plunger 184 being pulled out, the plate 180 pivots about the axis 181 so that the pin 192 is moved to the long section of the slot 190 and the shaft 194 of the releasable linkage 152 is free to move relative to the brake drive 150. When the linkage 152 is free to move relative to the brake drive 150, the biasing spring 198 moves the shaft 194 of the linkage 152 as suggested by arrow 210 in FIG. 28A so that the braking elements 170 of the casters 33, 35 are disengaged and the braking system 50 is moved to the released-and-unbraked configuration. The releasable linkage 152 remains free to move relative to the brake drive 150 until the linear actuator 156 is retracted so that spring 186 pulls the plunger 184 back in, thereby linking the brake drive 150 and the releasable linkage 152 so that the braking system 50 is in the unbraked configuration as shown in FIG. 25A.

An alternative brake system 50' for holding the patient support apparatus in place on the floor 16 is shown in FIGS. 29-34 and includes a pair of brake drives 150', a pair of caster sets 33', 35', and a pair of releasable linkages 152'. For ease of description, only one of each pair of components is further described below. However, the following description is applicable to each of the components included in the pair. The brake drive 150' is configured to be coupled to the controller 40 and is configured to drive the braking system 50' between a braked configuration and an unbraked configuration in response to a user turning rotary switch 86 as suggested by arrow 87 in FIG. 22. The releasable linkage 152' is coupled between the brake drive 150' and the casters 33', 35'. The releasable linkage is configured to allow a user to manually free the braking system 50' to move to a released-and-unbraked configuration. The manually achieved released-and-unbraked configuration allows a user to move the patient support apparatus 10 in case of a power failure, an emergency, or an equipment failure.

Figure 30:
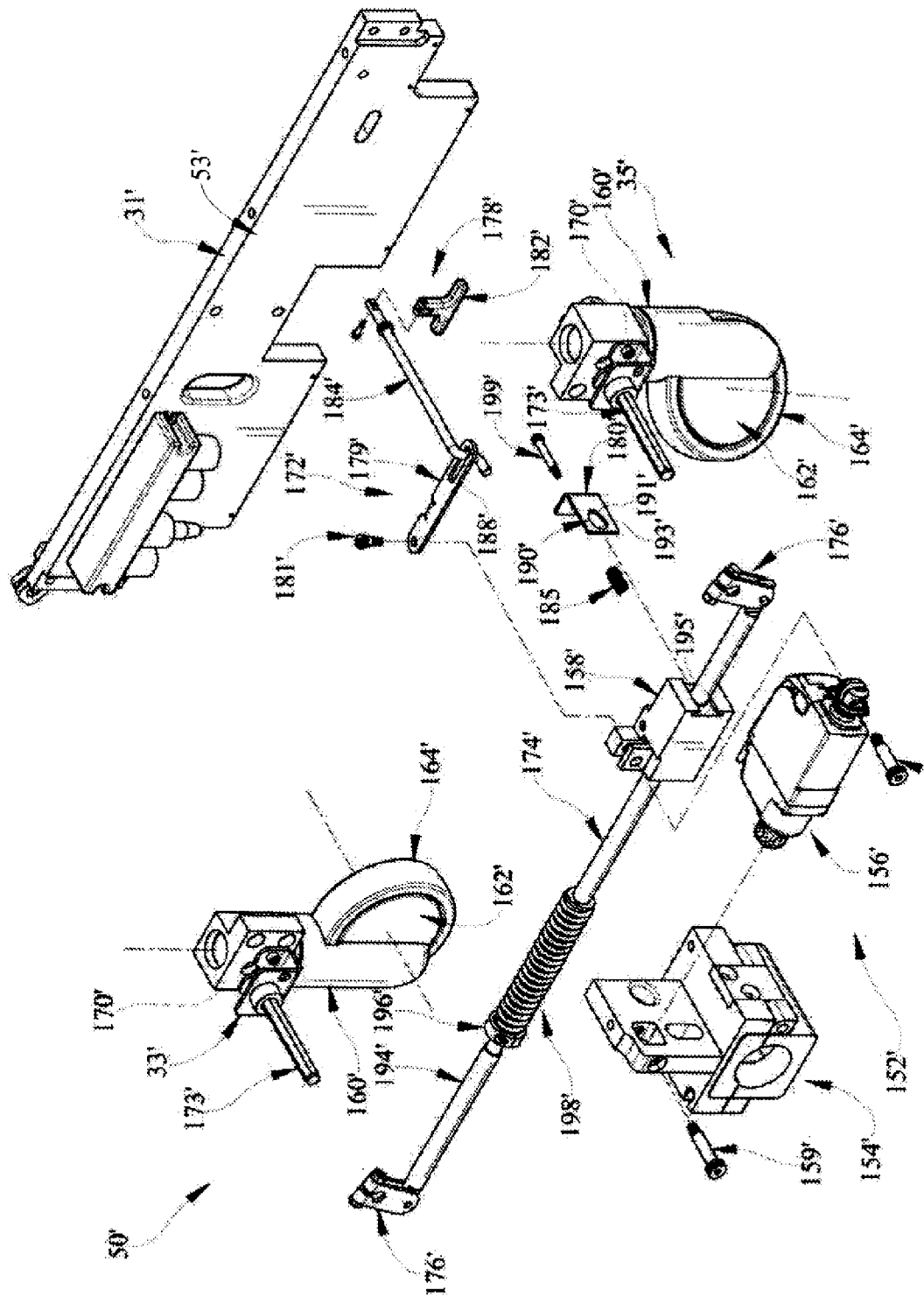
FIG. 30 is an exploded view of the alternative braking system of FIG. 29.

The brake drive 150' includes a mount block 154', a linear actuator 156', and a slider 158' as shown in FIG. 30. The mount block 154' is coupled to a lower plate 53', (similar to the lower plate 53 included in one of the columns 24, 26 described above). Mount block 154' supports the linear actuator 156' and the releasable linkage 152'. The linear actuator 156' is coupled to the mount block 154' by a bolt 159' and is configured to extend and retract in response to a user input to the remote pendant 60. The slider 158' is coupled to the releasable linkage 152' and to the linear actuator 156' by a bolt 155'.

The casters 33', 35' each include a stem 160', a hub 162', and a wheel 164' as shown in FIG. 30. The stem 160' is coupled to the lower plate 53'. The hub 162' and the wheel 164' are coupled to the stem 160' for pivotable movement about a vertical axis 166' so that the caster can change direction relative to the base 31'. The wheel 64' is coupled to the hub 162' for rotation about a horizontal axis 168' so that the casters 33', 35' can roll. In the illustrative embodiment, the casters 33', 35' are substantially similar to casters 33, 35 and are each of a type described in U.S. Pat. No. 7,506,404 available from TENTE USA.

Figure 29:
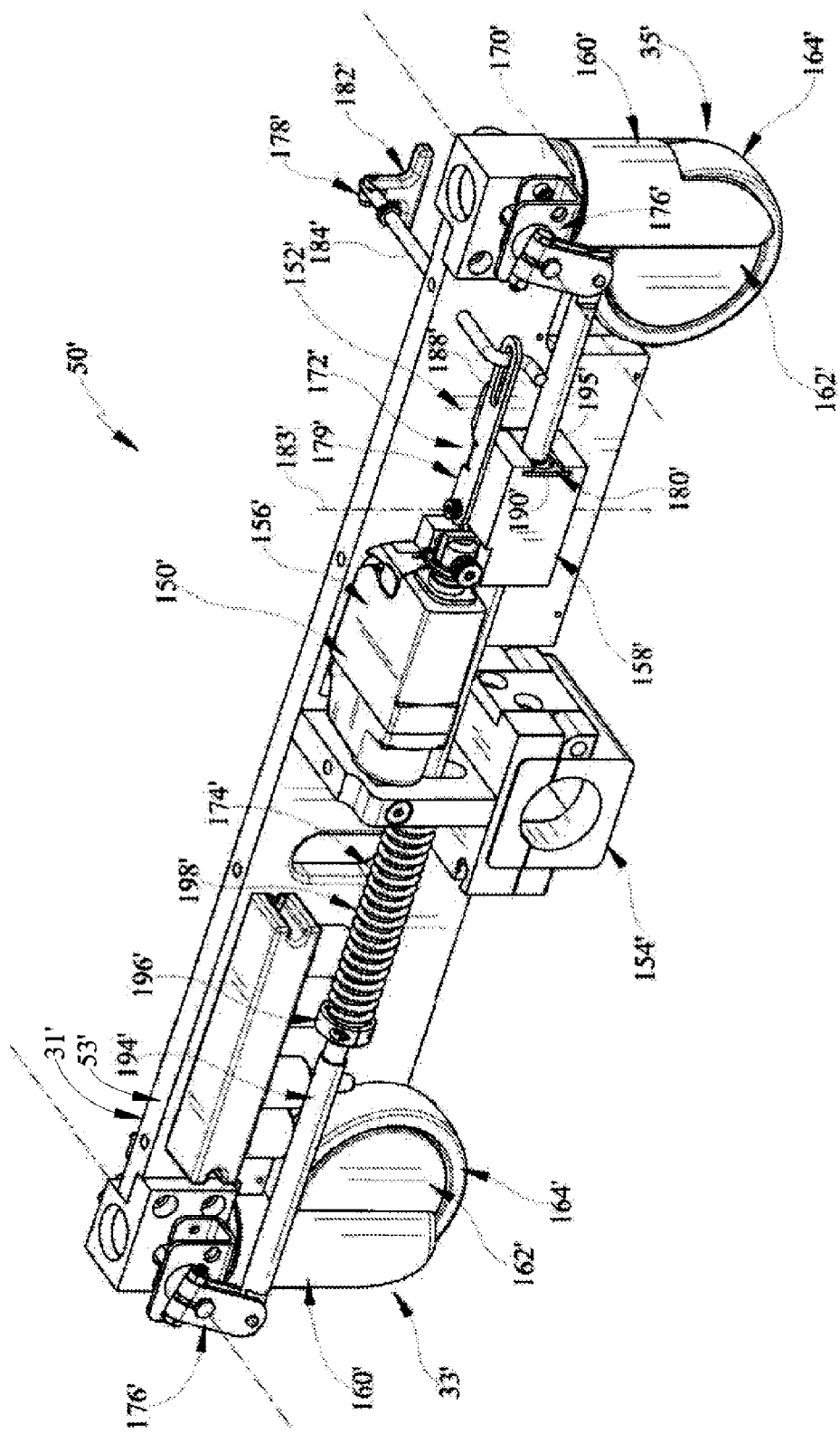
FIG. 29 is a perspective view of an alternative braking system configured to be used in the patient support apparatus of FIGS. 1 and 2 showing that the alternative braking system includes a manual release for disengaging brake elements of the brake system in response to a user manually pulling a plunger.

Each of the four casters 33', 35' also include a braking element 170' housed inside stem 160' as shown in FIG. 29. The braking element 170' is movable between a disengaged and an engaged configuration. In the disengaged configuration, the braking element 170' allows pivoting of the hub 162' and the wheel 164' about the vertical axis 166' and allows rotation of the wheel 164' about the horizontal axis 168'. In the engaged configuration, the braking element 170' blocks pivoting of the hub 162' and the wheel 164' about the vertical axis 166' and blocks rotation of the wheel 164' about the horizontal axis 168', thereby completely immobilizing the casters 33', 35'. Unlike the prior art in which only one caster is completely immobilized to provide a steer mode or to resist some movement of a patient support in a brake mode, when the casters 33', 35' of the braking system 50' are driven to the braked configuration, the braking elements 170' of all four casters 33', 35' are engaged to immobilize the casters 33', 35'. The immobilization of the casters 33', 35' prevents movement of the patient support apparatus 10 during surgery. To move the braking elements 170' of the casters 33', 35' between the disengaged and the engaged configuration, a dowel 173' extending into the stem 160' is rotated. The dowel 173' has at least one flat side and is hexagonal in the illustrative embodiment.

Figure 31:
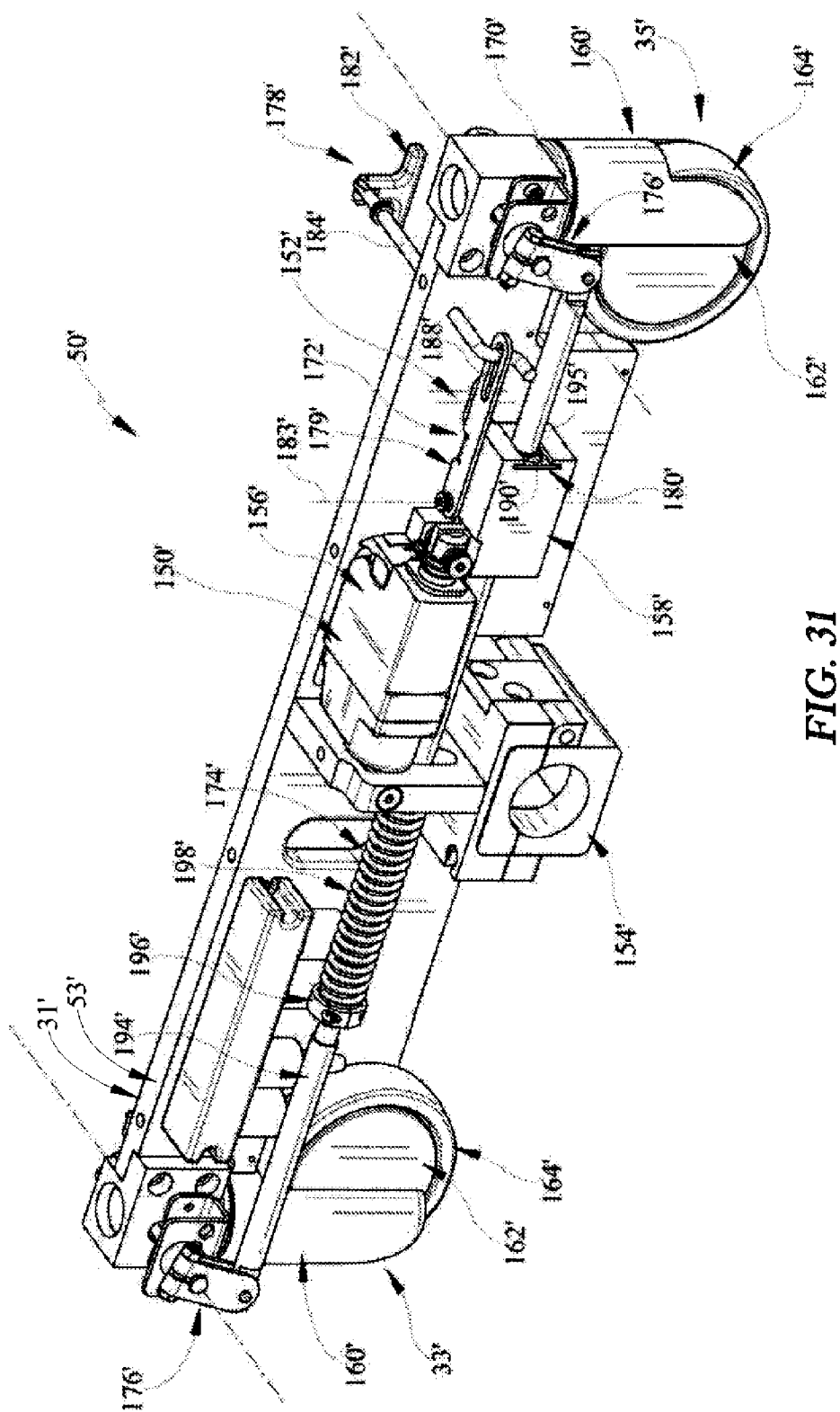
FIG. 31 is a perspective view of braking system of FIGS. 29-30 showing the braking system in an unbraked configuration.
Figure 32:
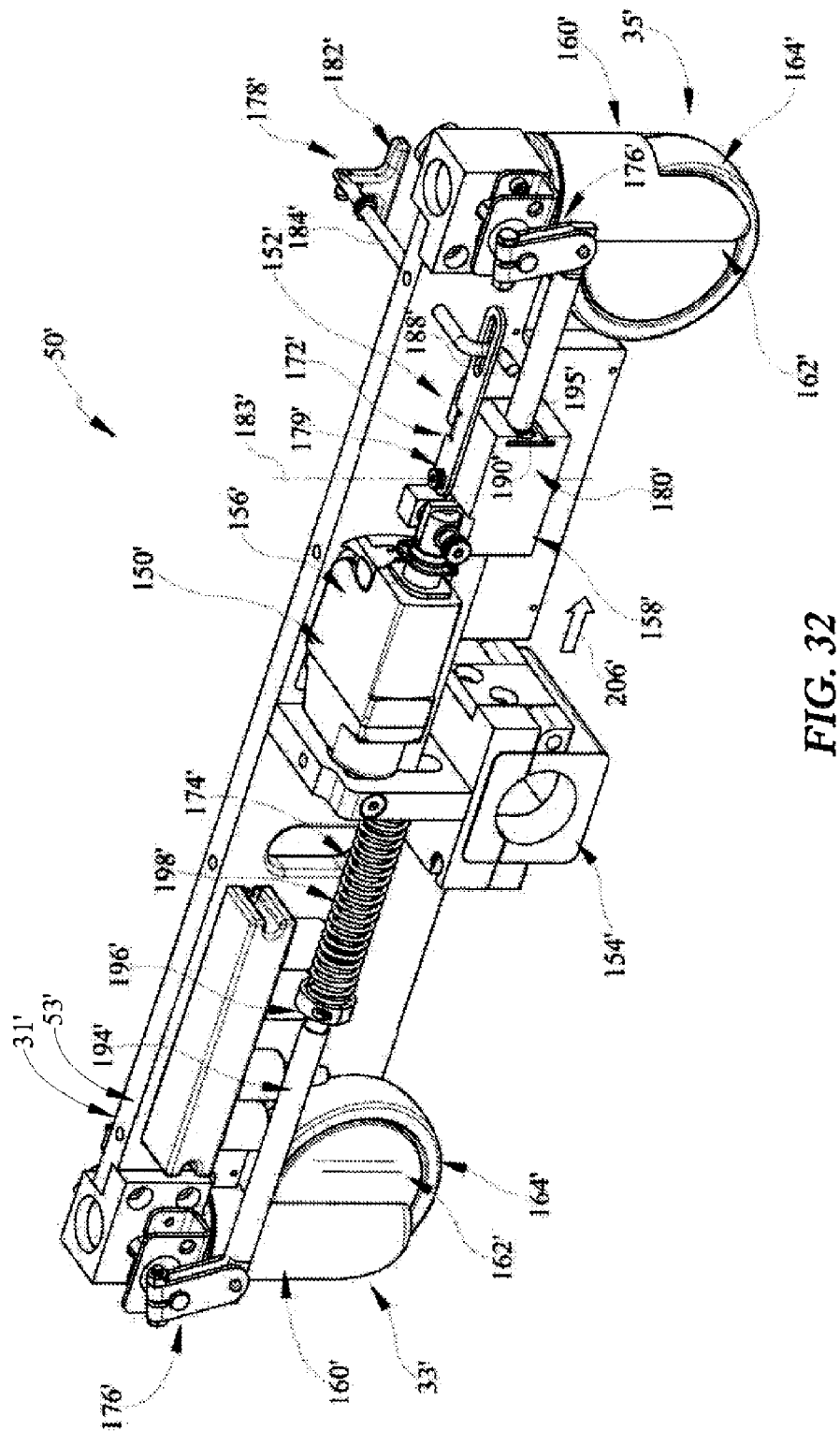
FIG. 32 is a perspective view similar to FIG. 31 showing the braking system moved to the braked configuration.

The releasable linkage 152' is configured to convert linear motion from the brake drive 150' into rotation of the dowels 173' so that the braking system 50' is driven between the unbraked and the braked configuration as suggested in FIGS. 31 and 32. The releasable linkage 152' is also configured to manually release the casters 33', 35' from the brake drive 150' and to move the braking elements 170' of the casters 33', 35' from the engaged configuration to the disengaged configuration so that the braking system is in the released-and-unbraked configuration when a user manually releases the linkage 152' as suggested in FIGS. 33 and 34.

The releasable linkage 152' includes a release assembly 172', a rod assembly 174', and a pair of pivot connectors 176' connected at opposing ends of the rod assembly 174' as shown in FIG. 30. The release assembly 172' is coupled to the slider 158' of the brake drive 150' and transfers motion of the brake drive 150' to the rod assembly 174' as shown in FIG. 32. The rod assembly 174' extends through the mount block 154' and along the base 31'. The pivot connectors 176' couple the rod assembly 174' to the dowels 173' and are configured to convert linear motion from the linear actuator 156' to rotating motion so that the dowels 173' are turned and the braking elements 170' of the casters 33', 35' are moved between the disengaged and the engaged configurations.

The release assembly 172' is configured to selectively transfer motion of the brake drive 150' to the rod assembly 174'. The release assembly 172' includes a handle 178', a link member 179', and a plate 180'. The handle 178' is configured to be pulled by a user to disconnect the brake drive 150' and the rod assembly 174' so that the brake system 50' is moved to the unbraked configuration. The link member 179' extends between the handle 178' and the plate 180'. The plate 180' is coupled to the slider 158' and moves between a first position transferring motion of the brake drive 150' to the rod assembly 174' and a second position releasing the brake drive 150' from the rod assembly 174'.

The rod assembly 174' includes a shaft 194', a flange 196', and a biasing spring 198' as shown in FIG. 30. The shaft 194' extends through the mount block 154' along the length of the base 31'. The flange 196' extends outwardly from the shaft 194' and is spaced apart from the mount block 154'. The biasing spring 198' is configured to bias the releasable linkage 152' so that the braking system 50' is moved from the braked configuration to the unbraked configuration when the handle 178' is pulled out and the linear actuator 156' of the brake drive 150' is extended.

The handle 178' includes a grip 182' and a rod 184' as shown in FIG. 29. The grip 182 is a T-shape grip configured to be pulled by a user. The rod 184' extends from the grip 182' to the link member 179'.

The link member 179' is coupled to the block 158' for pivotable movement about a link axis 181' as shown in FIG. 29. The link member 179' is also coupled to the plate 180' so that the plate 180' moves between the first and second positions when the link member 179' pivots. The link member 179 is formed to include a rod slot 188' sized to receive the rod 184' of the handle 178' so that the rod 184' can slide along the plate 180' when a user pulls on the grip 182'.

The plate 180' is received in a slot 195' formed in the slider 158' and is blocked from being removed by a bolt 199'. The plate 190' configured to slide between the first position and the second position when the link member 179' pivots. The plate 180' is formed to include a hole 192' with a first section 191' sized to engage the shaft 194' of the rod assembly 174' and a second section 193' sized to allow the shaft 914 of the rod assembly 174' to slide past the plate 180'. The plate 180' is biased to the first position by a spring 185'.

In powered operation, the braking system 50' is in the unbraked configuration when the linear actuator 156' is in the retracted position as shown in FIG. 31. In response to a user input to rotary switch 86, the linear actuator 156' is extended as shown in FIG. 32. When the linear actuator 156' is extended, the releasable linkage 152' converts the linear motion of the actuator 156' to rotation of the dowels 173' about 30 degrees so that the braking elements 170' are engaged and the casters 33', 35' are moved to the braked configuration. The braking system 50' may be returned to the unbraked configuration by a user operating the remote pendant 60 to retract the linear actuator 156'.

Figure 33:
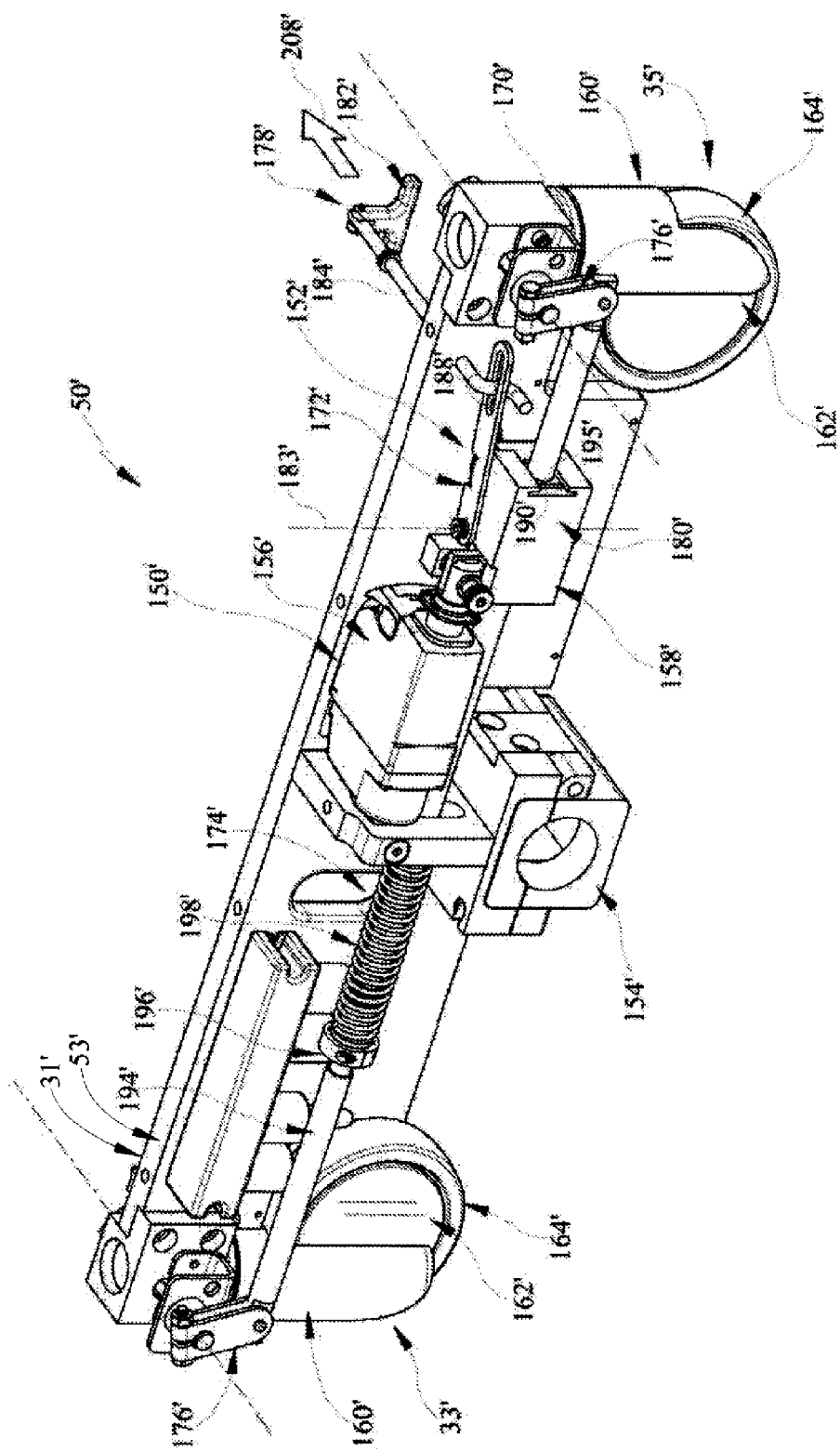
FIG. 33 is a perspective view similar to FIG. 32 showing the braking system in the braked configuration as a user pulls a release handle included in the braking system.
Figure 34:
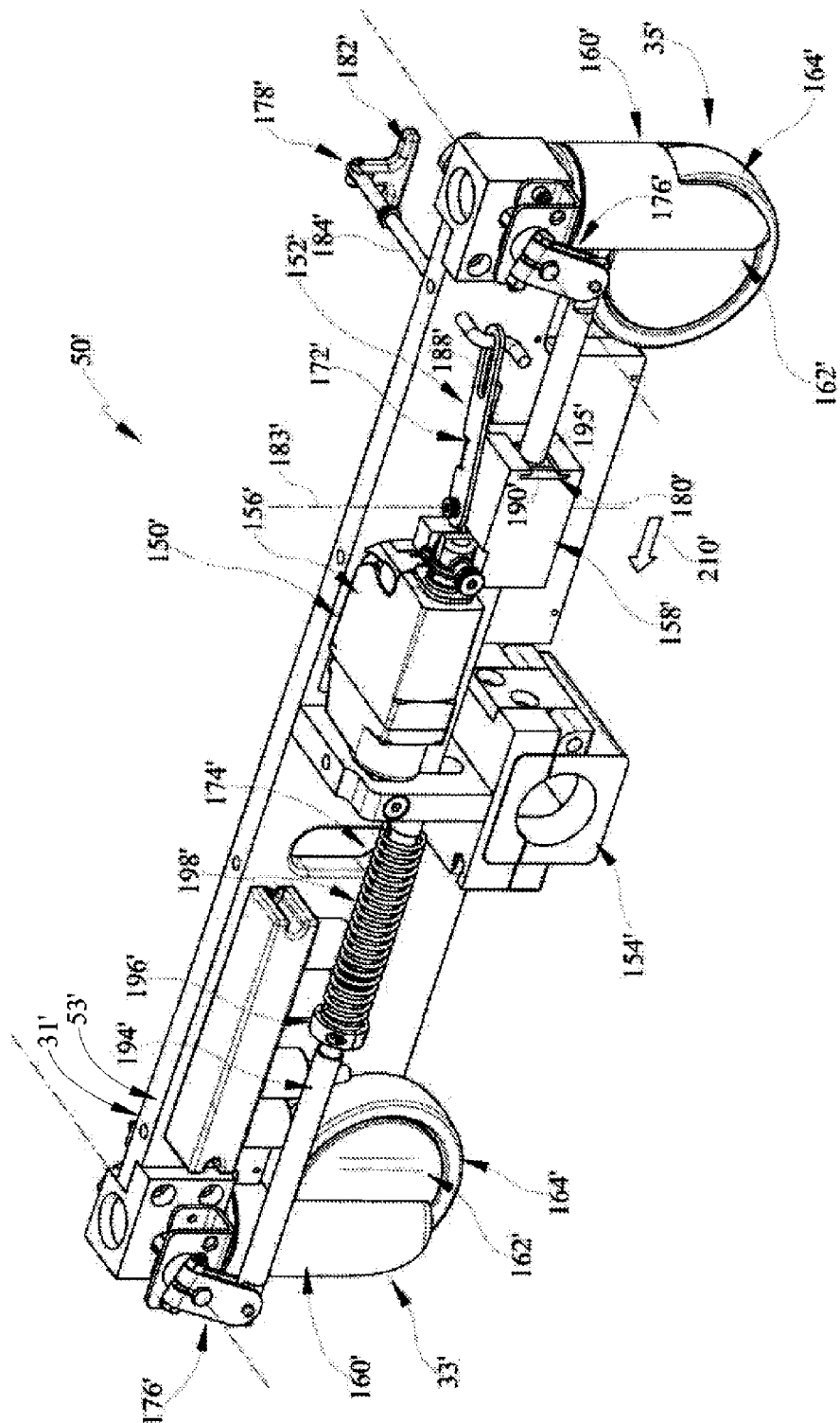
FIG. 34 is a perspective view similar to FIG. 33 showing the braking system returning to the unbraked configuration in response to the release handle being pulled.

To manually release the casters 33', 35' from the brake drive 150' when the brake system is in the braked configuration, a user pulls the grip 182' out as suggested in FIG. 33. In response to the grip 182' being pulled out, the plate 180' pivots about the axis 183' so that the plate 180' is moved to the second position and the shaft 194' of the releasable linkage 152' is free to move relative to the plate 180' and the brake drive 150'. When the linkage 152' is free to move relative to the brake drive 150', the biasing spring 198' moves the shaft 194' of the linkage 152' as shown in FIG. 34 so that the braking elements 170' of the casters 33', 35' are disengaged and the braking system 50' is moved to the released-and-unbraked configuration. The releasable linkage 152' remains free to move relative to the brake drive 150' until the linear actuator 156' is retracted so that the grip 182' is pulled back in, thereby linking the braking drive 150' and the releasable linkage 152' so that the braking system 50' is in the unbraked configuration as shown in FIG. 31.

Another alternative brake system 50" is shown in FIGS. 35 and 36 for use with the foundation frame 12. The brake system 50" includes a left brake leg 154", a right brake leg 155", and an actuator 156" all coupled to the base 31 of the first column 24. The brake system 50" also includes a left brake leg (not shown), a right brake leg (not shown), and an actuator (not shown) coupled to the base 31 of the second column 26 that are substantially similar to brake legs 154", 155" and actuator 156". The left brake leg 154" and the right brake leg 155" are spaced apart from and located between the left caster 33" and the right caster 35" of the first column 24 as shown in FIGS. 35 and 36.

Each brake leg 154", 155" includes a sleeve 158" and a plunger 160" received in the sleeve 158". The plungers 160" are configured to move between an extended position shown in FIG. 35 and a retracted position shown in FIG. 36. When the plungers 60" are in the extended position, the braking system 50" is braked and the plungers 160" engage the floor 16 underlying the patient support 10 to lift the casters 33", 35" away from the floor 16. When the casters 33",35" are out of contact with the floor 16, the left caster 33" and the right caster 35" are prevented from rolling along the floor 16. When the plungers 60" are in the retracted position, the braking system 50" is unbraked and the plungers 60" disengage the floor 16 so that the casters 33", 35" contact the floor 16 and are free to roll along the floor 16. The actuator 156" extends or retracts the plungers 160" in response to a user input to rotary switch 86.

Additionally, the brake system 50" includes a releasable linkage (not shown) coupled between the plungers 160" and the actuator 156". The linkage (not shown) is configured to disconnect the plungers 160" from the actuator 156" when the plungers 160" are in the extended position in response to a user pulling a handle 178". The plungers 160" are biased toward the retracted position when the plungers 160" are disconnected from the actuator 156".

Another alternative braking system 50''' is shown in FIGS. 37 and 38 for use with foundation frame 12. The braking system 50''' is substantially similar to the braking system 50" described herein and similar reference numbers reflect similar components. However, the location of the left leg 154''' and the right leg 155''' included in the braking system 50''' is different from the location of the left leg 154" and the right leg 155" in the braking system 50".

Specifically, the left leg 154''' integrated with a left caster 333''' and the right plunger 156''' is integrated with a right caster 335''' as shown in FIGS. 37 and 38. The sleeve 158''' of left and right legs 154''' form a stem of the casters 333''', 335'''. Each caster 333''' and 335''' include wheels 164L and 164R coupled to the sleeves 158''' of the legs 154''', 156''' for rotation about the legs 154''', 156'''. Thus legs 154''' and 156''', including plungers 160''', are located between the wheels 164L, 164R as shown in FIGS. 37 and 38.

Figures 39, 40:
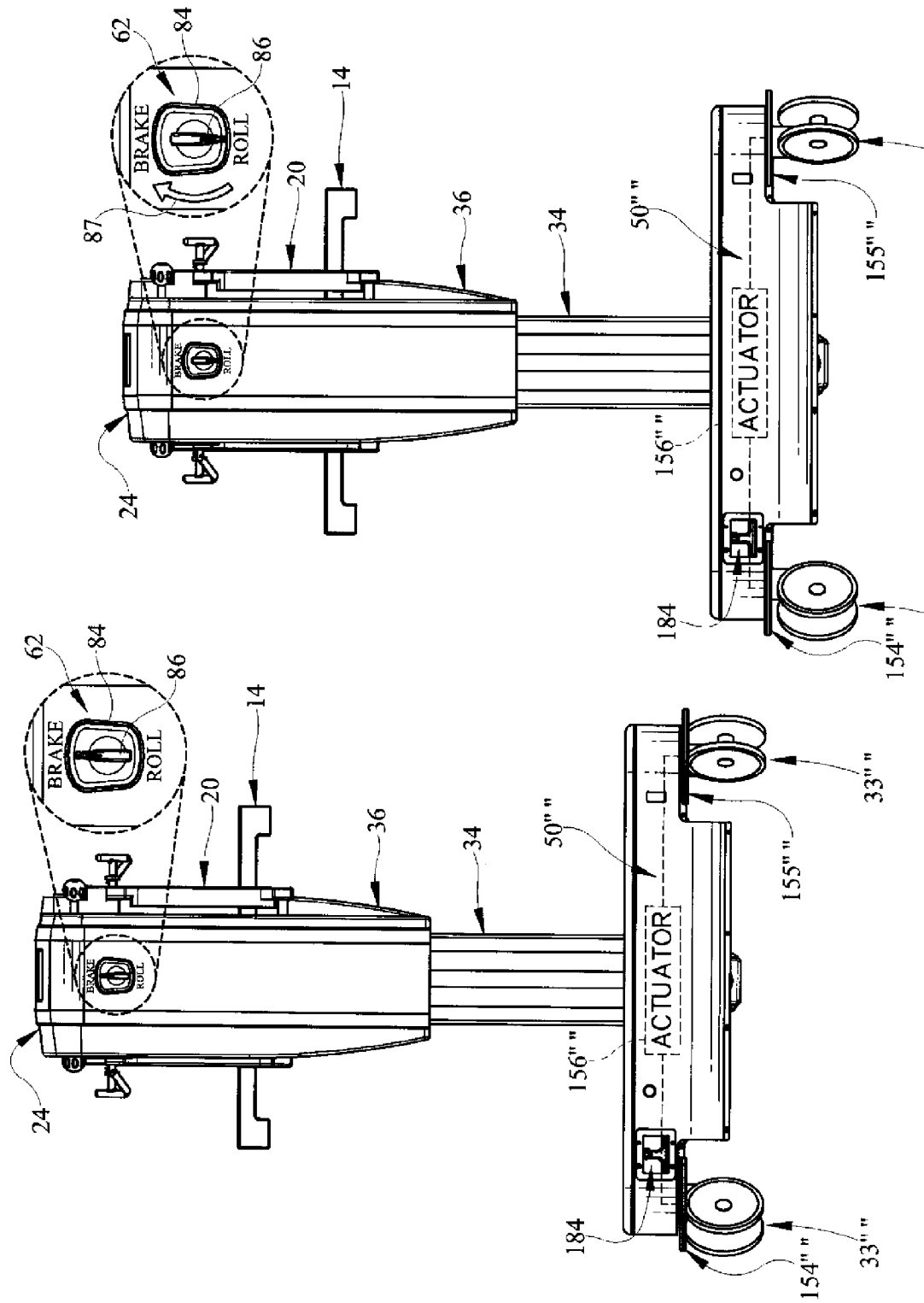
FIG. 39 is an outboard view of a first column included in yet another alternative patient support apparatus with another alternative braking system showing a rotary switch coupled to the first column in a "BRAKE" position so that brake rings included in the braking system are in a lowered, engaged position contacting wheels included in the casters to block the wheels from turning or rolling.
FIG. 40 is a view similar to FIG. 39 showing the rotary switch moved to a "ROLL" position so that brake rings included in the braking system are in a raised, disengaged position freeing wheels included in the casters to turn and roll.

Yet another alternative brake system 50'''' is shown in FIGS. 39 and 40 for use with the foundation frame 12. The brake system 50'''' includes a left ring 154'''', a right ring 155'''', and an actuator 156'''' all coupled to the base 31 of the first column 24. The brake system 50'''' also includes a left ring (not shown), a right ring (not shown), and an actuator (not shown) coupled to the base 31 of the second column 26 that are substantially similar to rings 154'''', 155'''' and actuator 156''''.

The left ring 154"" and the right ring 155"" are coupled to the base 31 for movement between lowered position shown in FIG. 39 and a raised position shown in FIG. 40. In the lowered position, the braking system 50"" is braked and the rings 154"", 155"" engage the wheels of the casters 33"", 35"" to block the casters from rotating or rolling along the floor 16. In the raised position, the braking system 50"" is unbraked and the rings 154"", 155"" disengage the wheels of the casters 33"", 35"" to allow the casters to rotate or roll along the floor 16. The actuator 156" raises or lowers the rings 154"", 155"" in response to a user input to rotary switch 86.

Additionally, the brake system 50"" includes a releasable linkage (not shown) coupled between the rings 154"", 155"" and the actuator 156"". The linkage (not shown) is configured to disconnect the rings 154"", 155"" from the actuator 156"" when the rings 154"", 155"" are in the lowered position in response to a user pulling a handle 178"". The rings 154"", 155"" are biased toward the raised position when the rings 154"", 155"" are disconnected from the actuator 156".

Figures 15, 16:
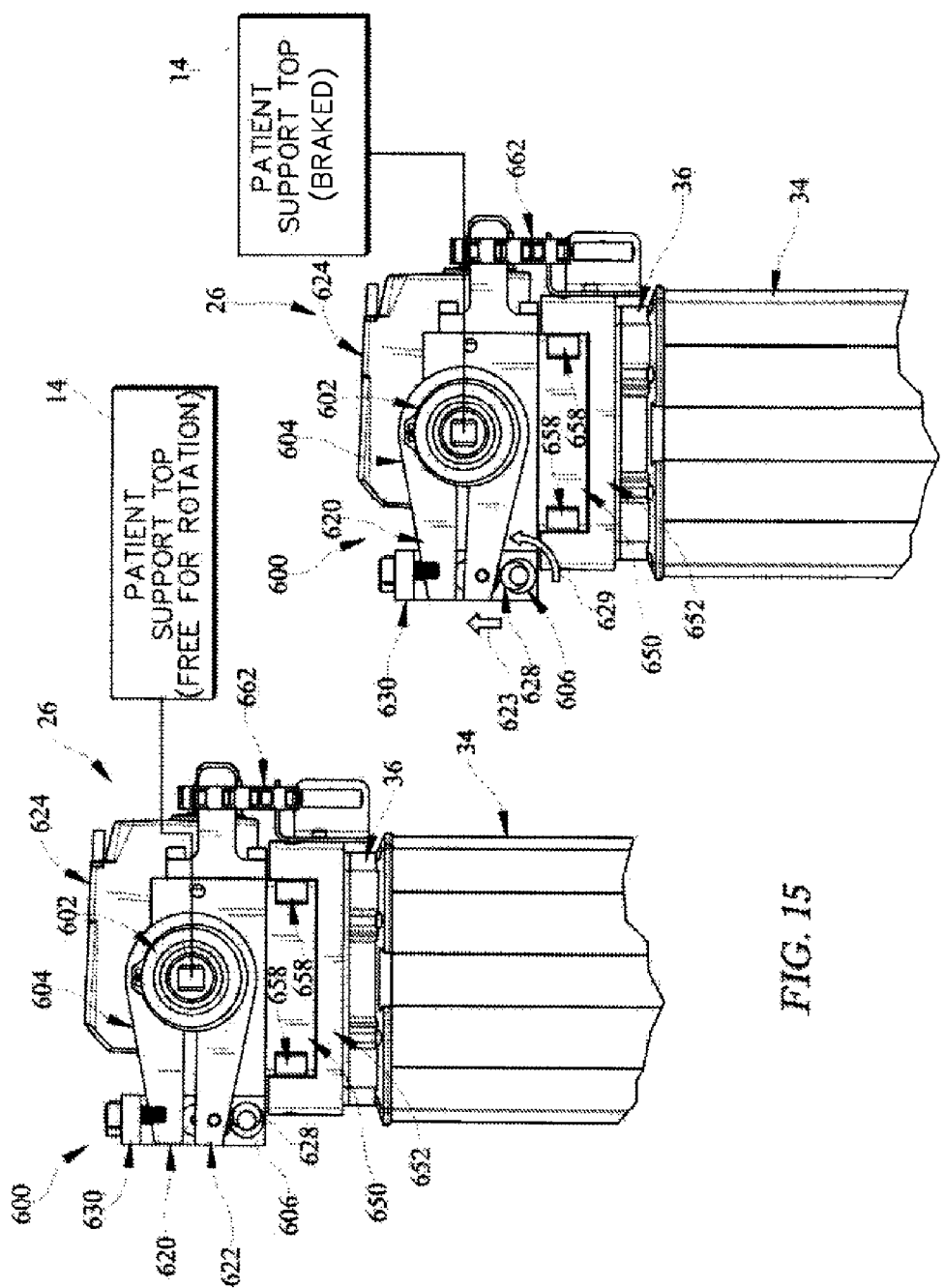
FIG. 15 is an inboard elevation view of the second column of FIG. 13 showing the braking system in an unbraked configuration allowing a shaft included in the brake system to rotate.
FIG. 16 is a view similar to FIG. 15 showing the braking system moved to a braked configuration resisting rotation of the shaft when a cam is rotated to push a lower jaw toward an upper jaw thereby squeezing the shaft.

The patient support top 14 is dynamically coupled to the foundation frame 12 so that the patient support top 14 can move in response to reconfiguration of the foundation frame 12. The patient support top 14 includes a first rail 214, a second rail 216, a pair of cross beams 219 located at either end of the first rail 214 and the second rail 216, and two motion couplers 218 each coupled to a cross beam 219 as shown in FIG. 16. The first rail 214 and the second rail 216 are spaced apart and extend parallel to one another. The cross beams 219 extend from the first rail 214 to the second rail 216 to establish a support frame 225 upon which a surgical patient is supported. The motion couplers 218 are coupled to the support frame 225 and to the foundation frame 12 (by the yoke bracket 20) to allow movement of the support frame 225 about a horizontal axis 215 relative to the foundation frame 12, for instance, in response to reconfiguration of the rotation system 46 and/or the lift system 48 of the foundation frame 12. In addition, the motion couplers 218 allow sliding and shifting of the support frame 225 relative to the foundation frame 12 as suggested in FIGS. 43 and 44.

Figure 41:
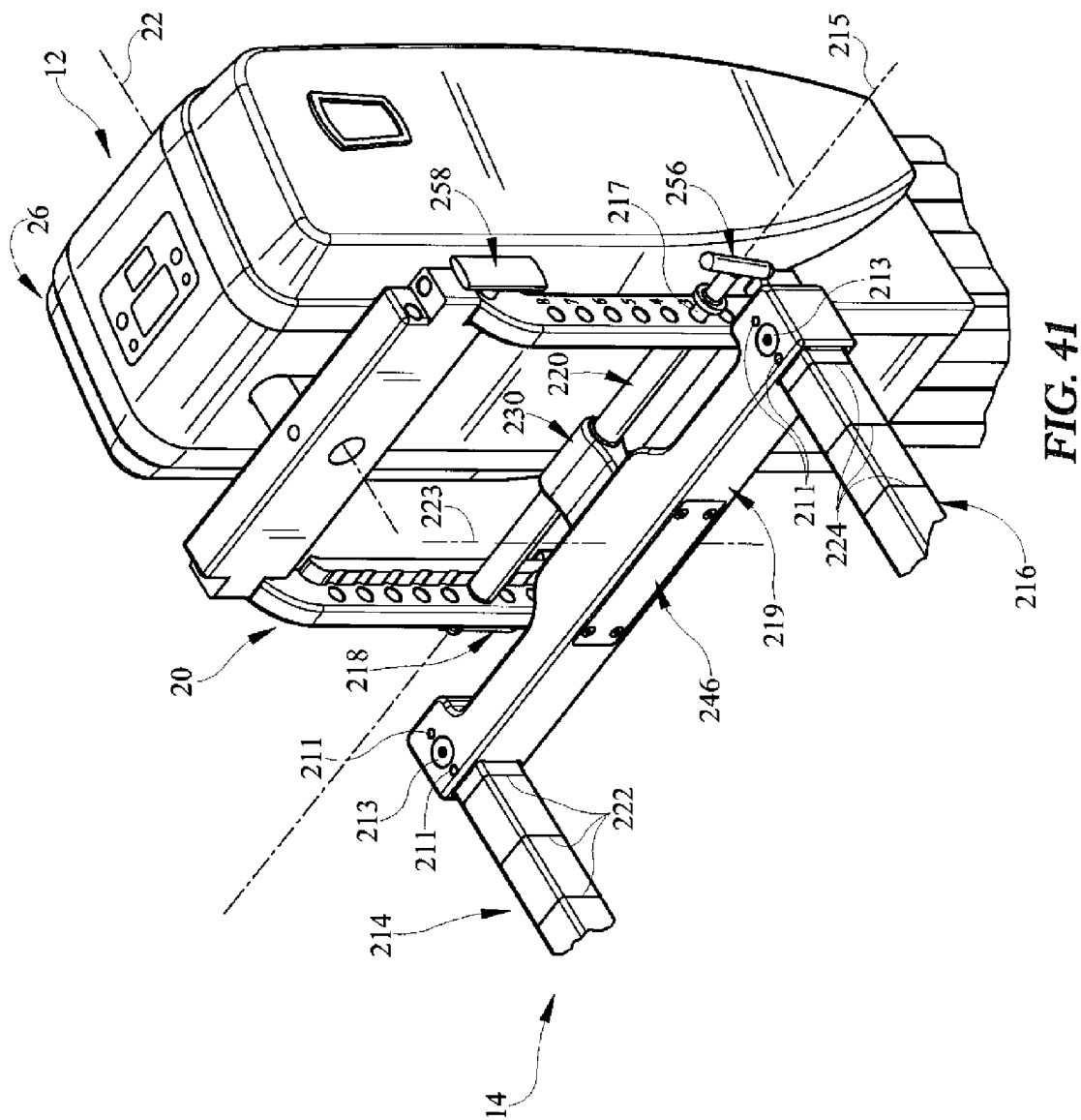
FIG. 41 is partial perspective view of the patient support of FIG. 1 showing that the patient support top includes a support frame and a motion joint that is coupled to the foundation frame by a yoke bracket.
Figure 42:
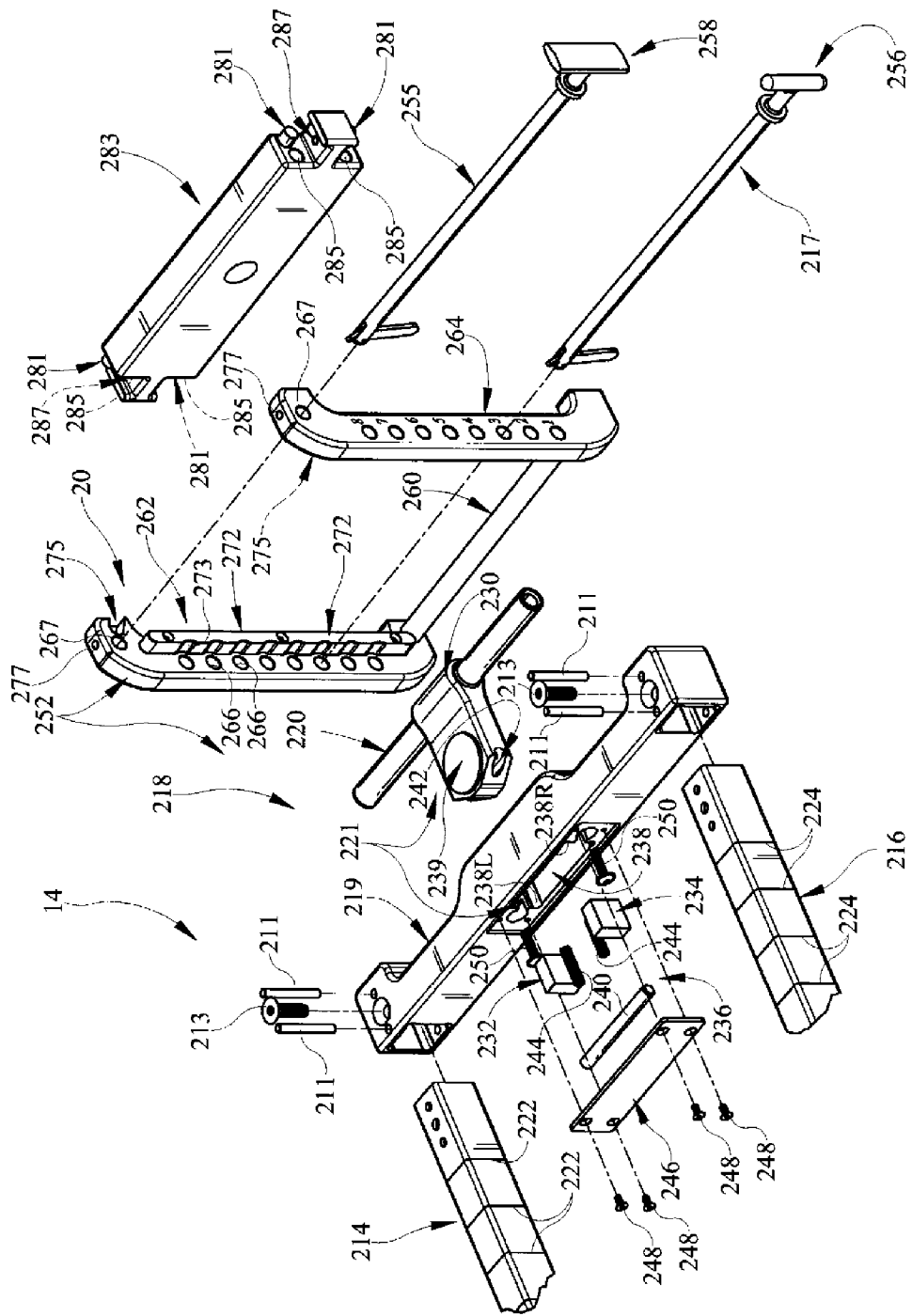
FIG. 42 is an exploded view of one end of the patient support top of FIG. 41 showing that the motion joint includes a connector configured to couple to the yoke bracket and a joint extending from the cross beam to the connector.

As shown in FIGS. 41 and 42, the first and second rails 214, 216 are illustratively square tubes formed from carbon fiber but in other embodiments may be other shapes or materials. The first rail 214 includes a number of indicator lines 222 marked perpendicular to the length of the rail 214. The second rail 216 also includes a number of indicator lines 224 marked perpendicular to the length of the rail 216. The indicator lines 224 of the second rail 216 correspond to the indicator lines 222 of the first rail 214 so that a user can gage relative position along the rails 214, 216 of accessories attached to the rails 214, 216. In the illustrative embodiment, each indicator line 222, 224 are evenly spaced about one inch apart but in other embodiments may be unevenly distributed to indicate likely positions for different types of accessories. In other embodiments, other indicators such as numbers, letters, dots, or another suitable indicator may be marked along the rails 214, 216. The cross beam 219 extends from the first rail 214 to the second rail 216 and is coupled to the first rail 214 and to the second rail 216 by a number of pins 211 and screws 213.

Each motion coupler 218 includes a connector 220 and a joint 221 as shown in FIG. 42. The connector 220 is configured to be coupled to the yoke bracket 20 and foundation frame 12 for rotation about the horizontal pivot axis 215. The connector 220 is coupled to the yoke bracket 20 by a small-knob pin 217. The joint 221 is coupled to the connector 220 and to the cross beam 219.

The joint 221 includes an arm 230, a first resilient bumper 232, a second resilient bumper 234, and an arm retainer 236 as shown in FIG. 42. The arm 230 extends from the connector and into a beam slot 238 formed in the cross beam 219. The slot 238 extends substantially parallel to the longitudinal axis of the cross beam 219. The bumpers 232, 234 locate the arm 230 in the beam slot 238 and allow the arm 230 to slide and shift in the beam slot 238 as the bumpers 232, 234 are resiliently deformed and expanded. The arm retainer 236 is configured to resist the arm 230 from being pulled out of the beam slot 238.

The first resilient bumper 232 is situated along a first side 238L of the beam slot 238. The second resilient bumper 234 is situated along a second side 238R, opposite the first side 238L, of the beam slot 238. In the illustrative embodiment, the first resilient bumper 232 and the second resilient bumper 234 are formed from rubber. In other embodiments, the bumpers 232, 234 are formed from another resilient material.

The arm retainer 236 includes a retainer pin 240 extending through an arm slot 242 formed in the arm and a pair of springs 244 extending from the retainer pin 240 to the arm 230. The retainer pin 240 extends horizontally along the slot 238 and is secured in the slot 238 by a pair of screws 250. The arm retainer 236 also includes a cover plate 246 that is coupled to the cross beam 219 by screws 248 to cover a side 249 of the slot 238 facing the rails 214, 216 as shown in FIG. 42.

The joint 221 of the illustrative embodiment also includes a low-friction pad or bushing 239 coupled to the arm 230 as shown in FIG. 42. The low-friction pad 239 to reduce abrasion of the arm 230 during sliding and shifting of the motion couplers 218 relative to the cross beams 219 of the support frame 225. The low-friction pad is illustratively made from brass but may be made from other low-friction materials.

The motion coupler 218 of the support top 14 cooperates with the yoke bracket 20 to form an offset connector 252 for coupling the support top 14 at a distance from the axis 22 of support top rotation as shown in FIG. 42. In addition to the motion coupler 218 and the yoke bracket 20, the offset connector 252 includes the small-knob pin 217 and a large-knob pin 255. The small knob pin 217 has a handle 256 colored green with a round shape and is configured to couple the motion coupler 218 to the yoke bracket. The large-knob pin 255 has a handle 258 colored red with an oblong cross-section and is configured to couple the yoke bracket 20 to the foundation frame 12. By using differently shaped and colored handles 256, 258 a user can be sure they are pulling the correct pin 217, 255 when adjusting the connection between the foundation frame 12 and the support top 14.

The yoke brackets 20, sometimes called "H" brackets, are coupled between the foundation frame 12 and the patient support top 14 as shown in FIG. 1. Each yoke bracket 20 includes a base member 260, a left coupling member 262, and a right coupling member 264 spaced apart from the left coupling member 262 as shown in FIG. 45. The left coupling member 262 is coupled to the base member 260 and extends substantially perpendicular to the base member 260. The right coupling member 264 is coupled to the base member 260 and extends substantially perpendicularly to the base member 260.

Both the left and the right coupling members 262, 264 of the yoke bracket 20 are formed to include a number of attachment holes 266, a coupling hole 267, a retainer slot 275, and a resistance divot 277. The attachment holes 266 are used to attach the support top 14 to the yoke bracket 20. The coupling hole 267 is used to secure the yoke bracket 20 to a connection block 283 included in the foundation frame 12. The retainer slot 275 is used to retain attachment of the yoke bracket 20 to the foundation frame 12 when the large knob pin 255 is pulled out of the yoke brackets 20 so that a patient is not accidentally dropped during a surgery. The resistance divot 277 provides secondary retention means that resists movement of the yoke bracket 20 away from engagement with the connection block 283 when the yoke bracket 20 is coupled to the connection block 283 so that a patient is not accidentally dropped during a surgery.

The attachment holes 266 and the coupling hole 267 extend through between inner surfaces 268 and outer surfaces 270 of the coupling members 262, 264. The attachment holes 266 extend parallel to the base member 260 through the left and the right coupling members 262, 264 and are arranged in a line perpendicular to the base member 260. Each of the left and the right coupling members 262, 264 includes numerical markings 271 associating each pair of corresponding attachment holes. In other embodiments, the numerical markings may be alphabetical characters or other indicators allowing a user to identify corresponding holes 266 in the left and the right coupling members 262, 264. The coupling holes 267 are spaced apart from the base member 260 and are arranged out of alignment with the attachment holes 266.

The retainer slots 275 are configured to receive retainer pegs 281 included in connection block 283. The retainer slot 275 extends in from the inner surface 268 toward the outer surface 270 of the coupling members 262, 264. The retainer slots 275 are situated near the coupling hole 267.

The resistance divots 277 extend down from a top surface 279 of each coupling member 262, 264. Each resistance divot 277 receives a spring-loaded ball 287 coupled to coupler block 283 when the yoke bracket 20 is mounted on the connector block 283. When the resistance divot 277 receives the spring-loaded ball 287, light resistance to the removal of yoke bracket 20 from connector block 283 is applied by spring-loaded ball 287.

Each yoke bracket 20 also includes a left ledge 272 and a right ledge 274 as shown in FIG. 45. The ledges 272, 274 are configured to ensure that the patient support top 14 is properly coupled to the yoke bracket 20 before a patient is placed on the patient support apparatus 10. The left ledge 272 extends from the left coupling member 262 toward the right coupling member 264 and is arranged along the inner surface 268 of the left coupling member 262. The right ledge 274 extends from the right coupling member 264 toward the left coupling member 262 and is arranged along the inner surface 268 of the right coupling member 264. The left and the right ledges 272, 274 are formed to include a number of notches 273, each notch 273 corresponding to and align with an attachment hole 266 and each notch 273 extends into the ledge 272, 274 away from the corresponding hole 266. The shape and location of the ledges 272, 274 block a user from placing the connector 220 of the patient support top 14 fully between the left and the right coupling members 262, 264 when the connector 220 is not aligned with a pair of corresponding coupler holes 266.

The yoke bracket 20 is mounted to the foundation frame 12 and couples to the support top 14 to suspend the patient support top 14 from the foundation frame 12. To mount the yoke bracket 20 to the connection block 283 of the foundation frame 12, a user lowers the yoke bracket 20 toward the connector block 283 with the retainer slots 275 facing downwardly as suggested by arrows 289 in FIG. 47. The user aligns retainer slots 275 with retainer pegs 281 as shown in FIG. 48. The yoke bracket 20 is slid relative to connector block 283 as suggested by arrow 291 in FIG. 48A so that the retainer pegs 281 are received in retainer slots 285. The yoke bracket 20 is pivoted about retainer pegs 281 as suggested by arrow 293 in FIG. 48A so that the coupling hole 267 of the yoke bracket 20 aligns with a securing hole 285 formed through connector block 283 as shown in FIG. 50A. The pin 258 is slid through the aligned coupling hole 267 and securing hole 285 as suggested by arrow 295 to secure the yoke bracket 20 to the connector block 283 as shown in FIG. 51. The yoke bracket 20 and the connector block 283 are then pivoted about the support top axis 22 as suggested by arrow 297 so that the yoke bracket 20 is mounted to the foundation frame 12 for use in supporting a patient suspended from the foundation frame 12.

When the yoke bracket 20 is mounted to the connector block 283 of the foundation frame 12, the yoke bracket 20 is retained in connection with the connector block 283 of the foundation frame 12 by the retainer pegs 281 as shown in FIG. 52. Specifically, the retainer pegs 281 received in retainer slots 275 maintain a double connection between the yoke bracket 20 and the connector block 283 so that a patient supported by the yoke bracket 20 may be safely supported by the yoke bracket 20. Even if a user were to accidentally pull the pin 258 out of the coupling hole 267 and pivot the yoke bracket 20 about the retainer pegs 281, as suggested by arrow 299 in FIG. 53, the yoke bracket 20 the connection between the yoke bracket 20 and the connector block 283 is maintained by retainer pegs 281 as shown in FIG. 53A. Thus, the configuration of the yoke bracket 20 and the connector block 283 provide a safe support coupling between the foundation frame 12 and the patient support top 14.

A number of alternative yoke bracket and connector blocks are shown in FIGS. 54-68. A first alternative yoke bracket 1020 and a first alternative connector block 1283 is shown in FIGS. 54-56. The yoke bracket 1020 and the connector block 1283 are substantially similar to the yoke bracket 20 and the connector block 283 described herein and similar reference numbers in the 1000 series indicate similar features. The yoke bracket 1020 includes a secondary retaining feature 1005 for maintaining the connection of the yoke bracket 1020 to the connector block 1283 once the yoke bracket 1020 is coupled to the connector block 1283.

The secondary retaining feature 1005 includes a left spring-loaded ball 1006 and a right spring-loaded ball 1007 as shown in FIG. 54. The left spring-loaded ball 1006 is mounted in the left coupling member 1262 and extends outwardly from an interior surface of the left coupling member 1262. The right spring-loaded ball 1007 is mounted in the right coupling member 1264 and extends outwardly from an interior surface of the right coupling member 1264.

The left spring-loaded ball 1006 is sized to be received in a divot 1008 formed in the connector block 1283 as suggested in FIGS. 56 and 57. The right spring-loaded ball 1007 is sized to be received in a divot 1009 formed in the connector block 1283.

The second retaining feature 1005 can be alternatively placed as suggested in phantom in FIGS. 54-56. Specifically, a left spring-loaded ball 1006' may be located in the retainer slot 1275 of the left coupling member 1262 to be received in a divot 1008' formed in the connector block 1283 as suggested in FIGS. 56 and 57. A right spring-loaded ball 1007' may be located in the retainer slot 1275 of the right coupling member 1264 to be received in a divot 1009' formed in the connector block. In such an embodiment, the divots 1008' and 1009' are formed in retainer pins 1281 of the connector block 1283. As would be understood by one of ordinary skill in the art, the location of the spring loaded balls 1006, 1006' and the location of the divots 1009, 1009' may be reversed in other alternative embodiments.

A second alternative yoke bracket 2020 is shown in FIGS. 58 and 58A. The yoke bracket 2020 is substantially similar to the yoke bracket 20 described herein and similar reference numbers in the 2000 series indicate similar features. The yoke bracket 2020 includes a secondary retaining feature 1005 for maintaining the connection of the yoke bracket 2020 to the connector block 283 once the yoke bracket 2020 is coupled to the connector block 283.

The secondary retaining feature 2005 includes a pair of spring-loaded balls 2006, 2007 extending into the retainer slots 2275 of the left coupling member 2262 and the right coupling member (not shown) as suggested in FIG. 58A. The spring-loaded balls 2006, 2007 are arranged to contact the retaining pins 281 of the connector block 283 when the retaining pins 281 are slid into and out of the retainer slots 2275 of the yoke bracket 2020. Thus the spring-loaded balls 2006, 2007 resist both coupling and decoupling of the yoke bracket 2020 from the connector block 283.

A third alternative yoke bracket 3020 is shown in FIGS. 59 and 59A. The yoke bracket 3020 is substantially similar to the yoke bracket 20 described herein and similar reference numbers in the 3000 series indicate similar features. The yoke bracket 3020 includes a secondary retaining feature 3005 for maintaining the connection of the yoke bracket 3020 to the connector block 283 once the yoke bracket 3020 is coupled to the connector block 283.

The secondary retaining feature 3005 includes latch 3006 coupled to the left coupling member 3262 and to the right coupling member (not shown). The latches move between a closed position, shown in FIGS. 59 and 59A, and an open position, shown in phantom in FIGS. 59 and 59A. In the closed position, the latches 3006 block the retaining pins 281 from sliding out of the retainer slots 3275 of the yoke bracket 3020. In the open position, the latches 3006 block the retaining pins 281 from sliding out of the retainer slots 3275 of the yoke bracket 3020.

A fourth alternative yoke bracket 4020 and an alternative connector block 4283 are shown in FIG. 60. The yoke bracket 4020 and connector block 4283 are substantially similar to the yoke bracket 20 and connector block 283 described herein and similar reference numbers in the 4000 series indicate similar features. The yoke bracket 4020 includes a secondary retaining feature 4005 for maintaining the connection of the yoke bracket 4020 to the connector block 4283 once the yoke bracket 4020 is coupled to the connector block 283.

The secondary retaining feature 4005 includes friction pads 4006 formed on the left coupling member 4262 and similarly on the right coupling member (not shown). Specifically, the friction pads 4006 are formed on a sidewall 4277 and a floor 4279 of the pin receiving slot 4275 included in each coupling member 4262, 4264. The friction pads 4006 are arranged to contact complementary friction pads 4008 formed on the retainer pins 4281 of the connector block 4283. Each friction pad 4006, 4008 can be formed by knurling the yoke bracket 4020 and the connector block 4283 or by coupling high friction sheets to the yoke bracket 4020 and the connector block 4283.

The secondary retaining feature 4005 can be alternatively placed as shown in FIG. 61 and in FIGS. 62A and 62B. Specifically, friction pads 4006' can be coupled to a yoke bracket 4020' along a top surface of each of the coupling members 4262', 4264' as shown in FIG. 61. In such embodiments, a friction pad 4008' can be formed on surfaces of the connector block 4283' arranged to contact the top surface of the coupling members 4262', 4264' when the yoke bracket 4020' is coupled to the connector block 4283'. Additionally, friction pads 4006" can be coupled to a yoke bracket 4020" along an interior surface 4268" of each of the coupling members 4262", 4264" as shown in FIG. 62A. In such embodiments, a friction pad 4008" can be formed on surfaces of the connector block 4283" arranged to contact the interior surface of the coupling members 4262", 4264" when the yoke bracket 4020" is coupled to the connector block 4283".

A fifth alternative yoke bracket 5020 and an alternative connector block 5283 are shown in FIGS. 63 and 63A. The yoke bracket 5020 and connector block 5283 are substantially similar to the yoke bracket 20 and connector block 283 described herein and similar reference numbers in the 5000 series indicate similar features. The yoke bracket 5020 includes a secondary retaining feature 5005 for maintaining the connection of the yoke bracket 5020 to the connector block 5283 once the yoke bracket 5020 is coupled to the connector block 5283.

The secondary retaining feature 5005 includes a divot 5006 formed in the ledge 5272. The divot 5006 is sized and arranged to receive a spring-loaded ball 5007 included in the connector block 5283 as shown in FIG. 63A.

A sixth alternative yoke bracket 6020 and an alternative connector block 6283 are shown in FIGS. 64 and 64A. The yoke bracket 6020 and connector block 6283 are substantially similar to the yoke bracket 20 and connector block 283 described herein and similar reference numbers in the 6000 series indicate similar features. A secondary retaining feature 6005 is included in the connector block 6283 for maintaining the connection of the yoke bracket 6020 to the connector block 6283 once the yoke bracket 6020 is coupled to the connector block 6283.

The secondary retaining feature 6005 includes a latch 6006 coupled to the connector block 6283 to pivot about an axis 6006A as shown in FIG. 64A. The latch 6006 moves from an open position to a closed position by pivoting about axis 6006A as suggested by arrow 6007 in FIG. 64A. In the closed position, the latch 6006 blocks the ledge 6272 from moving away from the connector block 6283.

A seventh alternative yoke bracket 7020 and an alternative connector block 7283 are shown in FIGS. 65, 65A, and 65B. The yoke bracket 7020 and connector block 7283 are substantially similar to the yoke bracket 20 and connector block 283 described herein and similar reference numbers in the 7000 series indicate similar features. Unlike yoke bracket 20, yoke bracket 7020 includes coupling members 7262, 7264 each formed to include recesses 7265 opposite of base member 7260. Recesses 7265 are configured to receive T-shaped extensions 7269 included in the connector block 7283 when the yoke bracket 7020 is coupled to the connector block 7283. Recesses 7265 are sized to cooperate with the T-shaped extensions 7269 so that an outer surface 7911 of each coupling member 7262, 7264 is flush with an outer surface 72912 of the T-shaped extensions 7269 as shown in FIGS. 65A and 65B.

Figures 66, 67:
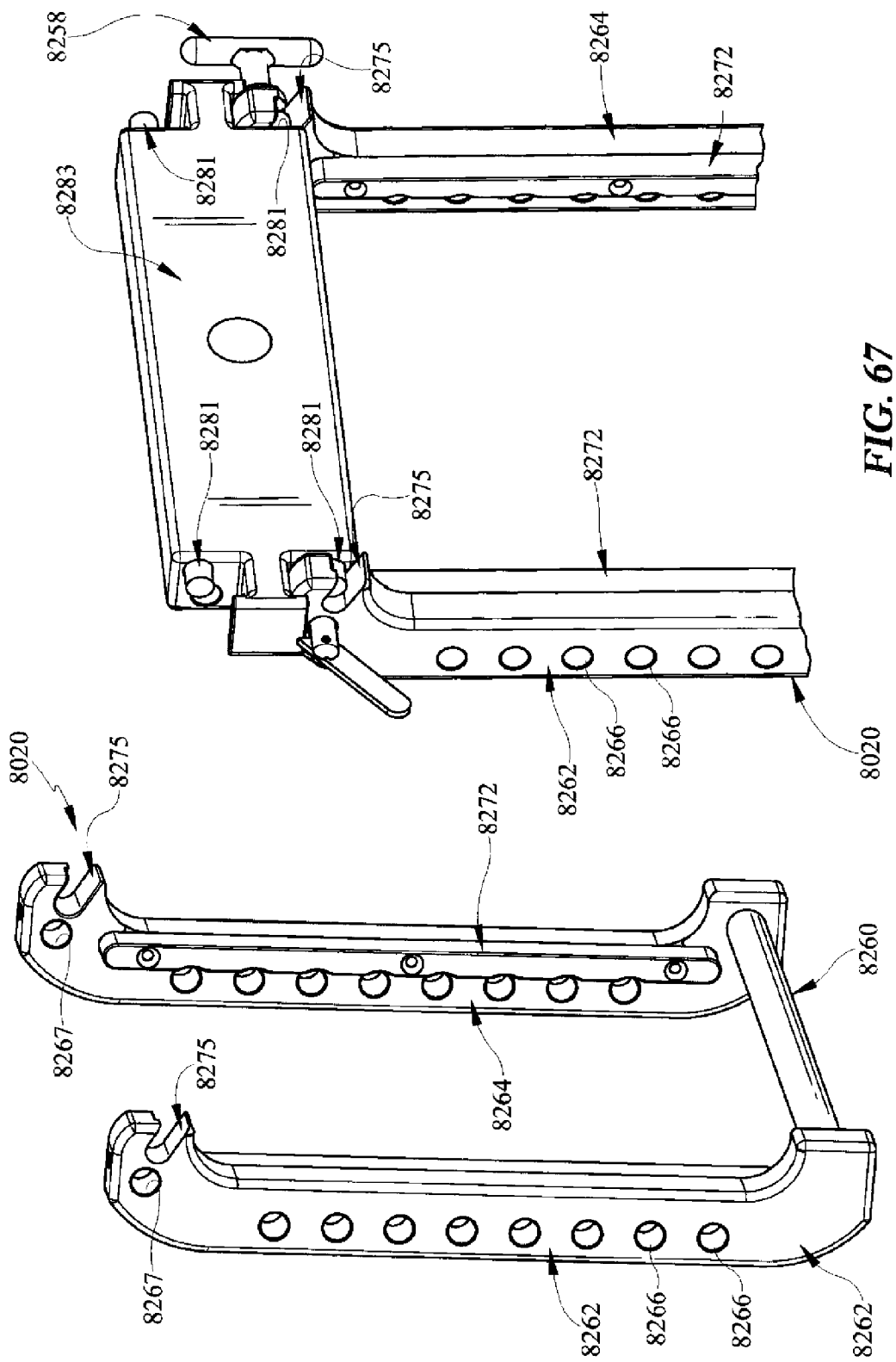
FIG. 66 is a perspective view of yet another alternative yoke bracket showing that the yoke bracket includes a base, a left connection member coupled to the base and formed to include a slot extending through the left connection member, and a right connection member coupled to the base and formed to include a slot extending through the right connection member.
FIG. 67 is a perspective view of the alternative yoke bracket of FIG. 66 showing that the slots in the left and the right connection members are sized to receive retaining pegs included in the connection block.

An eighth alternative yoke bracket 8020 and is shown in FIGS. 66 and 67. The yoke bracket 8020 is substantially similar to the yoke bracket 20 described herein and similar reference numbers in the 8000 series indicate similar features. Unlike yoke bracket 20, yoke bracket 8020 is formed to include a pair of peg receiving slots 8275 that extends through the left and the right coupling members 8262, 8264.

Figure 68:
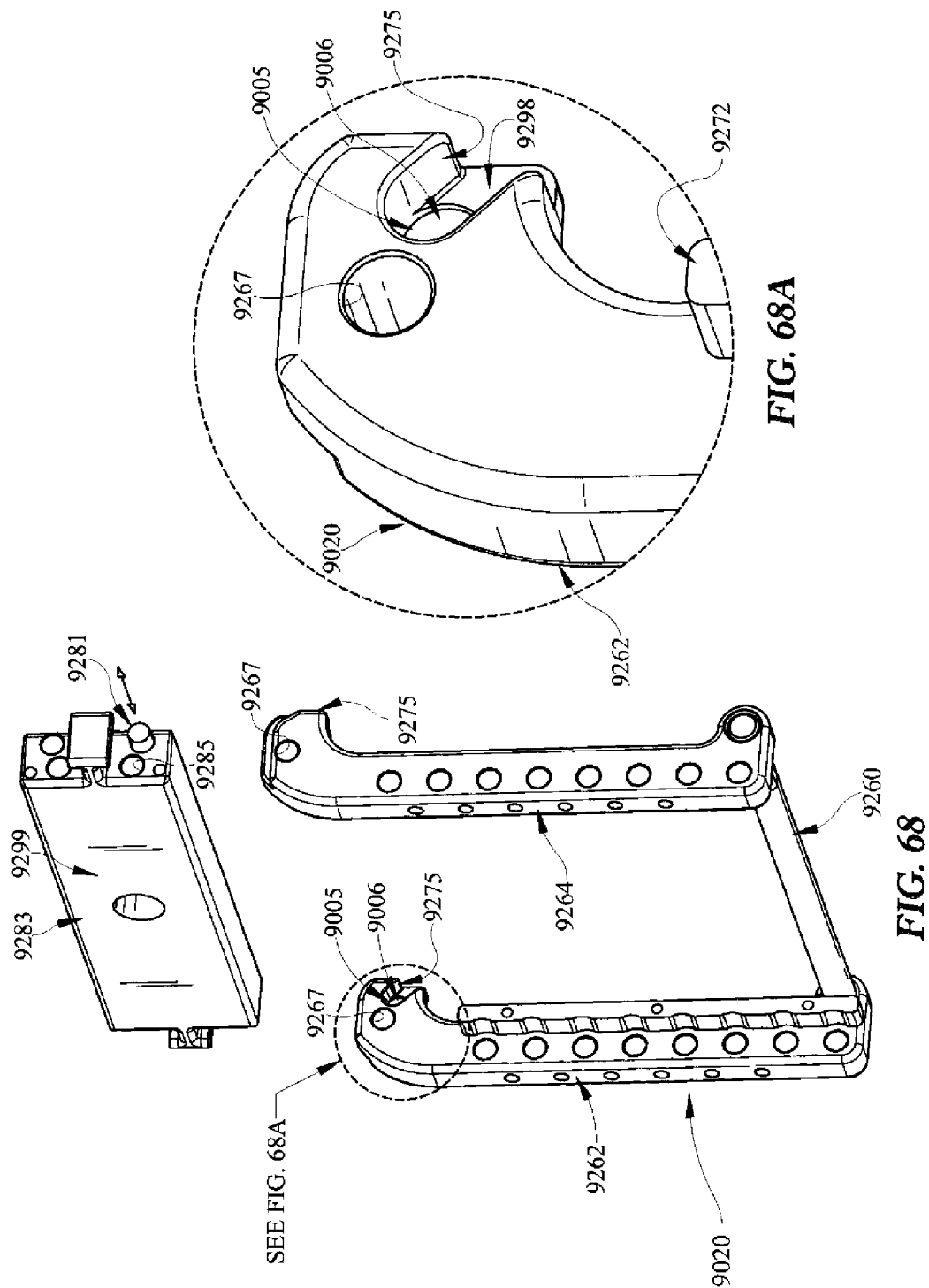
FIG. 68 is a perspective view of another alternative yoke bracket and another alternative connector block showing that a left and a right connection member of the yoke bracket each include a peg-receiving pocket formed in a slot and suggesting that a retainer peg included in the connector block is movable from an extended position to an retracted position.

A ninth alternative yoke bracket 9020 and an alternative connector block 9283 are shown in FIGS. 68 and 68A. The yoke bracket 9020 and connector block 9283 are substantially similar to the yoke bracket 20 and connector block 283 described herein and similar reference numbers in the 9000 series indicate similar features. A secondary retaining feature 9005 is included in the connector block 9283 for maintaining the connection of the yoke bracket 9020 to the connector block 9283 once the yoke bracket 9020 is coupled to the connector block 9283.

The secondary retaining feature 9005 includes a peg-recess pocket 9006 formed in each of the peg-receiving slots 9275 included in the coupling members 9262, 9264. The peg-recess pockets 9006 extend into a floor 9298 of the retainer slots 9275. The peg-recess pocket 9006 is configured to receive a spring-loaded retainer peg 9281 included in the connector block 9283. The peg-recess pockets 9006 cooperate with the floors 9298 to form a cam surface that guides the retainer pegs 9281 to slide into a connector-block body 9299 during coupling of the yoke bracket 9020 and the connector block 9283. When the spring-loaded retainer pegs 9281 are received in the peg-recess pockets 9006, the spring-loaded retainer pegs 9281 resist removal of the yoke bracket 9020 from the connector block 9283.

An alternative patient support top 312 for supporting a patient in a supine position (face up) is shown in FIGS. 69 and 70. The support top 314 includes a support plank 325 and a motion coupler 318 at both ends of the support plank 325. The support plank 325 includes a first rail 314, a second rail 316, a panel 317, and cross beams 319. The first rail 314 and the second rail 316 are spaced apart and extend parallel to one another. Each rail 314, 316 is square in shape. The panel 317 interconnects the first rail and the second rail 314, 316 so that the rails 314, 316 and the panel 317 align to form a flat top surface 320 of the support top 314 for supporting a patient in a supine position. The rails 314, 316 extend down below the panel 317 as shown in FIGS. 69 and 70. The motion coupler 318 allows for movement of the support plank 325 relative to the foundation frame 12. Also, the cross beam 319 includes a pair of handles 330 for transporting the support top 314.

The first rail 314, the second rail 316, and the panel 317 cooperate to form a monolithic table top 232 as shown wherein layers of carbon fiber composite are arranged to form the table top 232 as shown, for example, in FIG. 70. The panel 317 is formed around a core 235 illustratively formed from foam as shown in FIG. 70. In other embodiments, the core 235 may be formed from wood, plastics, or another material. The motion coupler 318 is substantially similar to the motion coupler 218 described above.

Another alternative patient support top 14' is shown in FIGS. 71-73. The support top 14' is substantially similar to the support top 14 described herein and similar reference numbers indicate similar features. The support top 14' includes a support frame 225' and two motion couplers 218' as shown in FIG. 71. The support frame 225' includes a first rail 214', a second rail 216', a pair of cross beams 219' located at either end of the first rail 214' and the second rail 216'. The motion couplers 218' are coupled to the support frame 225' to allow movement of the support frame 225' about a horizontal axis 215' relative to the foundation frame 12, for instance, in response to reconfiguration of the rotation system 46 and/or the lift system 48 of the foundation frame 12. In addition, the motion couplers 218' allow sliding and shifting of the support frame 225' relative to the foundation frame 12.

Each motion coupler 218' includes a connector 220' and a joint 221' as shown in FIG. 71. The connector 220' is configured to be coupled to the yoke bracket 20 and foundation frame 12 for rotation about the horizontal pivot axis 215'. The joint 221' is coupled to the connector 220' and to the cross beam 219' of the support frame 225'.

The joint 221' includes an arm 230', a first resilient bumper 232', a second resilient bumper 234', and an arm retainer 236' as shown in FIGS. 71-73. The arm 230' is illustratively twisted and extends from the connector and into a beam slot 238' formed in the cross beam 219'. The beam slot 238' extends at an angle α (illustratively about 5 degrees) to the longitudinal axis of the cross beam 219' so that the support frame 225' slides and shifts relative to the foundation frame 12 in a plane that is angled relative to the axis 215' as suggested in FIG. 71. Thus, any axis perpendicular to the axis 215' is not substantially perpendicular to plane in which the arm 230' slides and shifts. The bumpers 232', 234' locate the arm 230' in the beam slot 238' and allow the arm 230' to slide and shift in the beam slot 238' as the bumpers 232', 234' are resiliently deformed and expanded. The arm retainer 236' extends parallel to the beam slot 238' and is configured to resist the arm 230' from being pulled out of the beam slot 238'.

The patient support apparatus 10 further includes a number of accessory cushions 350 coupled to the patient support top 14 as shown in FIG. 1. The accessory cushions 350 are configured to support a patient in a prone position (face down) lying on the patient support apparatus 10. Each accessory cushion 350 includes a pad 352 and a rail coupler 354 for coupling the pad 352 to the rails 214, 216 of the support top 14.

Figure 74:
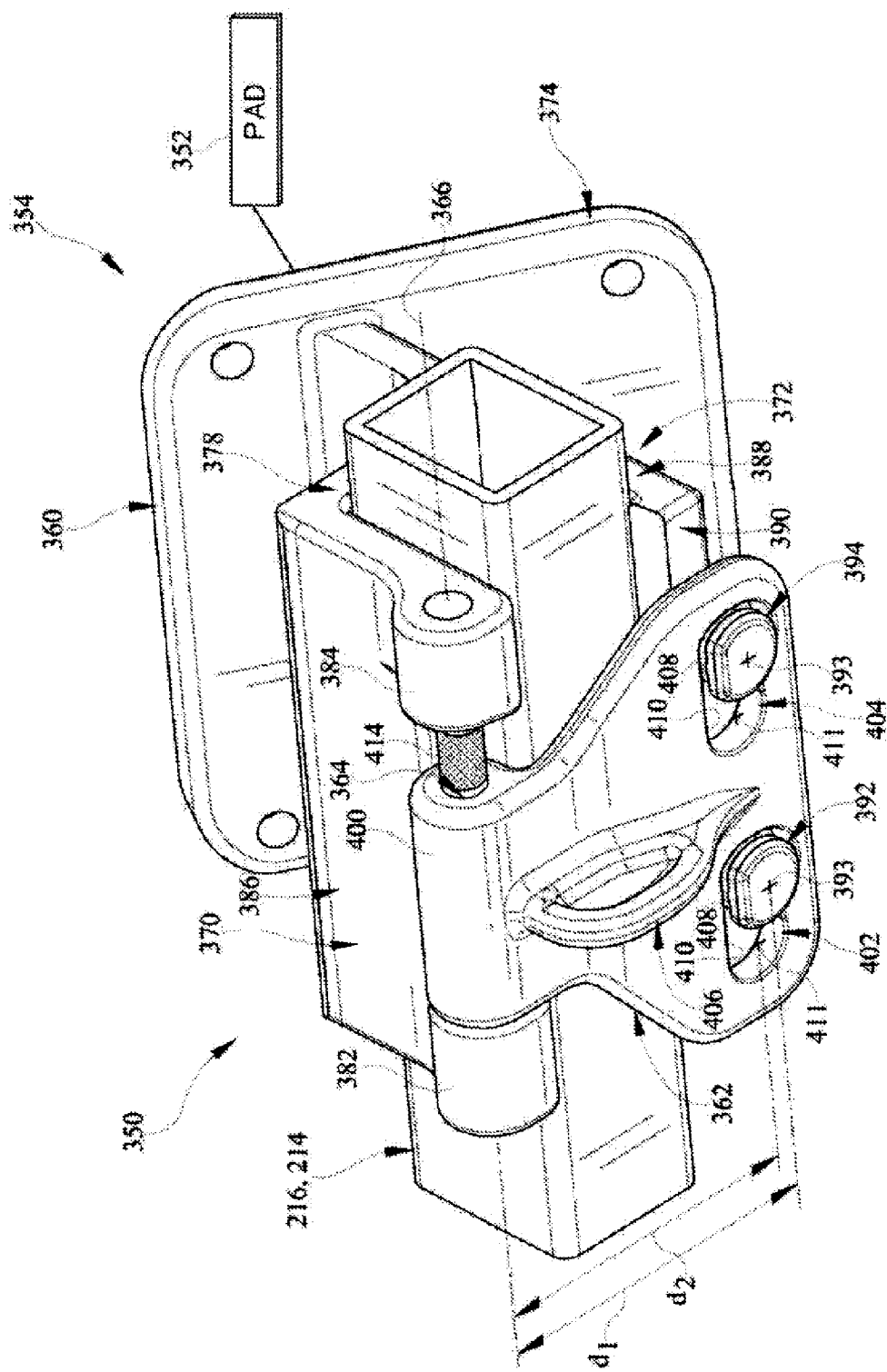
FIG. 74 is a perspective view of a rail coupler included in the patient support apparatus of FIG. 1.

The rail coupler 354 is configured to clamp on to the rails 214, 216 of the support top 14, as shown in FIG. 74, in order to hold the pads 352 in place along the rails 214, 216. In other embodiments, supports and devices other than prone pads may be coupled to a rail by the rail coupler 354. Examples of other supports or devices include other pads, linkages, IV poles, monitors, instrument trays, lights, traction devices, or any other item or part useful around the time of surgery or for supporting a patient.

Figure 75:
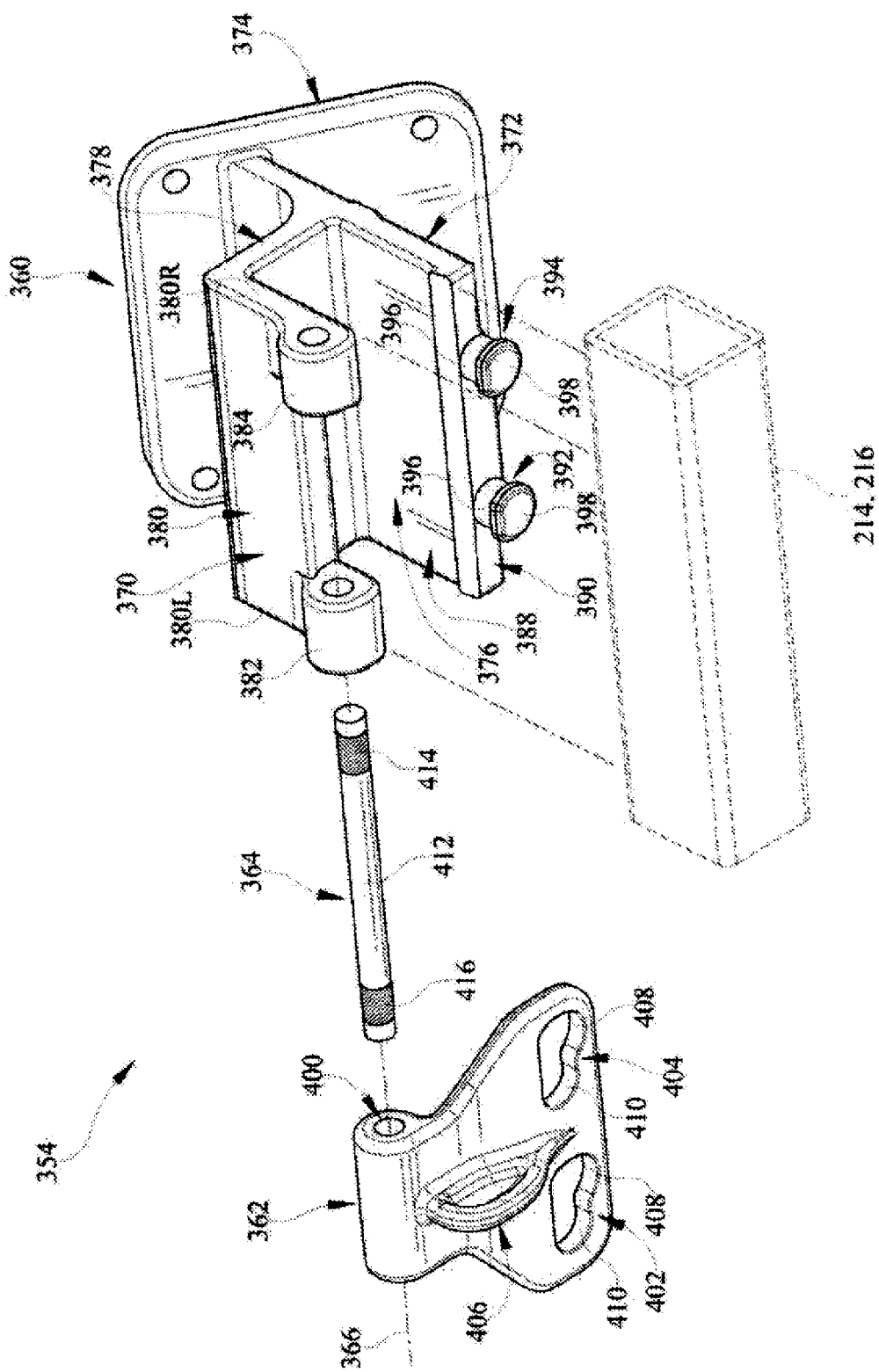
FIG. 75 is an exploded assembly view of the rail coupler of FIG. 74 showing that the rail coupler includes a bracket, a flap, and a pivot pin.

The rail coupler 354 includes a bracket 360, a flap 362, and pivot pin 364 as shown in FIG. 75. The bracket 360 is configured to receive a rail 214, 216 and to be coupled to the pad 352. The flap 362 is coupled to the bracket 360 for pivotable movement about an axis 366 and for slidable movement along the axis 366. The pivot pin 364 couples the flap 362 to the bracket 360 and defines the axis 366.

The bracket 360 includes an upper jaw 370, a lower jaw 372, and a coupling plate 374 as shown in FIG. 75. The upper jaw 370 and the lower jaw 372 are interconnected by a rear wall 378 and cooperate with the rear wall 378 to define a rail opening 376 such that the rear wall 378 extends behind the rail opening 376. The coupling plate 374 is configured to be coupled to the pad 352. In other embodiments, the coupling plate 374 may be coupled to a number of different patient support pads or other surgical rail accessories.

The upper jaw 370 is formed to include a top wall 380, a left eyelet 382, and a right eyelet 384 as shown in FIG. 75. The top wall 380 extends away from the rear wall 378 over the rail opening 376. The left eyelet 382 is situated at a left side 380L of the top wall 380 and is configured to receive the pivot pin 364. The right eyelet 384 is situated at a right side 380R of the top wall 380 and is configured to receive the pivot pin 364.

The lower jaw 372 is formed to include a bottom wall 388, a lip 390, a left headed post 392, and a right headed post 394 as shown in FIG. 75. The bottom wall 388 is coupled to the coupling plate 374 and extends under the rail opening 376. The lip 390 is coupled to the bottom wall 388 and extends over a portion of the front of the rail opening 376. The left headed post 392 and the right headed post 394 are coupled to the lip 390.

Each headed post 392, 394 includes a shaft 396 and a head 398 extending out from the shaft 396. Each head 398 is chamfered around the edges. Additionally, a center 393 of each headed post 392, 394 is spaced a distance d1 from the axis 366 as shown in FIG. 74.

The flap 362 is configured to clamp the rail 214, 216 to the bracket 360 and is formed to include an eyelet 400, a left post opening 402, a right post opening 404, and a handle 406 as shown in FIG. 75. The eyelet 400 is sized to receive the pivot pin 364. The left and the right post openings 402, 404 are configured to receive the headed posts 392, 394 of the bracket 360 when the rail 214, 216 is clamped to the bracket 360.

The left and the right post openings 402, 404 are each formed to include a first section 408 and a second section 410. The first section 408 is sized to allow the head 398 of each headed post 392, 394 to be received in the post openings 402, 404. The second section 410 is sized to block the head 398 of each headed post 392, 394 from being withdrawn from the post openings 402, 404. Additionally, the second section 410 of the post openings 402, 404 has a center line 411 spaced a distance d2 from the axis 366 as shown in FIG. 74.

The pivot pin 364 includes a shaft 412, an unlocked indicator 414 marked on the shaft 412, and a locked indicator 416 marked on the shaft 412 as shown in FIG. 75. The unlocked indictor 414 is illustratively a red marking indicating that the bracket 260 is not clamped to the rail 214, 216. The locked indicator 416 is illustratively a green marking indicating that the bracket 260 is clamped to the rail 214, 216. In other embodiments, the indicators 414, 416 may be other colors, words, symbols, knurled patterns, or other suitable indicators.

Figures 76, 77:
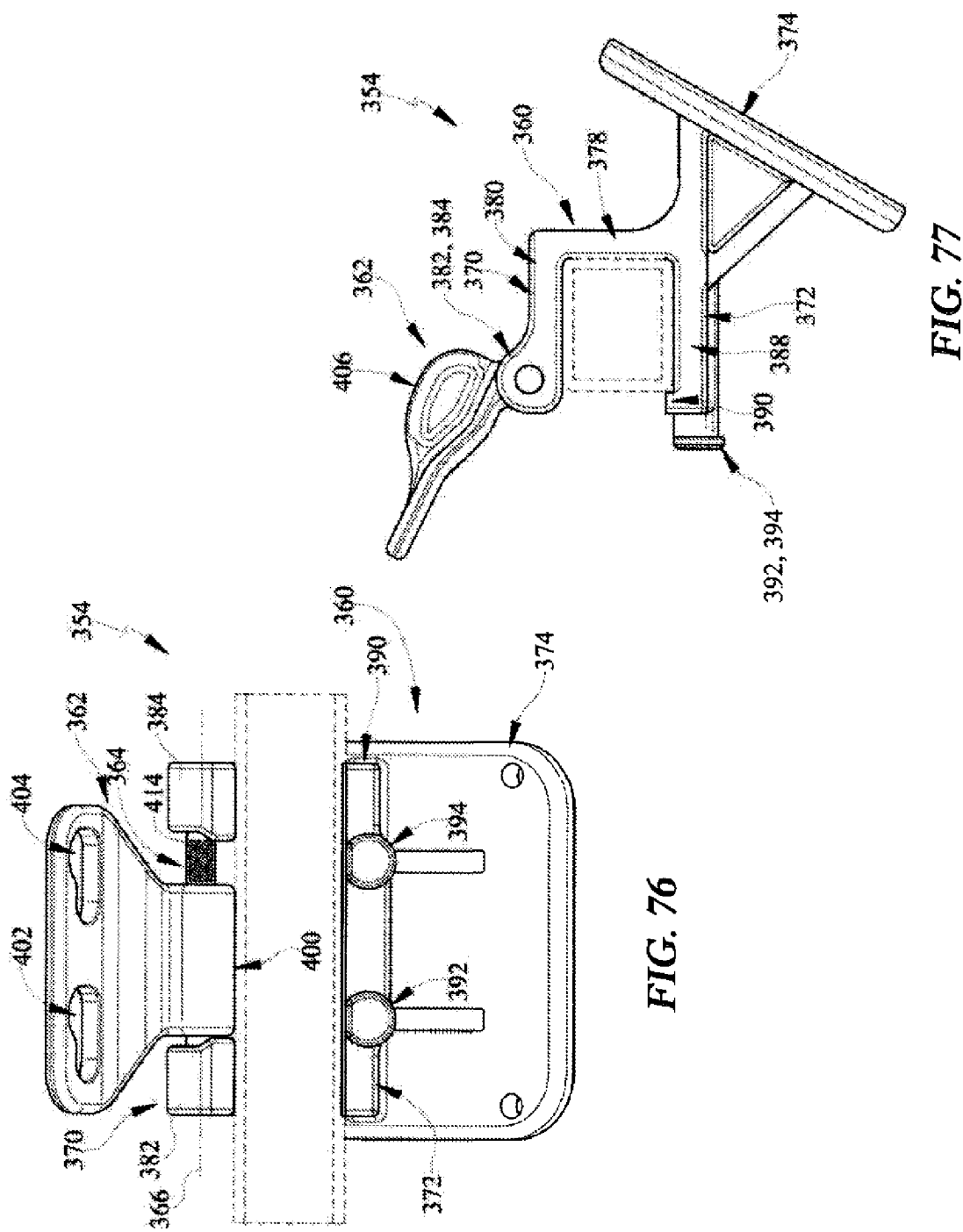
FIG. 76 is a front view of the rail coupler of FIGS. 74 and 75 showing the flap of the rail coupler in an open position.
FIG. 77 is a side elevation view of the rail coupler of FIG. 76.

In operation, the flap 262 is configured to pivot between an open position (shown in FIGS. 76-77) and a closed position (shown in FIGS. 78-79). Following movement to the closed position, the flap 262 is configured to slide from the closed position to a clamped position (shown in FIGS. 80-81). When the flap 262 is in the open position, the flap 262 is pivoted away from the opening 276 so that the rails 214, 216 can be inserted into the opening 276 and the headed posts 392, 394 are withdrawn from the post openings 402, 404. In the closed position, the flap 262 is pivoted toward the opening 276 so that the rails 214, 216 are blocked from moving out of the opening 276 and the headed posts 392, 394 are received in the first sections 408 of the post openings 402, 404. In the clamped position, the flap 262 is slid relative to the bracket 360 so that the headed posts 392, 394 are received in the second sections 410 of the post openings 402, 404.

Figures 80, 81:
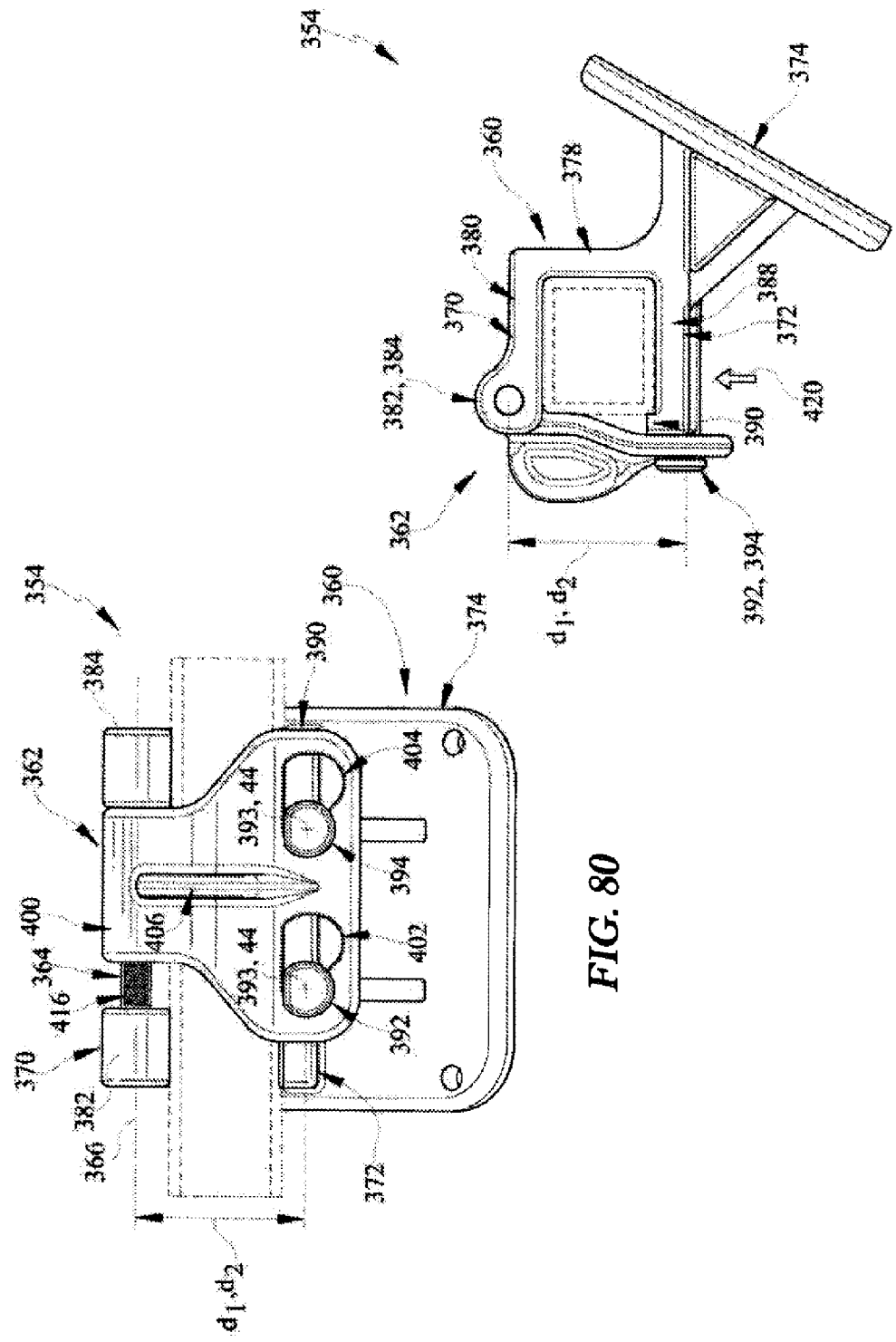
FIG. 80 is a front view of the rail coupler of FIGS. 74 and 75 showing the flap slid to a clamped position wherein the flap is blocked from moving to an open position by the flap lock.
FIG. 81 is a side elevation view of the rail coupler of FIG. 80.

The distance d1, between the a center 393 of each headed post 392, 394 and the axis 366, is greater than the distance d2, between the center line 411 of the second section 410 of the post openings 402, 404 and the axis 366, when the flap is in the closed position as shown in FIGS. 78 and 79. However, the distance d1 is reduced to be about equal to the distance d2 when the flap 262 is moved to the clamped position as shown in FIGS. 80 and 81 since the headed posts 392, 394 are encouraged toward the centerline 403 of the second section 410 of the post openings 402, 404. The lower jaw 372 is moved toward the upper jaw 370 in response to the reduction of distance d2 as suggested by arrow 420 in FIG. 81. Thus, the rail 214, 216 in the opening 376 is clamped in the rail coupler 354 when the flap is moved to the clamped position.

The unlocked indicator 414 is displayed (exposed) when the flap is in either the open or closed position and is covered (hidden) when the flap is slid to the clamped position as shown in FIG. 78. The locked indicator 416 is displayed (exposed) when the flap is in the clamped position and is covered (hidden) when the flap is slid to either the open or closed position as shown in FIG. 80. Thus a user is visually informed of the configuration of the rail coupler 354.

One alternative flap 362' is shown in FIG. 82 and is formed to include alternative post openings 402', 404'. The post openings 402', 404' are substantially rectangular and include a triangular protrusion 401' locating the center line of the second section 410' of the openings 402', 404'. Another alternative flap 362'' is shown in FIG. 83 and is formed to include alternative post openings 402', 404'.

Figure 84:
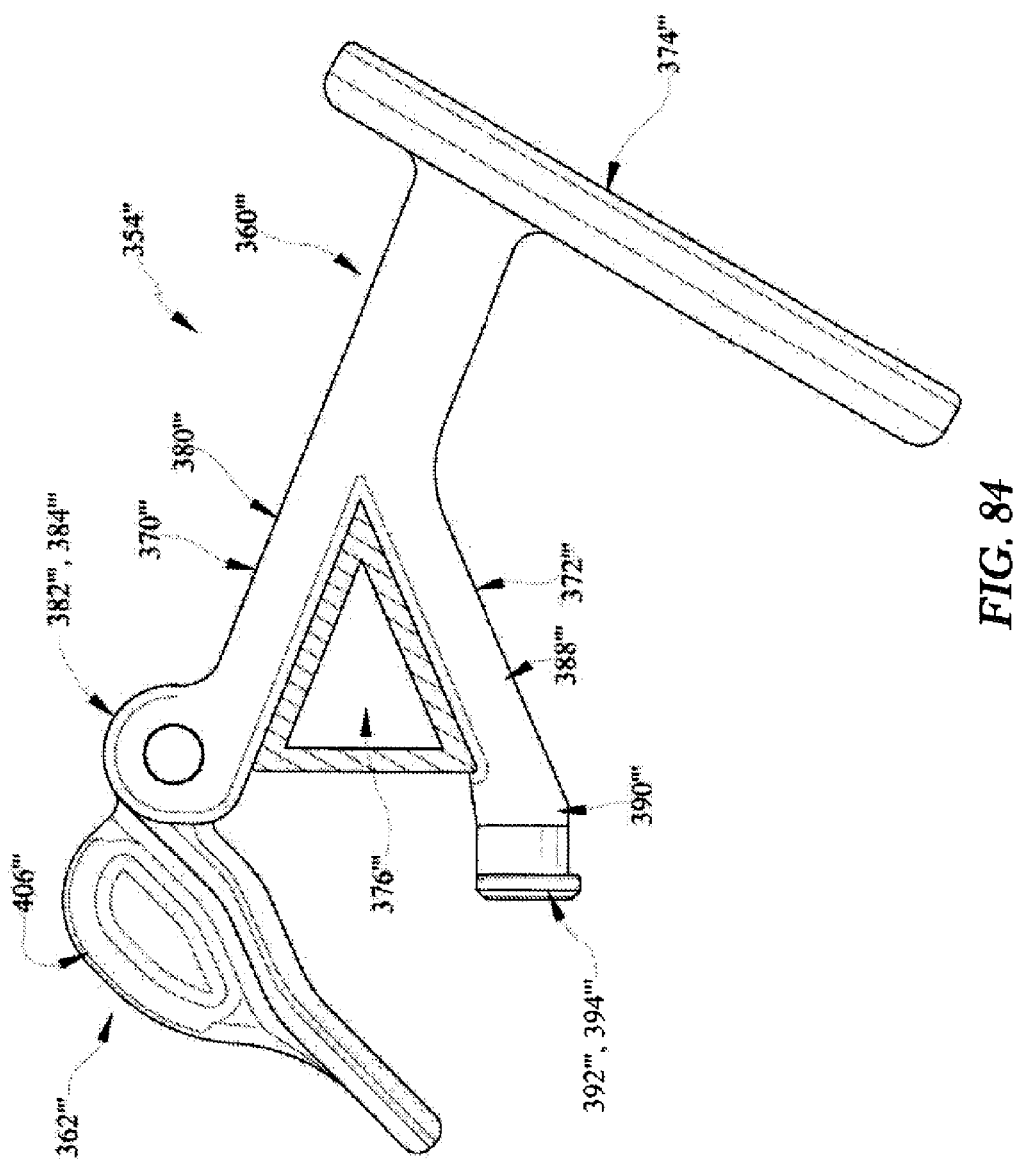
FIG. 84 is a side elevation view of an alternative rail coupler for use with a triangular rail.

An alternative rail coupler 354''' for use with a triangular rail is shown in FIG. 84. The alternative rail coupler 354''' is substantially similar to rail coupler 354 and similar reference numbers indicate similar structure. However, alternative rail coupler 354''' does not include a rear wall 378 so that rail opening 376''' is triangular in shape to receive a triangular rail.

Figure 85:
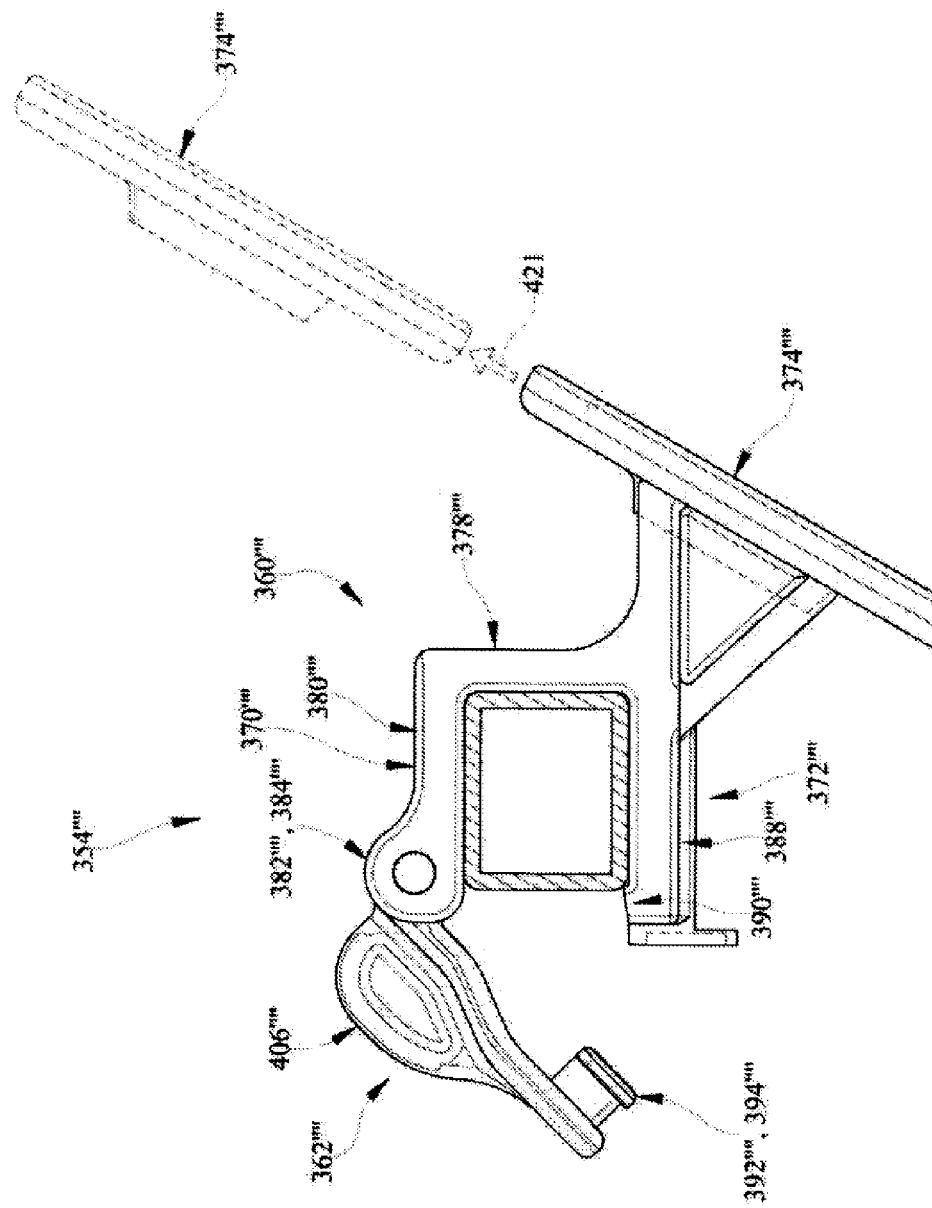
FIG. 85 is a side elevation view of an alternative rail coupler wherein the bracket is configured to be coupled with a slide-on accessory.

Another alternative rail coupler 354'''' is shown in FIG. 85. The alternative rail coupler 354'''' is substantially similar to rail coupler 354 and similar reference numbers indicate similar structure. However, the coupling plate 374'''' of rail coupler 354'''' is slidably removable from the rest of the bracket 360'''' as suggested by arrow 421 so that different pads or accessories may be coupled to the rest of the bracket 360''''. Additionally, the headed posts 392'''', 394'''' are coupled to the flap 362'''' and the post openings (not shown) are formed in the bracket 360''''.

The control system 30 of the patient support apparatus 10 also includes an angle sensor 446, a pair of height sensors 448, a pair of brake sensors 450, and a communications interface 452 each in communication with the controller 40 as shown in FIG. 2. The angle sensor 446 is included in the rotation system 46 and is configured to detect the angle of the support top 14 relative to the ground. The height sensors 448 are included in the lift system 48 and are configured to detect the height of either end of the support top 14 as a function of the amount of lift applied to the columns 24, 26. The brake sensors 450 are included in the brake system 50 and are configured to detect the position of the releasable linkages 152 to determine the braking status of the casters 33, 35.

Figure 86:
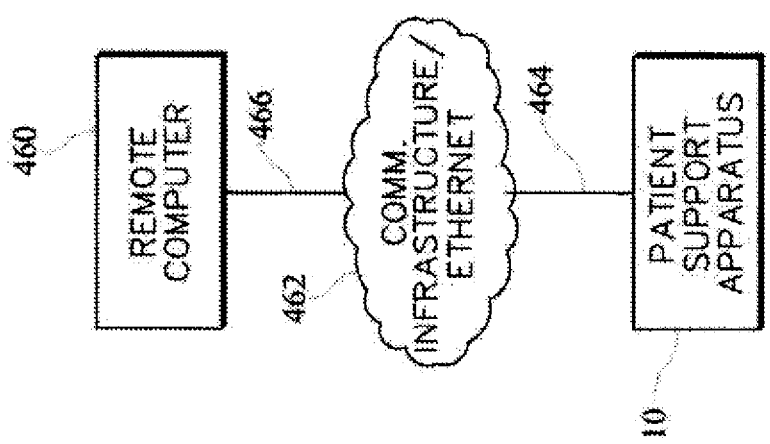
FIG. 86 is a diagrammatic view of the patient support apparatus in communication with a communication infrastructure and with a remote computer.

In some embodiments, the communications interface 452 of the patient support apparatus 10 communicates with a remote computer device 460 via communication infrastructure 462 such as an Ethernet of a healthcare facility in which the patient support 10 is located and via communication links 464, 466 as shown diagrammatically in FIG. 86. The computer device 460 is sometimes simply referred to as a "computer" herein. Computer 460 may be part of a surgical computer system, a maintenance computer system, or an electronic medical records (EMR) system, for example. However, it is within the scope of this disclosure for the communication interface 452 of the patient support 10 to communicate with other computers used in a healthcare facility.

In the illustrative embodiments, the communication interface 452 (or port) provides bi-directional communication with the communication infrastructure 462 via a link 464. The communication infrastructure 462 is, in turn, in bi-directional communication with computer 460 via a link 466. Communication interface 452 is illustratively a wireless transceiver for communicating with a wireless interface unit of the type shown and described in U.S. Patent Application Publication No. 2007/0210917 A1 which is hereby expressly incorporated by reference herein. However, in some embodiments the communication interface 452 is a wired transceiver and the link 464 includes a cable that connects the patient support 10 to a wall mounted jack that is included as part of an apparatus interface unit or a network interface unit of the type shown and described in U.S. Pat. Nos. 7,538,659 and 7,319,386 and in U.S. Patent Application Publication Nos. 2009/0217080 A1, 2009/0212925 A1, and 2009/0212926 A1, each of which are hereby expressly incorporated by reference herein.

The communication interface 452 may communicate information from the sensors 446, 446, 450 and from the user interface 44 to the remote computer 460. The remote computer 460 may display and/or store the information from the sensors 446, 448, 450. Additionally, the remote computer 460 may communicate user inputs to the communication interface 452 of the patient support apparatus 10 to control the rotation, lift, and brake systems 46, 48, 50 of the patient support apparatus 10. Thus, a user can remotely operate the patient support apparatus 10 during a typical or a robotically assisted surgery such that the user controls the position of a patient supported on the patient support 10 during the surgery.

Additionally, the remote computer 460 may compare received information from the sensors 446, 448, 450 and received information from the user interface 44 to determine if the rotation, lift, and brake systems 46, 48, 50 of the patient support apparatus 10 are operating as expected. If one of the systems 46, 48, 50 is not operating as expected, the remote computer 460 may communicate with the patient support apparatus 10 to activate the maintenance indicator light 79 on the panel 61 and/or may activate an alert within the remote computer 460 requesting service for the patient support apparatus 10. The alert may then be communicated to other maintenance systems or personnel within a healthcare facility. If the systems 46, 48, 50 are operating as expected, the remote computer 460 may record the information from the sensors 446, 448, 450 and from the user interface 44.

In some embodiments, a patient identifier may be associated with the patient support apparatus 10 in the remote computer 460 when a patient is supported on the patient support apparatus 10. The remote computer 460 may also record the user inputs received by the patient support apparatus 10 from the user input 54 and the information from the sensors 446, 448, 450 while the patient is supported on the patient support apparatus. The remote computer may then associate the patient identifier with the user inputs received and the information from the sensors 446, 448, 450 and store the associated data in the patient's electronic medical records.

Figure 87:
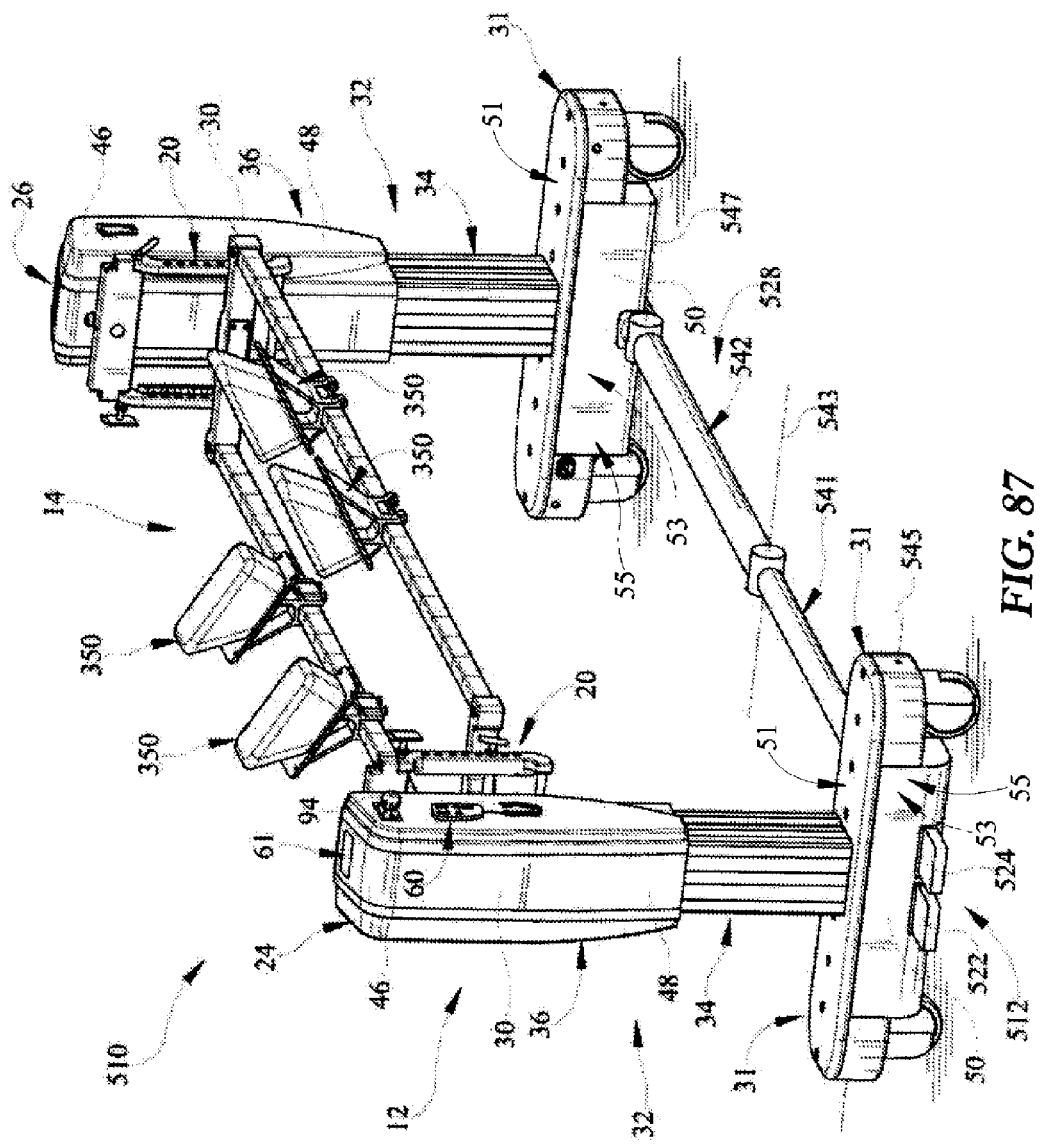
FIG. 87 is a perspective view of an alternative patient support apparatus similar to the patient support apparatus of FIG. 1 showing that the alternative patient support apparatus includes a pedal control input for operating the brake system and a foundation frame with a foldable extension coupled between a first column and a second column of the foundation frame.
Figure 88:
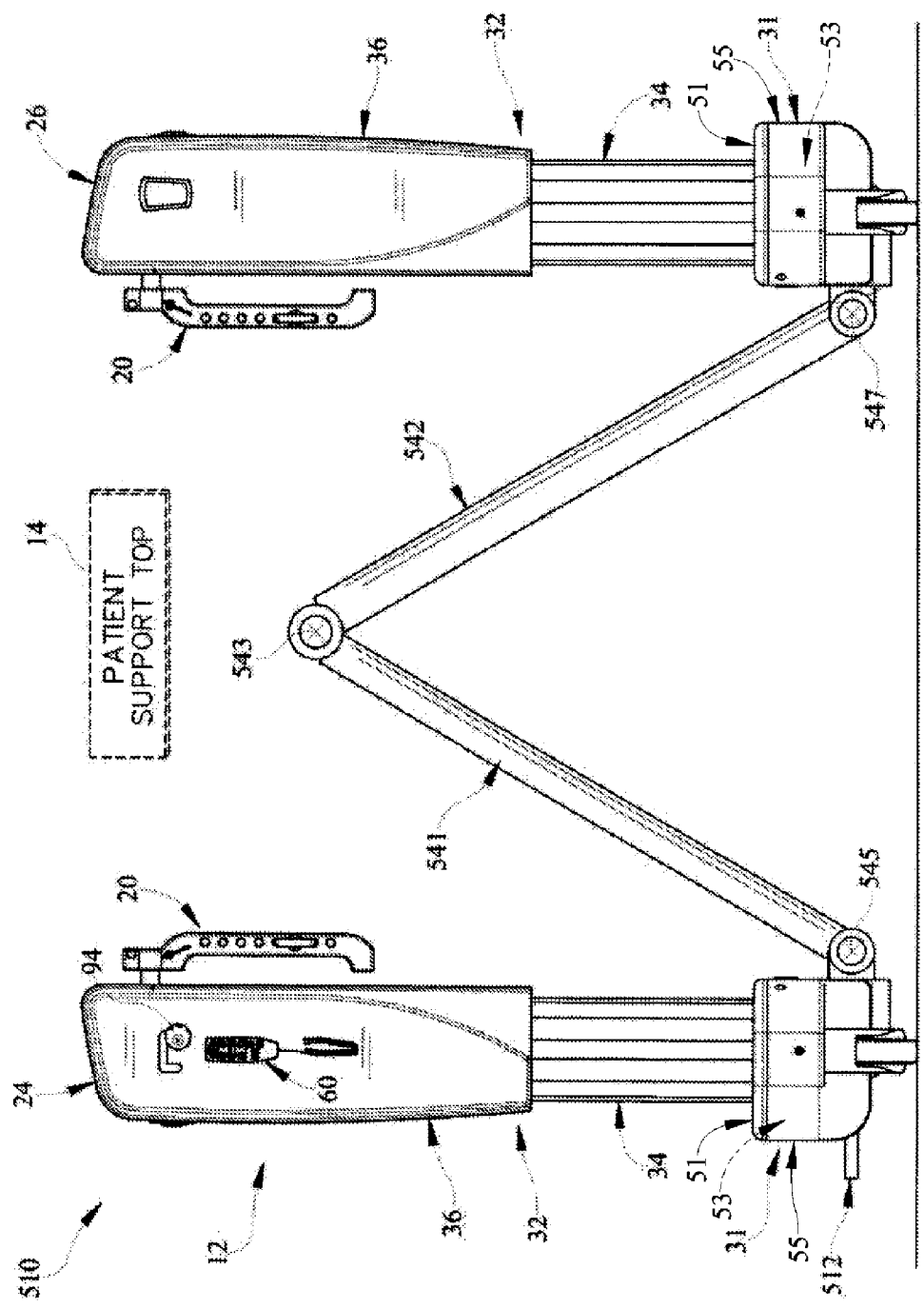
FIG. 88 is a side elevation view of the patient support apparatus of FIG. 63 showing the foldable extension moving from an extended-use configuration toward a folded-storage configuration.

An alternative patient support apparatus 510 is shown in FIGS. 87 and 88. The alternative patient support apparatus 510 is substantially similar to patient support apparatus 10 and similar reference numbers indicate similar structure. However, the alternative patient support apparatus 510 includes a pair of input pedals 512 not present in the patient support apparatus 10. Additionally, the alternative patient support apparatus 510 includes an extension 528 rather than the extension 28 included in patient support apparatus 10.

The pair of input pedals 512 is coupled to the base 31 of the first column 24 as shown in FIG. 87. The input pedals 512 are included in the user input 54 of the user interface 44 and are electrically coupled to the controller 40. The pair of input pedals is configured to brake and unbrake the casters 33, 35 of the brake system 50. The pair of input pedals include a brake pedal 522, configured to provide an electronic input directing the brake system 50 to move the braked configuration, and an unbrake pedal 524 configured to provide an electronic input directing the brake system to move the unbraked configuration.

The extension 528 is configured to move between a deployed position, wherein the columns 24, 26 are spaced to support the support top 14, and a storage position, wherein the columns 24, 26 are collapsed together reducing the footprint of the foundation frame. The extension 528 includes a first member 541 and a second member 542 coupled to the first member 541 for pivotable movement about an axis 543. The first member 545 is coupled to the first column 24 for pivotable movement about an axis 540. The second member 542 is coupled to the second column 26 for pivotable movement about an axis 547.

As shown in FIGS. 89-95, the patient support apparatus 10 may include a traction device 700. Traction may be applied to a patient before, during, or after a surgery so that a surgeon or caregiver can arrange the patient for evaluation and/or particular surgical procedures. In the illustrative embodiment, the traction device 700 is coupled to the first column 24 and includes a traction attachment 702, a set of selectively removable weights 704, and a cable 706 extending from the traction attachment to the selectively removable weights 704. In other embodiments, the traction device 700 may be coupled to the second column 26.

Figure 89:
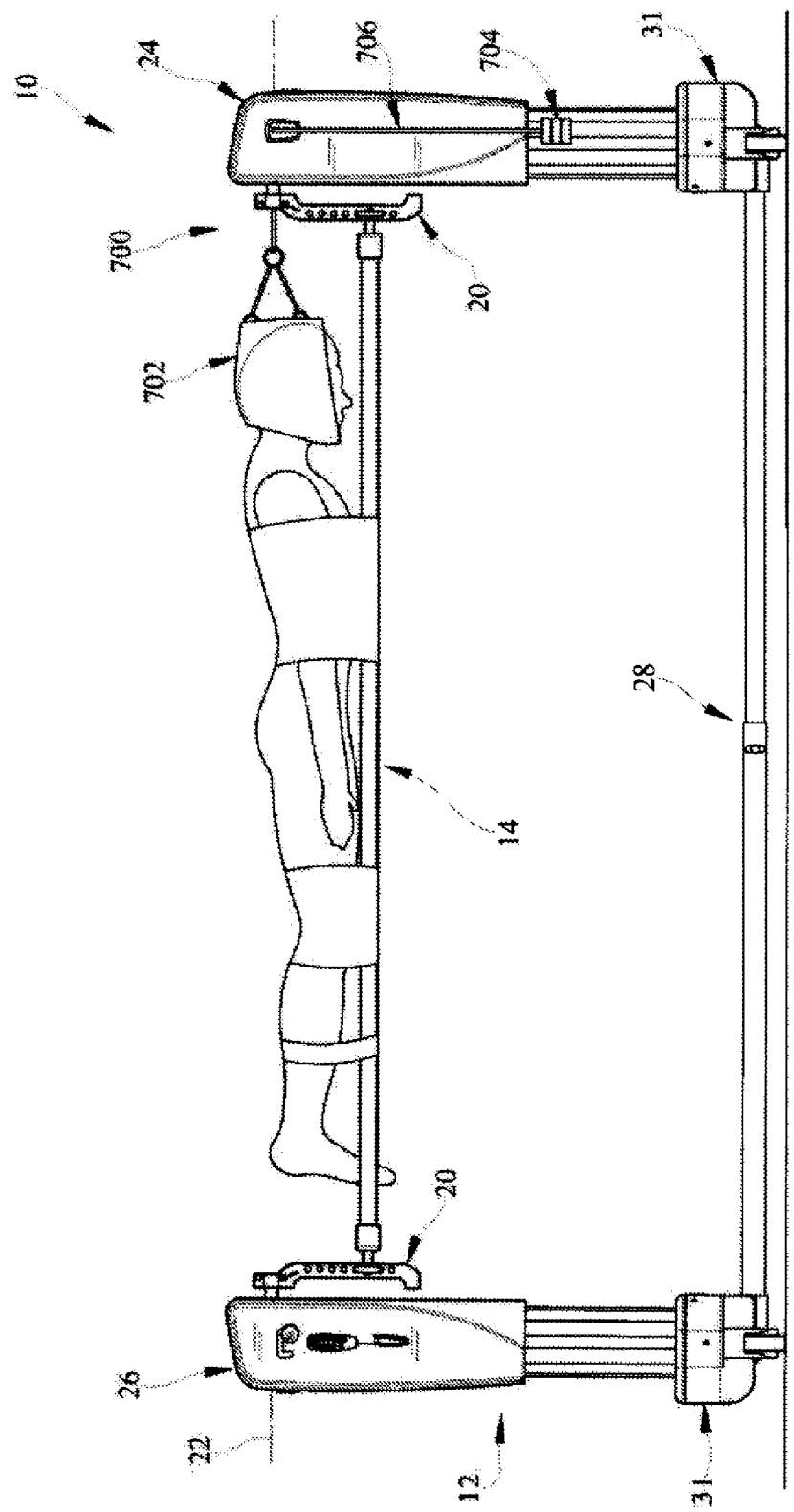
FIG. 89 is a side elevation view of the patient support apparatus of FIG. 1 showing that the patient support apparatus includes a traction device.
Figure 90:
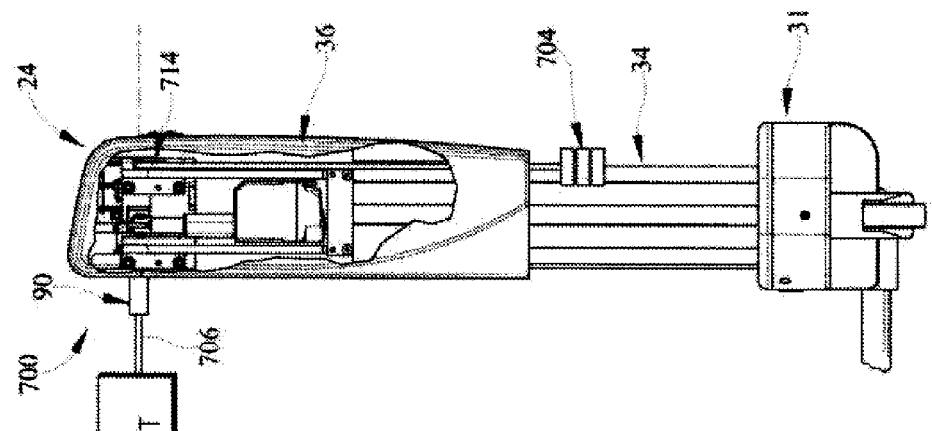
FIG. 90 is a side elevation view of the first (head end) column of the patient support apparatus of FIG. 89 showing the traction device coupled to the first column.
Figure 91:
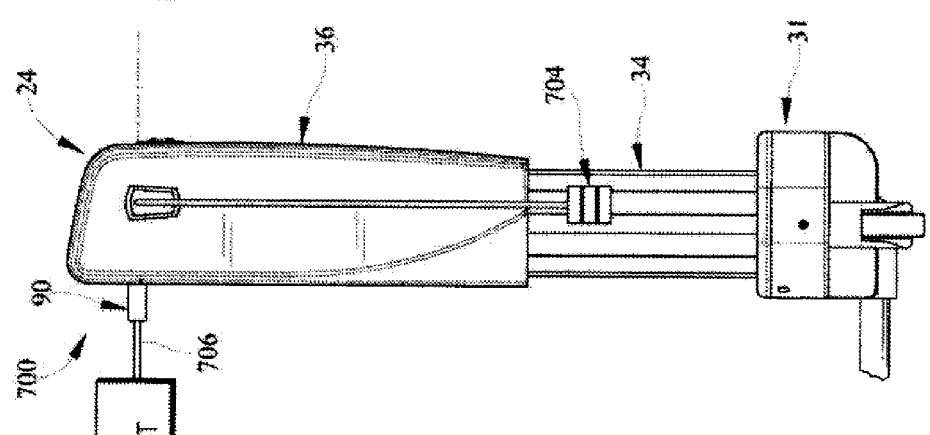
FIG. 91 is a view similar to FIG. 90 with the cover of the first column broken away to show the arrangement of the traction device.

The traction attachment 702 is illustratively a head wrap for applying cervical traction to a patient as shown in FIG. 89. In other embodiments, the traction attachment 702 may be a crown-type attachment screwed directly in to a patient's skull or another type of attachment device for attachment to a patient's head or other body part.

The weights 704 are situated along a side of the first column 24 and are configured to be removed or added to the traction device 700 to increase or decrease traction force applied to a patient as shown in FIG. 89. In other embodiments, a reel or other force provider may be used to apply traction through the traction attachment 702 to the patient. The cable 706 illustratively extends through the first column 24 and transmits traction force from the weights 704 to the traction attachment 702.

The cable 706 illustratively extends through the passage 132 of rotation system 46 and generally along the axis of rotation 22 so that the cable 706 is not twisted during rotation of a patient about the pivot axis 22 during surgery as shown in FIG. 89. Thus, the cable 706 extends through the central opening 130 of the engagement member 122, the central opening 120 of the collar 113, the central opening 110 of the rotation arm 102, and the hollow shaft 112 of the rotation system 46 as suggested in FIG. 91.

Figure 93:
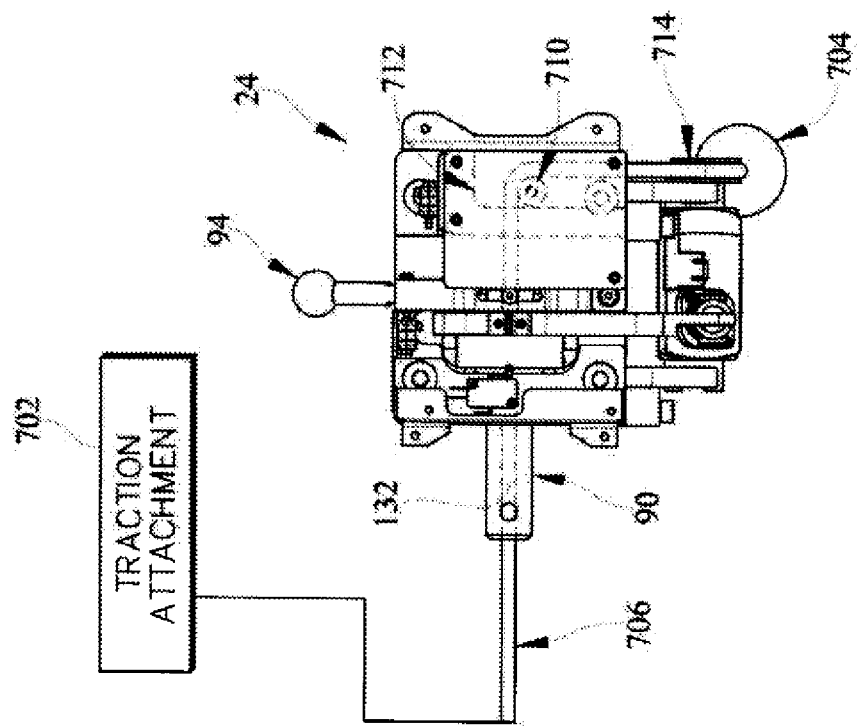
FIG. 93 is a view similar to FIG. 92 with the cover of the first column broken away to show a horizontal pulley included in the traction device coupled to the first column.
Figure 92:
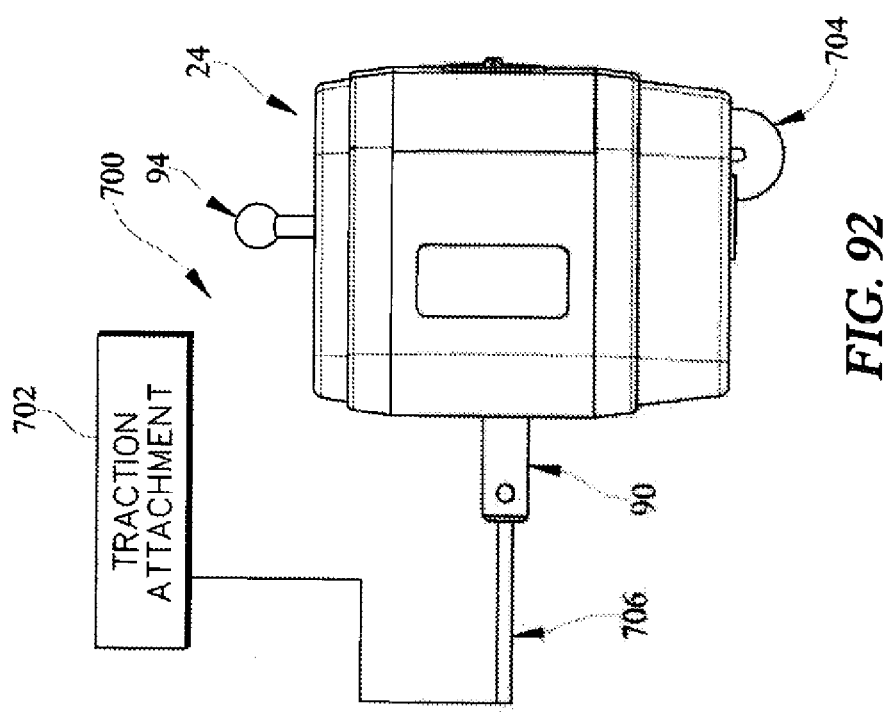
FIG. 92 is a top plan view of the first column of the patient support apparatus of FIG. 89 showing the traction device coupled to the first column.
Figure 95:
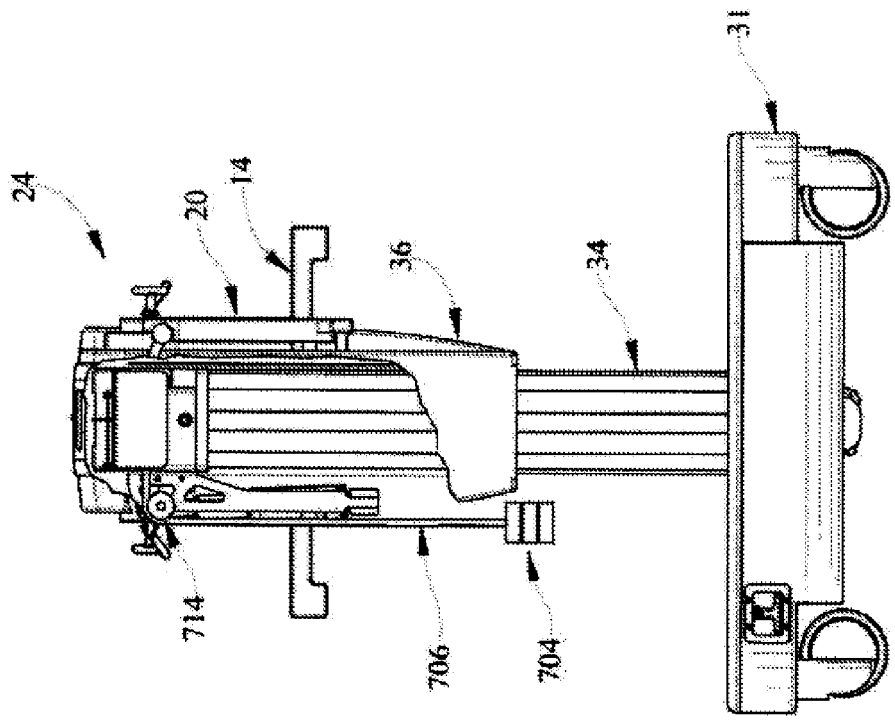
FIG. 95 is a view similar to FIG. 94 with the cover of the first column broken away to show a vertical pulley included in the traction device coupled to the first column.
Figure 94:
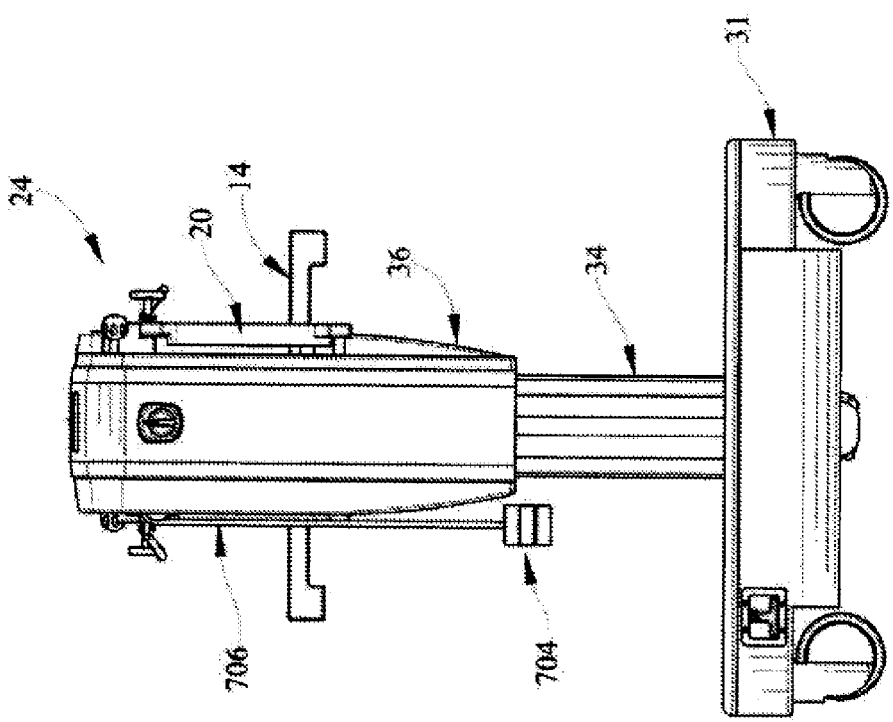
FIG. 94 is a rear elevation view of the first column of the patient support apparatus of FIG. 89 showing the traction device coupled to the first column.

The cable 706 is guided from the traction attachment 702 to the weights 704 by a number of guides ash shown in FIGS. 93 and 95. In the illustrative embodiment, the guides include a horizontal pulley 710, a guide block 712, and a vertical pulley 714. The horizontal pulley 710 is coupled to the first column 24 and guides the cable 706 from along the passage 132 toward the side of the column 24 as shown in FIG. 93. The guide block 712 is coupled to the first column 24 and blocks the cable from disengaging the horizontal pulley 710. The vertical pulley 714 is coupled to the first column 24 and guides the cable 706 from down along the side of the column 24 to the weights 704 as shown in FIG. 95.

The foregoing description of various embodiments and principles of the disclosure have been presented for the purposes of illustration and description. It is not intended to be exhaustive or to limit the disclosure to the precise forms disclosed. Many alternatives, modifications and variations will be apparent to those skilled in the art. Moreover, although multiple inventive aspects and principles have been presented, these need not be utilized in combination, and various combinations of inventive aspects and principles are possible in light of the various embodiments provided above. Accordingly, the above description is intended to embrace all possible alternatives, modifications, aspects, combinations, principles, and variations that have been discussed or suggested herein, as well as all others that fall within the principles, spirit and broad scope of the various possible inventions disclosed herein and defined by the claims.

The invention claimed is:

1. A patient support apparatus comprising
a caster including a stem, a wheel coupled to the stem to rotate about a wheel axis relative to the stem, and a braking element movable from a disengaged position allowing rotation of the wheel relative to the stem to an engaged position blocking the wheel from rotation relative to the stem,
a brake drive including a mount and a linear actuator coupled to the mount, the linear actuator to move from a retracted position to an extended position relative to the mount, and
a linkage coupled to the braking element of the caster and to the linear actuator of the brake drive, the linkage configured to transfer motion of the linear actuator from the retracted position to the extended position to the braking element to move the braking element from the disengaged position to the engaged position, the linkage further configured to selectively move the braking element from the engaged position to the disengaged position while the linear actuator is in the extended position so that a user can free the wheel of the caster to rotate even if the actuator is stuck in the extended position,
wherein the linkage includes a shaft coupled to the mount to slide relative to the mount and a release assembly coupled to the linear actuator, the release assembly configured to couple the shaft to the linear actuator so that the shaft slides along a linear path relative to the mount in response to movement of the linear actuator from the retracted position to the extended position and to selectively release the shaft from the linear actuator when the linear actuator is in the extended position.

2. The patient support apparatus of claim 1, wherein the linkage includes a spring coupled to the shaft and the mount, the spring configured to move the shaft when the shaft is released from the linear actuator by the release assembly.

3. The patient support apparatus of claim 1, wherein the linkage includes a pivot connector coupled to the shaft for movement about a connector axis and coupled to the braking element of the caster to convert linear motion from the linear actuator into rotating motion applied to the braking element.

4. The patient support apparatus of claim 1, wherein the release assembly includes a plate and a handle coupled to the plate, the plate being movable from a first position in which the plate couples the shaft to the linear actuator for movement therewith to a second position in which the plate releases the shaft from the linear actuator for motion independent of the shaft, and the plate moves from the first position to the second position in response to a user moving the handle.

5. The patient support apparatus of claim 4, wherein the plate is biased toward the first position.

6. The patient support apparatus of claim 4, wherein the plate is coupled to the linear actuator to pivot about a plate axis relative to the linear actuator.

7. The patient support apparatus of claim 4, wherein the plate is formed to include a slot that receives a pin coupled to the shaft.

8. A patient support apparatus comprising
a caster including a stem, a wheel coupled to the stem to rotate about a wheel axis relative to the stem, and a braking element movable from a disengaged position allowing rotation of the wheel relative to the stem to an engaged position blocking the wheel from rotation relative to the stem,
a brake drive including a mount and a linear actuator coupled to the mount, the linear actuator to move from a retracted position to an extended position relative to the mount, and
a linkage coupled to the braking element of the caster and to the linear actuator of the brake drive, the linkage configured to transfer motion of the linear actuator from the retracted position to the extended position to the braking element to move the braking element from the disengaged position to the engaged position, the linkage further configured to selectively move the braking element from the engaged position to the disengaged position while the linear actuator is in the extended position so that a user can free the wheel of the caster to rotate even if the actuator is stuck in the extended position,
wherein the linkage includes a shaft coupled to the mount to slide relative to the mount and a release assembly coupled to the linear actuator, the release assembly configured to couple the shaft to the linear actuator so that the shaft slides relative to the mount during movement of the linear actuator from the retracted position to the extended position and to selectively release the shaft from the linear actuator when the linear actuator is in the extended position,
wherein the release assembly includes a plate and a handle coupled to the plate, the plate being movable from a first position in which the plate couples the shaft to the linear actuator for movement therewith to a second position in which the plate releases the shaft from the linear actuator for motion independent of the shaft, and the plate moves from the first position to the second position in response to a user moving the handle,
wherein the plate is formed to include a hole through which the shaft extends, the hole having a first section sized to engage the shaft and a second section sized to allow the shaft to slide through the plate.

9. A patient support apparatus comprising
a pair of casters each including a stem, a wheel coupled to the stem to rotate about a wheel axis relative to the stem, and a braking element movable from a disengaged position allowing the wheel to rotate relative to the stem to an engaged position blocking the wheel from rotation relative to the stem, a brake drive including a mount and an actuator coupled to the mount, the actuator to move from a first position to a second position relative to the mount, and a linkage coupled to the braking element of each of the casters and to the actuator of the brake drive, the linkage configured to transfer motion of the actuator during motion from the first position to the second position to the braking elements, and the linkage further configured to selectively move the braking elements from the engaged position to the disengaged position while the linear actuator is in the second position, wherein the linkage includes an actuation member coupled to the actuator for movement therewith, a rod assembly coupled to the braking elements of the casters, and a plate coupled to the actuation member and to the rod assembly, the plate is received in a slot formed in the actuation member, and the plate is configured to move relative to the actuation member between a first position transferring motion of the brake drive to the rod assembly and a second position releasing the brake drive from the rod assembly.

10. The patient support apparatus of claim 9, wherein the rod assembly includes a shaft slidable along a shaft axis, a first pivot connector coupled to the shaft and to one of the braking elements included in one of the casters, and a second pivot connector coupled to the shaft and to the other of the braking elements included in the other of the casters.

11. The patient support apparatus of claim 10, wherein the shaft extends through a hole formed in the plate.

12. The patient support apparatus of claim 10, wherein the actuation member is a slider coupled to the shaft to slide along the shaft axis relative to the shaft.

13. A patient support apparatus comprising a foundation frame including a first column and a second column spaced apart from the first column, a patient support top suspended from the first column and the second column for rotation about a support-top axis extending from the first column to the second column, and a brake system including a caster with a braking element coupled to the first column, a brake drive coupled to the first column, and a linkage coupled to the caster and to the brake drive, the linkage is configured to transfer motion from the brake drive to the braking element of the caster to brake the caster and to selectively move the braking element of the caster to unbrake the caster while the brake drive remains stationary, wherein the brake drive includes a mount coupled to the first column and a linear actuator coupled to the mount, wherein the linkage includes an actuation member coupled to the linear actuator for movement therewith, a rod assembly coupled to the braking element of the caster, and a plate coupled to the actuation member and to the rod assembly, the plate is received in a slot formed in the actuation member, and the plate is configured to move relative to the actuation member between a first position transferring motion of the brake drive to the rod assembly and a second position releasing the brake drive from the rod assembly.

* * * * *